United States Patent
Kihara et al.

(10) Patent No.: US 11,090,874 B2
(45) Date of Patent: *Aug. 17, 2021

(54) LASER WELDED BODY

(71) Applicant: ORIENT CHEMICAL INDUSTRIES CO., LTD., Osaka (JP)

(72) Inventors: Tetsuji Kihara, Neyagawa (JP); Satoshi Yamamoto, Neyagawa (JP)

(73) Assignee: ORIENT CHEMICAL INDUSTRIES CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,717

(22) Filed: Dec. 2, 2019

(65) Prior Publication Data

US 2021/0162679 A1 Jun. 3, 2021

(51) Int. Cl.
*B32B 7/02* (2019.01)
*B29C 65/16* (2006.01)
*B29C 65/00* (2006.01)

(52) U.S. Cl.
CPC ...... *B29C 65/1677* (2013.01); *B29C 65/1616* (2013.01); *B29C 65/1635* (2013.01); *B29C 66/114* (2013.01); *B29C 66/1122* (2013.01); *B29C 66/43* (2013.01); *B29C 66/71* (2013.01); *B29C 66/73921* (2013.01)

(58) Field of Classification Search
CPC . B29C 65/16; B29C 65/1677; B29C 66/1142; B29C 66/71; B29K 2105/0005; B32B 2307/20; B32B 27/08; B32B 27/18; C08K 5/08; C08K 5/3447; C08L 101/00
See application file for complete search history.

(56) References Cited

U.S. PATENT DOCUMENTS

| | | | |
|---|---|---|---|
| 4,636,609 A | 1/1987 | Nakamata | |
| 6,395,809 B1 | 5/2002 | Hayashi et al. | |
| 2005/0003301 A1 | 1/2005 | Sugawara et al. | |
| 2005/0203225 A1* | 9/2005 | Nakagawa | B29C 66/73921 524/190 |
| 2006/0142451 A1 | 6/2006 | Yushina et al. | |
| 2006/0175004 A1 | 8/2006 | Kurosaki et al. | |

(Continued)

FOREIGN PATENT DOCUMENTS

| | | |
|---|---|---|
| JP | S62-49850 B2 | 10/1987 |
| JP | 2001-011055 A | 1/2001 |

(Continued)

*Primary Examiner* — Lawrence D Ferguson
(74) *Attorney, Agent, or Firm* — Oliff PLC

(57) ABSTRACT

Provided is a laser welded body which can be integrated through a laser-welding step without undergoing complicated steps even through use of the same or difference resin members each other, which has excellent welding strength between the resin members, which maintains the characteristics of a resin contained in the resin member and which exhibits the high welding strength by improving meltability of the resin members yet under a laser-welding condition of a medium and high scan speed.

A laser welded body comprises a resin member(s) which contains a thermoplastic resin and nigrosine sulfate having a sulfate ion concentration of 0.3 to 5.0% by mass and has an absorbance a of 0.09 to 0.9, an adjoined part where the resin member(s) is overlapped and/or butted, and at least a part of the adjoined part is laser-welded.

13 Claims, 10 Drawing Sheets

(56) References Cited

U.S. PATENT DOCUMENTS

| 2007/0065659 | A1 | 3/2007 | Kihara et al. |
| 2009/0136717 | A1 | 5/2009 | Kihara et al. |
| 2010/0186886 | A1 | 7/2010 | Kihara et al. |

FOREIGN PATENT DOCUMENTS

| JP | 2004-351730 A | 12/2004 |
| JP | 2005-281522 A | 10/2005 |
| JP | 2007-112127 A | 5/2007 |
| JP | 2007-231088 A | 9/2007 |
| JP | 2019-104241 A | 6/2019 |
| WO | 03/039843 A1 | 5/2003 |
| WO | 2004/072175 A1 | 8/2004 |
| WO | 2019/003607 A1 | 1/2019 |

* cited by examiner

Fig.5
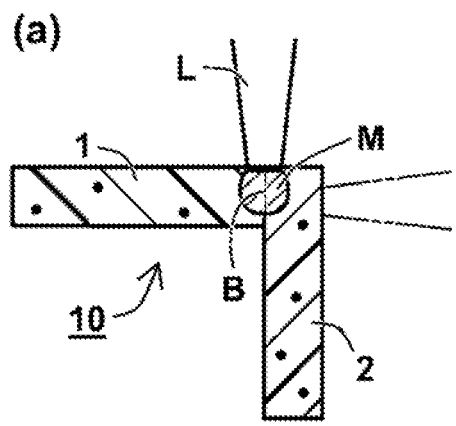
(a)
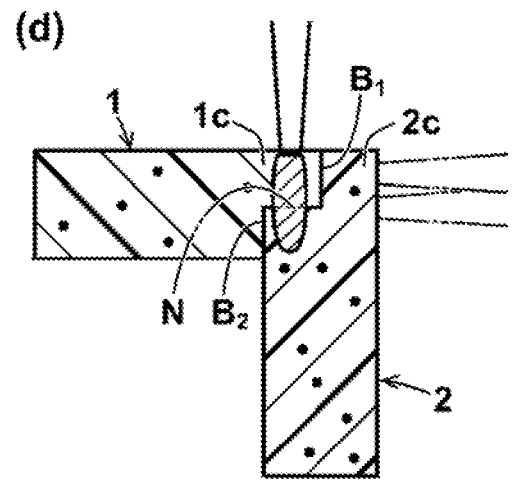
(d)
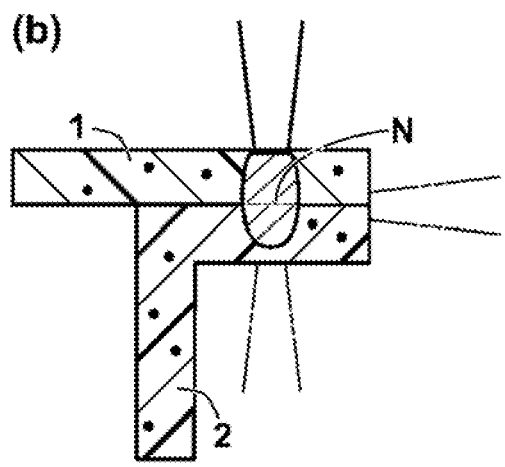
(b)
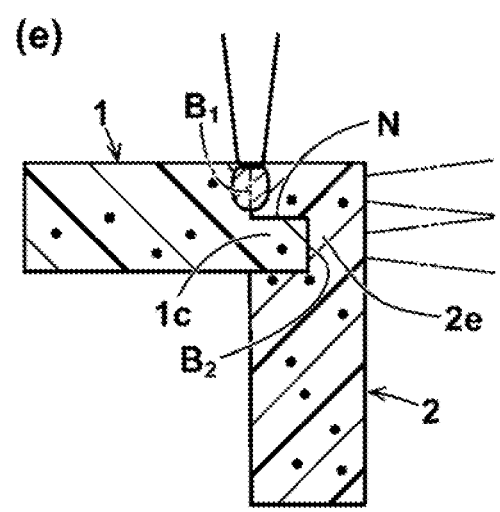
(e)
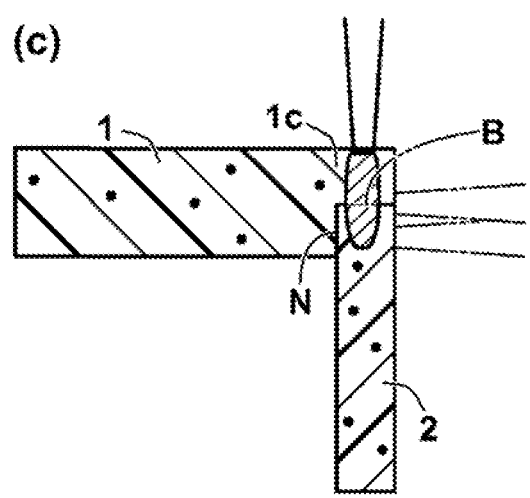
(c)

*Fig.6*
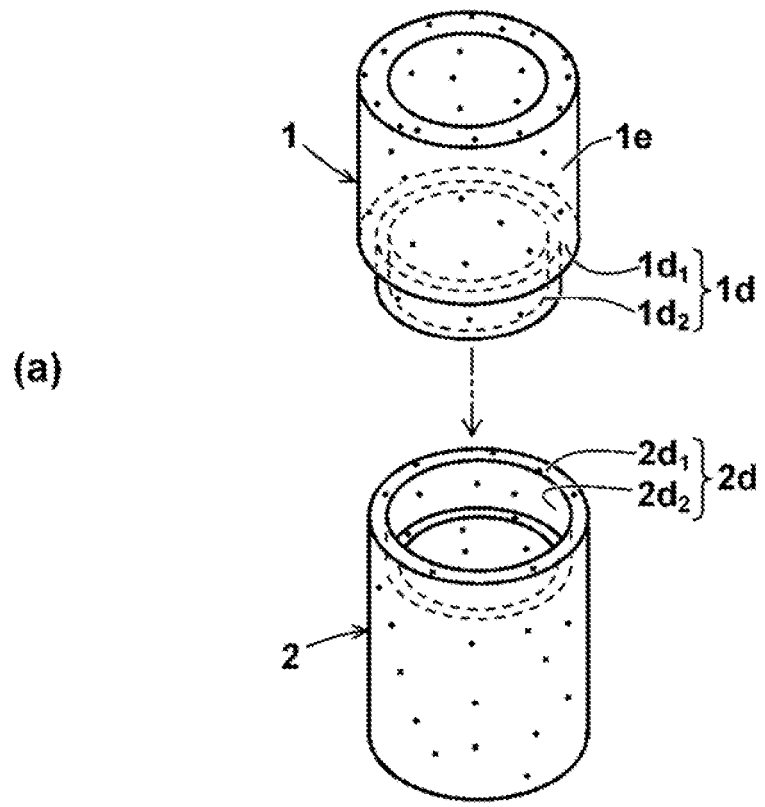
(a)
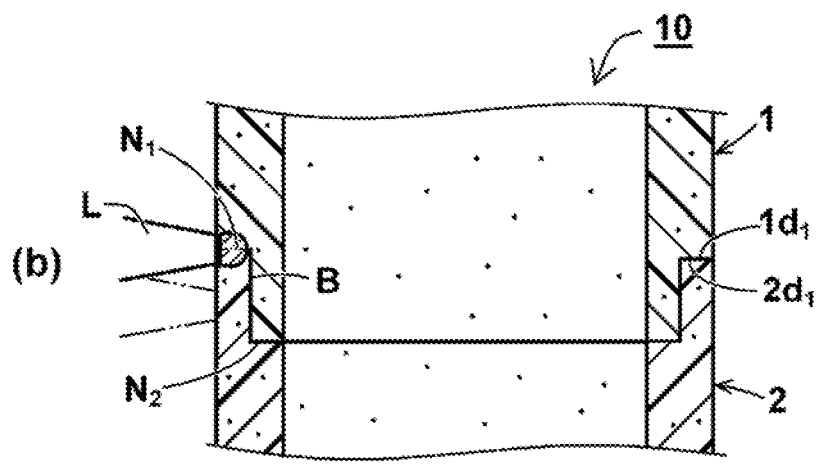
(b)

Fig. 7
(a) 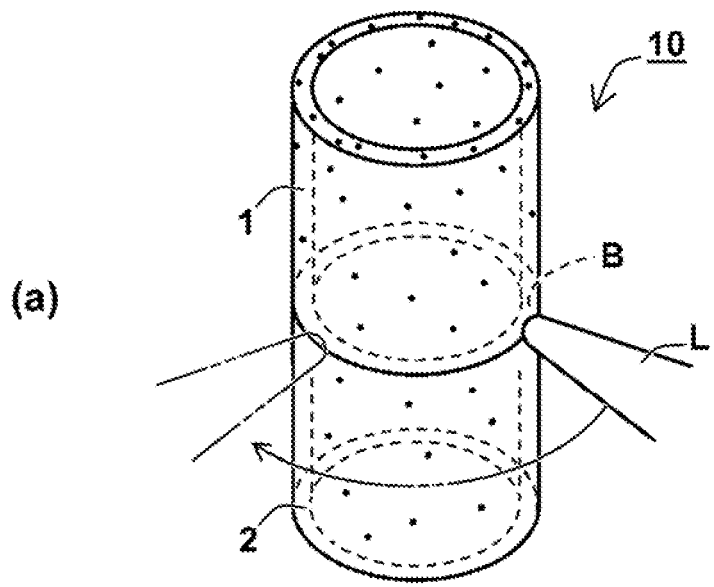
(b) 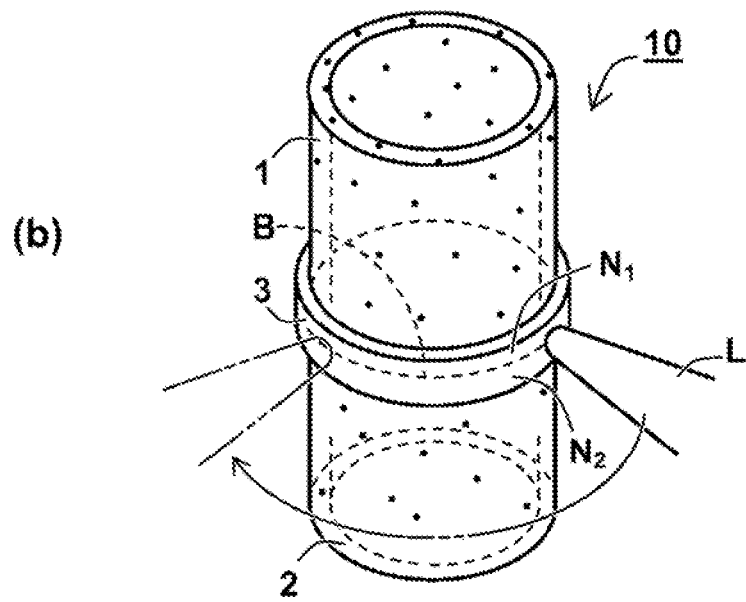

*Fig.9*
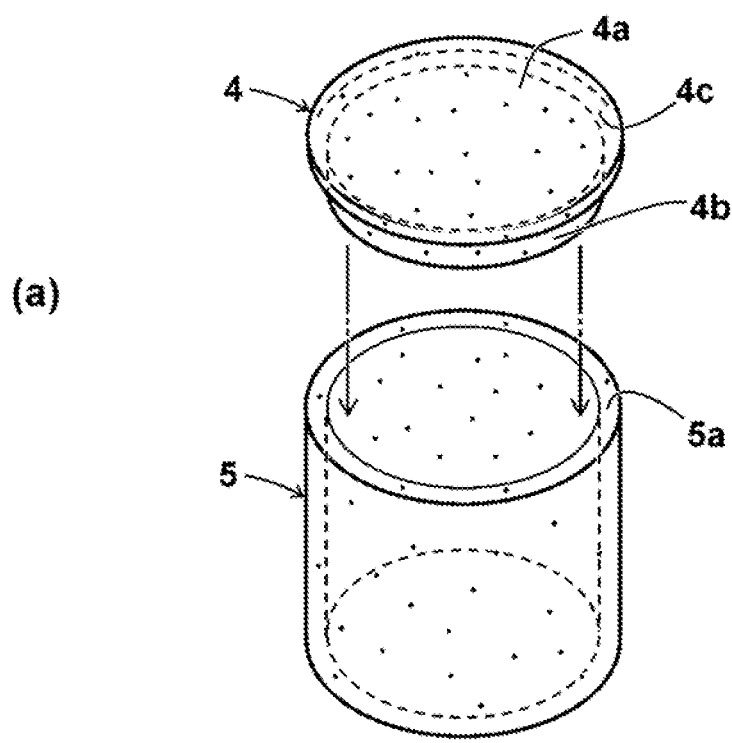
(a)
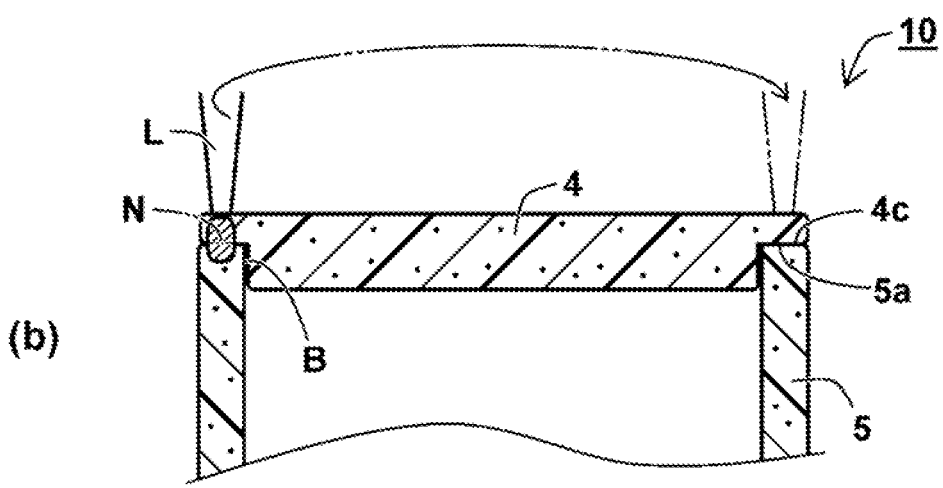
(b)

LASER WELDED BODY

TECHNICAL FIELD

The present invention relates to a laser welded body of which resin members having a specific absorbance are integrated by laser-welding.

BACKGROUND OF THE ART

Recently, lightweight thermoplastic resin products are often employed as parts for vehicles such as automobiles and railways, and structural components for the field of electronic and electrical devices instead of employing metals.

The conventional laser welding method is performed as shown in FIG. 10. A laser-transmissible resin member 11 having laser beam transmittivity is used for one member. A laser-absorptive resin member 12 having laser beam absorbability is used for the other member. A contacted part N is formed by overlapping and contacting these resin members. The laser beam L, which is radiated from a side of the laser-transmissible resin member 11 toward the laser-absorptive resin member 12, is applied to the contacted part N. And the laser beam L transmitted through the laser-transmissible resin member 11 is absorbed into the laser-absorptive resin member 12, and then exotherm is caused thereat. The exotherm melts the laser-absorptive resin member 12 mainly at a laser-absorbing part therein. Further thermal conduction is created and then the laser-transmissible resin member 11 melts. In the result, both resin members are fused. After cooling, the laser-transmissible resin member 11 and the laser-absorptive resin member 12 are welded at the contacted part N. A conventional laser welded body 13 is produced.

The laser welding method has advantages as follows. Welding resin members can be performed simply by local laser beam irradiation to a region to be bonded. Thermal influence on a neighborhood except for a welded part is little because exotherm is locally generated. No mechanical vibration is generated. Welding fine parts or rein members having three-dimensionally complicated structures can be performed. Reproducibility is excellent. High airtightness can be maintained. Bonding strength is high. A boundary line of a welding position is visually inconspicuous. No dust is generated.

According to the laser welding method, the rein members can be rigidly bonded by firmly welding these. In addition, equal or stronger bonding strength is achieved as compared with the other methods, for example, method by clamping with a clamp (a bolt, a screw, a clip and so on), by adhering by an adhesive material, by vibration welding, by the ultrasonic welding and so on. According to the laser welding method also achieves labor saving, improvement of productivity, lowering of production costs and so on because it is capable of little vibratory and minimizing thermal influence. Accordingly, in the automobile industry, the electric industry or the electronic industry, the laser welding method is suitable for bonding functional parts or electronic parts which should avoid the vibratory or thermal influence thereon. Also the laser welding method can be adapted for bonding resin parts having a complicated shape.

As a technology relating to the laser welding method, a laser welding method is disclosed in Patent Document 1. In the method, in order to weld two resin members, a laser-absorptive resin member to which carbon black absorbing a laser beam is added and a laser-transmissible resin member are overlapped, and then the laser beam radiated from a side of the laser-transmissible resin member is applied thereto. Both resin members are bonded by the welding.

Patent Document 2 discloses another laser welding method. In the method, joining flange parts, which are preliminarily formed as a joint flap for respectively welding laser-transmissible resin member and the laser-absorptive resin member, are butted. In order to temporarily weld the both resin members, a laser beam which radiates from a side of the joining flange part of the laser-transmissible resin member is applied thereto. Then, in order to unify both resin members, essential welding is performed by irradiating the joining flange parts with the laser beam.

The Patent Document 3 discloses another laser welding method. In the method, thermoplastic resin members A and B and a heat-releasing material C having an infrared ray-transmissible part are in contact in order of C/A/B, and then these resin members are irradiated with an infrared ray which radiates from a side of the heat-releasing material C. According to the method, the thermoplastic members A and B may be made from a same thermoplastic resin. However, in the method, the special heat-releasing material C must be used in order to adjust the exotherm at the time of laser-welding, which causes complex processes in the laser welding method.

PRIOR ART DOCUMENT

Patent Document

[Patent Document 1] Japanese Patent Publication of Provisionally Allowed Application No. S62-049850 B2

[Patent Document 2] Japanese Patent Application Publication No. 2004-351730 A

[Patent Document 3] International Application Publication No. WO03/039843 A1

SUMMARY OF THE INVENTION

Problems to be Solved by the Invention

In International Publications No. WO2007/034970 A1 and WO2007/034978 A1, the inventors of the present invention proposed that a laser welded body having high strength is obtained by easily welding substantially same resin members. In this proposal, laser-transmissible-absorptive molding members of which a laser beam absorbent, especially nigrosine is contained and absorbance is adjusted to be a specific range are prepared. According to the proposal, the occurrence of scorch marks and voids to the laser welded body is prevented, laser-welding can be performed under wide radiation condition and the laser welded body can be stably obtained as compared to the conventional laser welding method essentially using the laser-transmissible resin member and the laser-absorptive resin member.

According to the above invention, a melting growth (a molten pool) can be expanded as compared with a conventional laser welding method so that a laser welded body having more excellent tensile strength can be obtained. Further, the above invention has features as follows. Growth of the molten pool is expanded by laser-welding under a laser beam radiation condition of a low energy amount and a laser beam scan speed at a low speed, and the welding strength of the laser welded body is increased. However, it is difficult to produce a more number of the laser welded body of which resin members are welded so as to have high strength by performing radiation of a laser beam at a high energy amount and a high scan speed, per unit of time.

In production processes in an industry, e.g. a manufacturing line in a factory of automobiles and household appliances, improving production efficiency by increase of manufacturing speed has been one of important problems. Accordingly, a laser welded body obtained by a laser welding method as follows is desired from the industry. A laser welding method can manufacture the laser welded body having excellent welding strength even when radiation of a laser beam is performed at a substantially increased scan speed. Further, the laser welding method has high utility which can be introduced into the manufacturing line at a low cost.

The present invention was made in view of solving the above described problems, and its object is to provide a laser welded body which can be integrated through a laser-welding step without undergoing complicated steps even through use of the same or difference resin members each other, which has excellent welding strength between the resin members and which maintains the characteristics of a resin contained in the resin member.

Further, the object of the present invention, in addition to above, is to provide the laser welded body which exhibits the high welding strength by improving meltability of the resin members yet under a laser-welding condition of a medium and high scan speed.

Means for Solving Problems

The inventors of the present invention found out as follows. A melting phenomenon in resin members which is caused by irradiating these with a laser beam is greatly and deeply expanded by employing a single resin member or a plurality of a resin member whose thermal conductivity is increased and an absorbance is adjusted to a specific value so as to be transmissive to a one part of a laser beam while absorbing the other part thereof. Further a melting part is quickly and widely expanded. In the result, the laser welded body which is quickly and further strongly bonded can be obtained as compared with the conventional laser welding method.

A laser welded body of the present invention developed to achieve the objects described above comprises a resin member(s) which contains a thermoplastic resin and nigrosine sulfate having a sulfate ion concentration of 0.3 to 5.0% by mass and has an absorbance a of 0.09 to 0.9, an adjoined part where the resin member(s) is overlapped and/or butted, and at least a part of the adjoined part is laser-welded.

In the laser welded body, the resin members may be a first laser-transmissible-absorptive resin member which is a laser-irradiated subject and a second laser-transmissible-absorptive resin member which is the same as or different from the first laser-transmissible-absorptive resin member.

In the laser welded body, as an example, the resin members are a first laser-transmissible-absorptive resin member and a second laser-transmissible-absorptive resin member which is the same as or different from the first laser-transmissible-absorptive resin member and the both resin members are a laser-irradiated subject.

In the laser welded body, an absorbance ratio $a_1/a_2$ of an absorbance $a_1$ of the first laser-transmissible-absorptive resin member to an absorbance $a_2$ of the second laser-transmissible-absorptive resin member may be 0.3 to 1.2.

The laser welded body may comprise a laser-transmissible resin member as a laser-irradiated subject having an absorbance b of 0.01 to 0.09 and containing a thermoplastic resin which is the same as or different from the thermoplastic resin, an adjoined part where the resin member(s) and the laser-transmissible resin member are overlapped and/or butted, and at least a part of the adjoined part is laser-welded.

In the laser welded body, the resin members may be a first laser-transmissible-absorptive resin member and a second laser-transmissible-absorptive resin member which is the same as or different from the first laser-transmissible-absorptive resin member and an absorbance ratio $a_1/a_2$ of an absorbance $a_1$ of the first laser-transmissible-absorptive resin member to an absorbance $a_2$ of the second laser-transmissible-absorptive resin member may be 0.3 to 1.2.

In the laser welded body, as an example, volume resistivity of the nigrosine sulfate is $5.0 \times 10^9$ to $7.0 \times 10^{11}$ Ω·cm.

In the laser welded body, a melt flow rate of the resin member(s) is preferably 11 to 30 g/10 minutes.

In the laser welded body, the thermoplastic resin may be at least one selected from the group consisting of a polyamide rein, a polycarbonate resin, a polyphenylene sulfide resin, a polyethylene terephthalate resin, a polybutylene terephthalate resin and a polypropylene resin.

In the laser welded body, the resin member(s) may contain a coloring agent containing an anthraquinone dye.

In the laser welded body, the anthraquinone dye may be an anthraquinone salt-forming dye.

In the laser welded body, the anthraquinone salt-forming dye may be represented by $A^-B^+$ ($A^-$ is an anion from the anthraquinone and $B^+$ is a cation from an organic ammonium compound) or AB (A is a residue of the anthraquinone and B is a residue of an organic ammonium compound).

Effects of the Invention

According to the laser welded body of the present invention, the laser-transmissible-absorptive resin member or the plurality of the laser-transmissible-absorptive resin member having laser transmittivity and laser absorbability are welded. Thereby the laser-transmissible-absorptive resin members are not needed to distinguish and the resin members can be easily prepared and managed. In the laser welded body, a direction and order of overlapping of the laser-transmissible-absorptive resin members are not restricted and a radiation direction of the laser beam can be widely selected because the laser welded body has the laser-transmissible-absorptive resin members. Therefore the laser welded body having a complex shape can be produced via simple operations. The laser welded body is manufactured through simple steps having high utility which can be introduced at a low cost.

In the laser welded body of the present invention, the laser-transmissible-absorptive resin members which are the resin members containing the thermoplastic resin and the nigrosine sulfate exhibit high meltability which originates in more high fluidity and decrease of crystallization temperature because the laser-transmissible-absorptive resin members contain the nigrosine sulfate having the sulfate ion concentration of 0.3 to 5.0% by mass as a laser beam absorbent. The laser welded body can be high-production-effectively manufactured by the radiation of the laser beam at the medium and high scan speed as compared with a laser welded body using resin members containing chloride of nigrosine as the laser beam absorbent.

The laser-transmissible-absorptive resin members the laser welded body has generate heat and thermally melt rapidly by receiving the laser beam. The laser-transmissible-absorptive resin members exhibit a heat-generating effect and a melting object thereof has the rich fluidity. Thereby even when interspace between the laser-transmissible-absorptive resin members which are overlapped and/or butted is formed, the interspace is occluded by forming a wide molten pool (an overall steric shape of the melting object), the laser welded body exhibits high welding strength.

According to the laser-welding of the present invention, therefore, even when bonding face of the molded resin members has an outward fault such as sink marks and convex-concave shapes, incomplete welding is difficult to occur. The laser welded body exhibiting substantially sufficient welding strength and having high reliability and stability can be obtained. The laser welding can be preferably used for welding use of the resin members such as a tank, a pipe and a container which should avoid leakages of contents.

According to the laser welded body, the original characteristics of the thermoplastics which are contained to the resin members are not lost because the resin members contain the nigrosine sulfate. In addition, the laser welded body exhibits the high welding strength and has less variation of the welding strength and an appearance because the molten pool generated at the time of laser beam radiation grows big as compared with carbon black. Further, according to the laser welded body, scorch marks and voids at a melted part originating in excessive energy which is generated by the conventional laser welding between a laser-transmissible resin member and a laser-absorptive resin member are not occurred.

According to the laser welded body composed of the laser-transmissible resin member located at a laser-irradiated side (an outer side) and the plurality of the laser-transmissible-absorptive resin member, an outward appearance of a surface is fine. Further, various color hues can be selected by containing a coloring agent, and it can be expanded into colorful use fields.

Furthermore, when the laser-transmissible resin member contains a small amount of the nigrosine sulfate, it exhibits the heat-generating effect and the molten pool can be expanded by reducing temperature difference between the resin members. Thereby the strong laser welded body of the laser-transmissible resin member and the plurality of the laser-transmissible-absorptive resin member can be obtained.

BRIEF DESCRIPTION OF DRAWINGS

FIG. 5 is a schematic cross sectional view showing a scene from producing another laser welded body to which the present invention is applied.

FIG. 6 is a perspective view showing a scene from producing another laser welded body to which the present invention is applied and an enlarged vertical cross sectional view thereof.

FIG. 7 is a schematic cross sectional view showing a scene from producing another laser welded body to which the present invention is applied.

FIG. 9 is a perspective view showing a scene from producing a laser welded body of Examples 7-1 and 7-2 to which the present invention was applied and an enlarged partial cross sectional view thereof.

MODE FOR CARRYING OUT THE INVENTION

Figure 1:
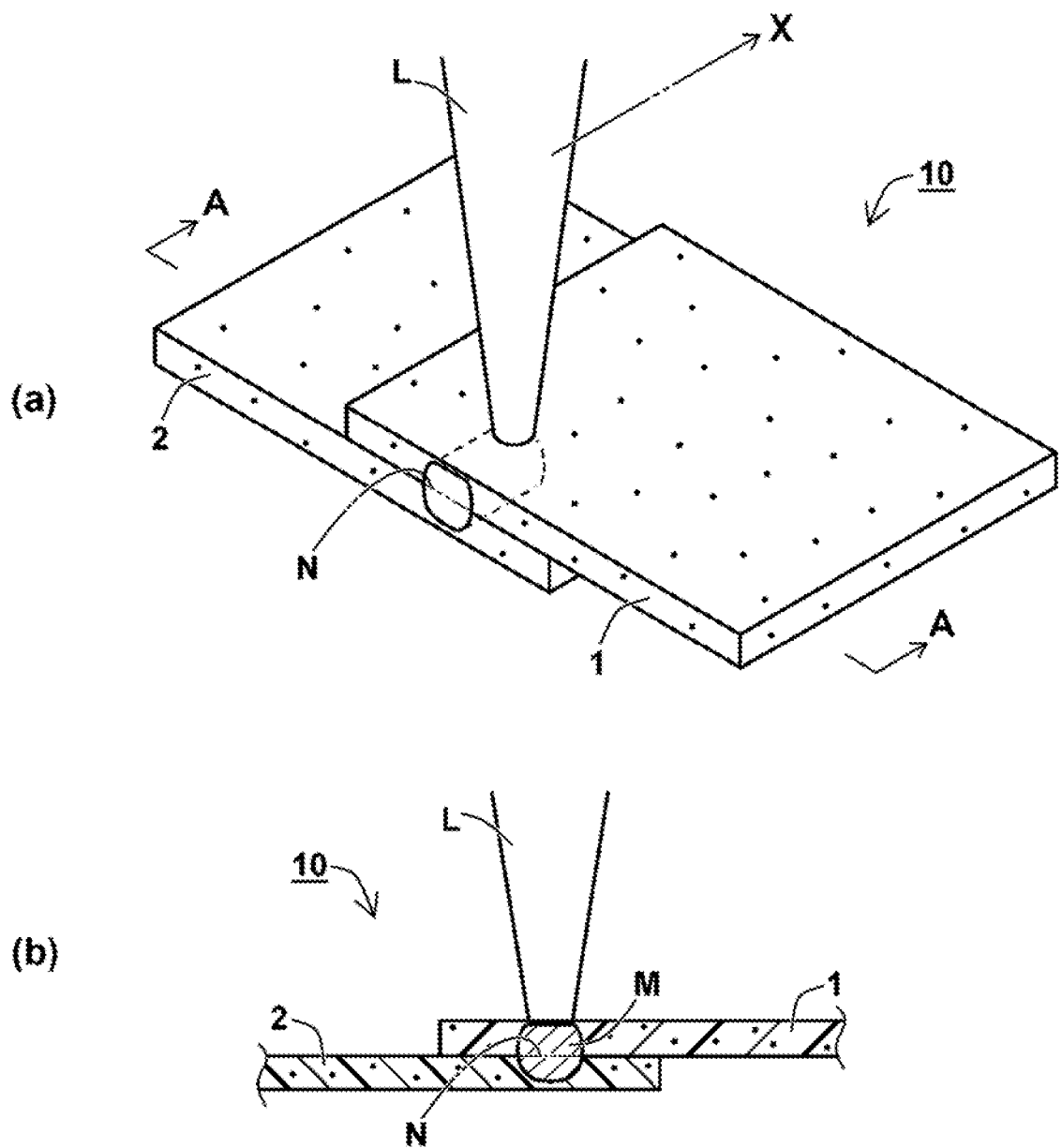
FIG. 1 is a perspective view and a partially schematic cross sectional view taken along A-A line showing a scene from producing a laser welded body to which the present invention is applied.

Hereunder, embodiments to practice the present invention will be explained in detail, but the scope of the present invention is not restricted by these embodiments. Incidentally in the present description, the term "to" is used as referring to include values sandwiching it as an upper limit and a lower limit.

A perspective view showing a scene from producing the laser welded body of the present invention is shown in FIG. 1(a), and a partially schematic cross sectional view taken along A-A line is shown in FIG. 1(b). In a laser welded body 10, a plurality of a resin member is integrated by bonding via laser-welding of these resin members. In the laser welded body 10, a first laser-transmissible-absorptive resin member 1 as a resin member for irradiating with a laser beam which is located at an upper side and a second laser-transmissible-absorptive resin member 2 which is located at a lower side are offset and overlapped so as to form a stepped shape, and adjoined each other. A one part of the overlapped interface is laser-welded. The overlapped interface is an adjoined part of both faces of the laser-transmissible-absorptive resin members 1, 2. The adjoined part is a contacted part N which is formed by contact between the both laser-transmissible-absorptive resin members 1, 2. In this case, the both resin members may be fixed by compression. The laser welded body 10 has a welded part M which is expanded to the both laser-transmissible-absorptive resin members 1, 2 at the contacted part N. The welded part M is formed by cooling and solidifying of a part of the both laser-transmissible-absorptive resin members 1, 2 which are melted by an incident laser beam L.

The both laser-transmissible-absorptive resin members 1, 2 have a planar plate shape having a uniform thickness. The both laser-transmissible-absorptive resin members 1, 2 contain a thermoplastic resin and nigrosine sulfate as a laser beam absorbent. Thereby the both laser-transmissible-absorptive resin members 1, 2 have laser-transmissible-absorptive properties referring to absorb a one part of the laser beam and to transmit the other part thereof. The thermoplastic resin may be the same kind, or alternatively may be the different kind. Incidentally, an angle, radiation energy and radiation times of the laser beam radiation can be appropriately selected depending on members should be laser-welded and shapes thereof.

The first laser-transmissible-absorptive resin member 1 as the resin member for irradiating with the laser beam is located at a laser-irradiating side. Radiation of the laser beam L is performed at an approximately vertical angle relative to an irradiation face of the first laser-transmissible-absorptive resin member 1. The laser beam L scans the irradiation face toward an X direction in a straight line. In the laser welded body 10, the both laser-transmissibleabsorptive resin members 1, 2 are integrated by being welded at the contacted part N in the straight line.

An absorbance $a_1$ and an absorbance $a_2$ of the both laser-transmissible-absorptive resin members 1, 2 are 0.09 to 0.9, preferably 0.09 to 0.7, more preferably 0.1 to 0.5 and even more preferably 0.1 to 0.4 relative to a laser beam having a wavelength band of 940 nm which is output from such as a semiconductor laser. As the values of the absorbance $a_1$ and the absorbance $a_2$ are within the above range, the both laser-transmissible-absorptive resin members 1, 2 accomplish both of exotherm characteristics required for welding these and prevention of excessive exotherm by energy concentration of the incident laser beam L. Further, both of the first laser-transmissible-absorptive resin member 1 which is the subject adapted to be irradiated with the laser beam and the second laser-transmissible-absorptive resin member 2 which is not directly irradiated with the laser beam L can generate a sufficiently calorific value and melt thereof. Furthermore even when the both laser-transmissible-absorptive resin members 1, 2 have different thicknesses each other, these are tenaciously welded, so that the laser welded body having a complex shape is produced. Incidentally, when the both laser-transmissible-absorptive resin members 1, 2 are overlapped, transmittance and absorbance thereof are emphasized. The transmittance of the both laser-transmissible-absorptive resin members 1, 2 is 7% or more, preferably 10 to 80% and more preferably 15 to 70%.

Incidentally, the absorbance $a_1$ and the absorbance $a_2$ may be the same value, or alternatively may be the different value each other such as $a_1 > a_2$, $a_1 = a_2$ or $a_1 < a_2$.

An absorbance ratio $a_1/a_2$ of the absorbance $a_1$ to the absorbance $a_2$ is preferably 0.3 to 1.2, more preferably 0.5 to 1.1 and even more preferably 0.8 to 1.1. It is preferable that the thermoplastic resins contained in the both laser-transmissible-absorptive resin members 1, 2 are the same kind each other, and the absorbance $a_1$ and the absorbance $a_2$ are the same value ($a_1 = a_2$), i.e. the absorbance ratio $a_1/a_2 = 1$. According to the above, a boundary and a welding mark between the both laser-transmissible-absorptive resin members 1, 2 may be diminished because the both laser-transmissible-absorptive resin members 1, 2 have the same color tone. Thereby, the laser welded body 10 having high designability is obtained. In addition, the producing processes of the laser welded body 10 can be more simplified because there is no need to separately prepare and manage the both laser-transmissible-absorptive resin members 1, 2. Furthermore, a temperature difference between the both laser-transmissible-absorptive resin members 1, 2 is small and the welded part M uniformly expanded thereto is formed because the both laser-transmissible-absorptive resin members 1, 2 generate heat by irradiating with the laser beam so as to become a same calorific value. In the result, even when the laser beam L with low energy is used, the laser welded body 10 of the present invention has a great deal of welding strength as compared with the conventional laser welded body because a large difference of the calorific values between the both resin members does not occur such as the conventional laser welded body using a laser-absorptive resin member excessively absorbing a laser beam and a laser-transmissible resin member insufficiently generating heat by irradiating with a laser beam due to laser beam transmittivity.

The color tones of the both laser-transmissible-absorptive resin members 1, 2 are preferably a deep color, especially black color tone. For example, adding a coloring agent containing an anthraquinone into a thermoplastic resin composition which is a raw material of the laser-transmissible-absorptive resin members 1, 2 is preferable.

When the absorbance $a_1$ and the absorbance $a_2$ exceed the above upper limit, the both laser-transmissible-absorptive resin members 1, 2 incur energy concentration at an entering part of the laser beam L by excessively absorbing the laser beam L. Thereby dents, scorch marks and voids in the both laser-transmissible-absorptive resin members 1, 2 are incurred and poor appearance of the laser welded body 10 are incurred. When the absorbance $a_1$ and the absorbance $a_2$ are less than the above lower limit, even if the first laser-transmissible-absorptive resin member 1 as the resin member for irradiating with the laser beam is irradiated with the laser beam L, the calorific value is insufficient. Melting which suffices to weld the both laser-transmissible-absorptive resin members 1, 2 is not occurred. Thus, the laser welded body 10 cannot be obtained.

Further, the both laser-transmissible-absorptive resin members 1, 2 have lower crystallization temperature as compared with a resin member containing no nigrosine sulfate and a resin member containing nigrosine hydrochloride because the both laser-transmissible-absorptive resin members 1, 2 contain the nigrosine sulfate. Thereby the both laser-transmissible-absorptive resin members 1, 2 which thermally melt by receiving the incident laser beam L is rich in fluidity. Therefore even when interspace due to surface roughness of the both laser-transmissible-absorptive resin members 1, 2 is formed at the contacted part N, the thermally melted laser-transmissible-absorptive resin members 1, 2 are flowed into the interspace and thus, the interspace is reliably filled up. In the result, the laser welded body 10 which is strongly welded is formed. A sulfate ion concentration of the nigrosine sulfate is 0.3 to 5.0% by mass and preferably 0.5 to 3.5% by mass. Further, the nigrosine sulfate brings high luster to the surface of the both laser-transmissible-absorptive resin members 1, 2. The nigrosine sulfate has the features as the crystallization temperature decreasing agent, the fluidity improving agent and the surface luster improving agent relative to the thermoplastic resin. A melt flow rate of the both laser-transmissible-absorptive resin members 1, 2 is a range of 10 to 50 g/10 minutes, preferably 11 to 30 g/10 minutes, more preferably 12 to 20 g/10 minutes and even more preferably 13 to 18 g/10 minutes.

Processes for producing the laser welded body 10 comprises, for example, following steps from A to D.

Step A: A laser-transmissible-absorptive resin composition which contains at least the thermoplastic resin and the nigrosine sulfate having the sulfate ion concentration of 0.3 to 5.0% by mass and is for forming the first laser-transmissible-absorptive resin member 1 is prepared. The laser-transmissible-absorptive resin composition may optionally contain additives and the coloring agents. A content of the nigrosine sulfate is adjusted on the basis of an original absorbance of the thermoplastic resin so that the absorbance $a_1$ falls within the range of 0.09 to 0.9. The first laser-transmissible-absorptive resin member 1 having the shape e.g. the square plate shape is molded by using a molding machine.

Step B: A laser-transmissible-absorptive resin composition for forming the second laser-transmissible-absorptive resin member is prepared in the same manner as the Step A. The second laser-transmissible-absorptive resin member 2 having the shape e.g. the square plate shape is molded by using the molding machine.

Step C: The both laser-transmissible-absorptive rein members 1, 2 are overlapped and adjoined each other to form the contacted part N. Hereat the both laser-transmissible-absorptive resin members 1, 2 may be compressed and fixed by clamping of a jig. Furthermore, an anti-reflection member such as a glass plate, an anti-reflection film or a transmissible member such as a glass plate, which does not shield and not damp the laser beam, may be used. The anti-reflection member and the transmissible member may be placed on a laser-incident face of the first laser-transmissible-absorptive resin member 1 as the subject for irradiating with the laser beam. The transmittance of the both laser-transmissible-absorptive resin members 1, 2 is 7% or more, preferably 10 to 80% and more preferably 15 to 70%.

Step D: The laser beam L set to a specific condition is radiated from a side of the first laser-transmissible-absorptive resin member 1 while moving toward the X direction so as to reach the second laser-transmissible-absorptive resin member 2 through the contacted part N. First, the laser beam L enters into the first laser-transmissible-absorptive resin member 1. A part of the laser beam L is transmitted through the first laser-transmissible-absorptive resin member 1. The other part thereof is absorbed into the first laser-transmissible-absorptive resin member 1 and generates heat thereto. The first laser-transmissible-absorptive resin member 1 generates heat at the portion which has absorbed the laser beam L over the melting point or more of the thermoplastic resin which is contained therein. The first laser-transmissible-absorptive resin member 1 melts at the inner part thereof into an approximately cylindrical shape along the incident laser beam L. The molten portion is a liquid state. The laser beam L, which is transmitted through the first laser-transmissible-absorptive resin member 1, enters into the second laser-transmissible-absorptive resin member 2 from the contacted part N and is absorbed thereinto. The second laser-transmissible-absorptive resin member 2 melts at the contacted part N. The melting grows toward the non-incident face of the laser beam L in the second laser-transmissible-absorptive resin member 2. In the result, a molten pool is formed into a part of the both laser-transmissible-absorptive resin members 1, 2 as if a liquid resin in a molten state has been accumulated.

The both laser-transmissible-absorptive resin members 1, 2 have the low crystallization temperature and the high fluidity because they contain nigrosine sulfate having the sulfate ion concentration of 0.3 to 5.0% by mass. The both laser-transmissible-absorptive resin members 1, 2 quickly melt by the laser beam L entering thereto and thus, the molten pool is formed. Accordingly, the scan speed of the laser beam L is substantially higher than a conventional laser welding method.

The heat of the molten pool slightly radiates and conducts to a vertical direction with respect to an entering direction of the laser beam L. Thereby the molten pool is grown. The molten pool is expanded to the both laser-transmissible-absorptive resin members 1, 2 through a part of the contacted part N. When the molten pool is cooled, a molten part of the both laser-transmissible-absorptive resin members 1, 2 is solidified. Consequently, the welded part M which is expanded while bridging the both laser-transmissible-absorptive resin members 1, 2 is formed at the contacted part N. The both laser-transmissible-absorptive resin members 1, 2 are strongly bonded at the contacted part N which is welded. The laser welded body 10 is obtained.

According to such the producing method, the welded part M which is expanded to a wide area is formed by a simple method of which the laser beam L is only had to aim at the resin members which should be welded and by scanning the laser beam L at a medium and high speed. Thereby the laser welded body 10 can be produced. The laser welded body 10 having the high welding strength can be produced under practically-enough producing efficiency.

In the step D, a cooling treatment of blowing warm air or air at a room temperature and/or inert gas on the face into which the laser beam L enters may be performed. When gas is generated from the both laser-transmissible-absorptive resin members 1, 2 due to laser-welding, the gas may be cleaned by using a gas treatment apparatus.

Another embodiment of the laser welded body 10 using the first laser-transmissible-absorptive resin member 1 and the second laser-transmissible-absorptive resin member 2, and the laser welded body 10 using only the first laser-transmissible-absorptive resin member 1 will be explained while referring to FIGS. 2 to 7. The absorbance $a_1$ of the first laser-transmissible-absorptive resin member 1 and the absorbance $a_2$ of the second laser-transmissible-absorptive resin member 2 have the values of the same range as the above.

FIG. 2(a) shows a schematic cross sectional view showing a scene from producing another laser welded body 10. The laser welded body 10 has a butted part B as the adjoined part where ends of the both laser-transmissible-absorptive resin members 1, 2 have adjoined by butting them while facing each other. The laser beam L is radiated from directly above the butted part B toward it. The both laser-transmissible-absorptive resin members 1, 2 therefore are integrated by welding at the butted part B and form the laser welded body 10.

FIG. 2(b) shows a schematic cross sectional view showing a scene from producing another laser welded body 10. The first laser-transmissible-absorptive resin member 1 as the resin member for irradiating with the laser beam is divided into a first laser-transmissible-absorptive resin member piece 1a and a first laser-transmissible-absorptive resin member piece 1b and they are butted. As the contacted part N, a contacted part $N_{1a-2}$ of the first laser-transmissible-absorptive resin member piece 1a and the second laser-transmissible-absorptive resin member 2, and the contacted part $N_{1b-2}$ of the first laser-transmissible-absorptive resin member piece 1b and the second laser-transmissible-absorptive resin member 2 are formed because the both laser-transmissible-absorptive resin members 1, 2 are overlapped. The ends of the first laser-transmissible-absorptive resin member pieces 1a, 1b are adjoined by butting. In the laser welded body 10, the butted part B is formed vertically to the contacted parts $N_{1a-2}$, $N_{1b-2}$. The first laser-transmissible-absorptive resin member pieces 1a, 1b and the second laser-transmissible-absorptive resin member 2 have a same external size and an external shape. The laser-transmissible-absorptive resin member 1 is projected at both edges of the laser-transmissible-absorptive resin member 2. An absorbance $a_{1-1}$ of the first laser-transmissible-absorptive resin member piece 1a and an absorbance $a_{1-2}$ of the first laser-transmissible-absorptive resin member piece 1a may be the same or different as long as these are ranged within 0.09 to 0.9 which is the absorbance $a_1$ of the first laser-transmissible-absorptive resin member 1. The laser beam L from directly above the butted part B toward it is radiated. The both laser-transmissible-absorptive resin member pieces 1a, 1b are welded at the butted part B, and further the both laser-transmissible-absorptive resin members 1, 2 are welded at the contacted parts $N_{1a-2}$, $N_{1b-2}$. Consequently, the laser welded body 10 which is welded at the butted part B and the contacted parts $N_{1a-2}$, $N_{1b-2}$ is formed.

FIG. 2(c) shows a schematic cross sectional view showing a scene from producing another laser welded body 10. The first laser-transmissible-absorptive resin member 1 which is the subject adapted to be irradiated with the laser beam is located on an upper side. The second laser-transmissible-absorptive resin member 2 is located on a lower side. The second laser-transmissible-absorptive resin member 2 is divided into a second laser-transmissible-absorptive resin member piece 2a and a second laser-transmissible-absorptive resin member piece 2b, and they are butted. By overlapping the both laser-transmissible-absorptive resin members 1, 2, a contacted part $N_{1-2a}$ of the first laser-transmissible-absorptive resin member 1 and the second laser-transmissible-absorptive resin member piece 2a is formed, and a contacted part $N_{1-2b}$ of the first laser-transmissible-absorptive resin member 1 and the second laser-transmissible-absorptive resin member piece 2b is formed. The ends of the second laser-transmissible-absorptive resin member pieces 2a, 2b are adjoined by butting. In the laser welded body 10, the butted part B is vertically formed with respect to the contacted parts $N_{1-2a}$, $N_{1-2b}$. The first laser-transmissible-absorptive resin member 1 and the second laser-transmissible-absorptive resin member pieces 2a, 2b have a same external size and an external shape. The second laser-transmissible-absorptive resin member 2 is projected from both edges of the first laser-transmissible-absorptive resin member 1. An absorbance $a_{21}$ of the second laser-transmissible-absorptive resin member piece 2a and an absorbance $a_{2-2}$ of the second laser-transmissible-absorptive resin member piece 2b may be the same or different as long as these are ranged within 0.09 to 0.9 which is the absorbance $a_2$ of the second laser-transmissible-absorptive resin member 2. The laser beam L is radiated from the side of the first laser-transmissible-absorptive resin member 1 toward the butted part B. The first laser-transmissible-absorptive resin member 1 melts at a part into which the laser beam L enters, and the second laser-transmissible-absorptive resin member 2 melts at the butted part B. In the result, the first laser-transmissible-absorptive resin member 1 and the second laser-transmissible-absorptive resin member pieces 2a, 2b are welded at the contacted parts $N_{1-2a}$, $N_{1-2b}$. The second laser-transmissible-absorptive resin member pieces 2a, 2b are welded at the butted part B. The welded part M of the laser welded body 10 is formed so as to bridge between the contacted parts $N_{1-2a}$, $N_{1-2b}$ and the butted part B. Consequently, the laser welded body 10 which is welded at the butted part B and the contacted parts N is formed.

FIG. 3(a) shows a schematic cross sectional view showing a scene from producing another laser welded body 10 having a three-layered structure. In the laser welded body 10, a laser-transmissible resin member 3, the first laser-transmissible-absorptive resin member 1 and the second laser-transmissible-absorptive resin member 2 are overlapped in this order and laser-welded. The first laser-transmissible-absorptive resin member 1 is sandwiched between the laser-transmissible resin member 3 and the second laser-transmissible-absorptive resin member 2. The laser welded body 10 has a upper contacted part $N_1$ as an overlapping interface of the laser-transmissible resin member 3 and the first laser-transmissible-absorptive resin member 1, and a lower contacted part $N_2$ as an overlapping interface of the first laser-transmissible-absorptive resin member 1 and the second laser-transmissible-absorptive resin member 2. The welded part M bridging the upper contacted part $N_1$ and the lower contacted part $N_2$ is formed.

The laser-transmissible resin member 3 is made from the thermoplastic resin which is the same kind or the different kind from the both laser-transmissible-absorptive resin members 1, 2. An absorbance b of the laser-transmissible resin member 3 is preferably 0.01 to 0.09, more preferably 0.05 to 0.09 and even more preferably 0.07 to 0.09. Such the range of the absorbance b may be obtained on the basis of an absorbance that the thermoplastic resin which is contained as a raw material of the laser-transmissible resin member 3 originally has. When the absorbance of this thermoplastic resin is less than the above lower limit, a slight amount of the laser beam absorbent such as the nigrosine sulfate is contained in a raw material composition of the laser-transmissible resin member 3. For example, the amount of the laser beam absorbent is 0.0001 to 0.01 part by mass with respect to 100 part by mass of the thermoplastic resin. Thereby the absorbance b of the above range can be brought to the laser-transmissible resin member 3. The sulfate ion concentration of the nigrosine sulfate is preferably 0.3 to 5.0% by mass. The laser-transmissible resin member 3 has the absorbance which is same as that of the first laser-transmissible-absorptive resin member 1 and the second laser-transmissible-absorptive resin member 2 or lower than that thereof. When the absorbance b is in this range, the laser-transmissible resin member 3 is transmissive through the laser beam L or is alternatively transmissive through a large part of the laser beam L and absorbs the other part thereof. Incidentally, the absorbance ratio $a_1/a_2$ of the absorbance $a_1$ to the absorbance $a_2$ is preferably 0.3 to 1.2.

Laser-welding processes in the laser welded body 10 will be explained. When the laser beam L radiates from a side of the laser-transmissible resin member 3, the laser-transmissible resin member 3 having the absorbance b is transmissive to the laser beam L or alternatively slightly absorbs the one part of the laser beam L while being transmissive to the large part thereof. The laser-transmissible resin member 3 generates heat. The laser beam L through the laser-transmissible resin member 3 is absorbed to the first laser-transmissible-absorptive resin member 1. The first laser-transmissible-absorptive resin member 1 generates heat. Thereby the molten pool by melting of the first laser-transmissible-absorptive resin member 1 and the second laser-transmissible-absorptive resin member 2 is formed at a neighborhood of the upper contacted part $N_1$. In this case, a volume of the molten pool which is formed into the first laser-transmissible-absorptive resin member 1 is larger than that of the laser-transmissible resin member 3 because the absorbance $a_1$ of the first laser-transmissible-absorptive resin member 1 is larger than the absorbance b of the laser-transmissible resin member 3.

The one part of the laser beam L transmitted through the first laser-transmissible-absorptive resin member 1 is absorbed to the second laser-transmissible-absorptive resin member 2 and brings heat and melting thereto. In the result, the molten pool is formed from the upper contacted part $N_1$ to the second laser-transmissible-absorptive resin member 2 via the upper contacted part $N_2$ while running through the first laser-transmissible-absorptive resin member 1. The molten pool is cooled and solidified. The welded part M bridging the upper contacted part $N_1$ and the lower contacted part $N_2$ is formed. The laser-transmissible resin member 3, the first laser-transmissible-absorptive resin member 1 and the second laser-transmissible-absorptive resin member 2 are integrated and the laser welded body 10 is obtained.

Incidentally, when the laser-transmissible resin member 3 contains the slight amount of the nigrosine sulfate within the range exhibiting the above absorbance b, the calorific value by entering of the laser beam L may be increased. Thereby a difference of the calorific values (a temperature difference) due to the laser beam L between the first laser-transmissible-absorptive resin member 1 and the laser-transmissible resin member 3 is reduced, and expansion of the molten pool to the laser-transmissible resin member 3 can be promoted. The welding strength between the laser-transmissible resin member 3 and the first laser-transmissible-absorptive resin member 1 can be further increased.

FIG. 3(b) shows a schematic cross sectional view showing a scene from producing another laser welded body 10. The laser welded body 10 is welded at the butted part and a plurality of the contacted part. The butted part B is formed by butting the ends of the first laser-transmissible-absorptive resin member 1 and the second laser-transmissible-absorptive resin member 2. The laser-transmissible resin member 3 as the resin member for irradiating with the laser beam overlaps the first laser-transmissible-absorptive resin member 1 and the second laser-transmissible-absorptive resin member 2 so as to cover the butted part B. Thereby the contacted part $N_{3-1}$ as an adjoined face of the laser-transmissible resin member 3 and the first laser-transmissible-absorptive resin member 1, and the contacted part $N_{3-2}$ as an adjoined face of the laser-transmissible resin member 3 and the second laser-transmissible-absorptive resin member 2 are formed. The laser beam L is radiated from the side of the laser-transmissible resin member 3 toward the butted part B. The welded part M bridging the both contacted parts $N_{3-1}$, $N_{3-2}$ and the butted part B is formed. At the both contacted part $N_{3-1}$, $N_{3-2}$ and the butted part B, the laser-transmissible resin member 3, the first laser-transmissible-absorptive resin member 1 and the second laser-transmissible-absorptive resin member 2 are welded and integrated and thus, the laser welded body 10 is formed.

FIG. 3(c) shows a schematic cross sectional view showing a scene from producing another laser welded body 10. The laser welded body 10 is welded at the butted part and a plurality of the contacted part. The first laser-transmissible-absorptive resin member 1 is divided into the first laser-transmissible-absorptive resin member piece 1a and the first laser-transmissible-absorptive resin member piece 1b, and they are butted. The ends of the first laser-transmissible-absorptive resin member pieces 1a, 1b are adjoined by butting and thus, the butted part B is formed. The laser-transmissible resin member 3 as the resin member for irradiating with the laser beam is overlapped so as to cover the butted part B. In addition, the second laser-transmissible-absorptive resin member 2 overlaps the first laser-transmissible-absorptive resin member 1 together with the laser-transmissible resin member 3 so as to sandwich the first laser-transmissible-absorptive resin member pieces 1a, 1b as the first laser-transmissible-absorptive resin member 1. A contacted part $N_{3-1a}$ as an overlapped face of which the laser-transmissible resin member 3 and the first laser-transmissible-absorptive resin member piece 1a are adjoined, a contacted part $N_{3-1b}$ as an overlapped face of which the laser-transmissible resin member 3 and the first laser-transmissible-absorptive resin member piece 1b are adjoined, a contacted part $N_{1a-2}$ as an overlapped face of which the first laser-transmissible-absorptive resin member piece 1a and the second laser-transmissible-absorptive resin member 2 are adjoined, and a contacted part $N_{1b-2}$ as an overlapped face of which the first laser-transmissible-absorptive resin member piece 1b and the second laser-transmissible-absorptive resin member 2 are adjoined are formed. The laser beam L is radiated from the side of the laser-transmissible resin member 3 toward the butted part B. The welded part M bridging the each contacted part $N_{3-1a}$, $N_{3-1b}$, $N_{1b-2}$ and the butted part B is formed. At the each contacted part $N_{3-1a}$, $N_{3-1b}$, $N_{1a-2}$, $N_{1b-2}$ and the butted part B, the laser-transmissible resin member 3, the first laser-transmissible-absorptive resin member pieces 1a, 1b and the second laser-transmissible-absorptive resin member 2 are welded and integrated and thus, the laser welded body 10 is formed.

Furthermore, the laser welded body 10 may have a four-layered structure of which the overlapped both laser-transmissible-absorptive resin members 1, 2 are sandwiched between a plurality of the laser-transmissible resin member 3. In the laser welded body 10 shown in FIG. 3(d), the upper laser-transmissible resin member 3a as a laser-irradiated subject, the laser-transmissible-absorptive resin member 1, the second laser-transmissible-absorptive resin member 2 and the lower laser-transmissible resin member 3b are overlapped in this order, and they are laser-welded. The first laser-transmissible-absorptive resin member 1 is divided into the first laser-transmissible-absorptive resin member piece 1a and the first laser-transmissible-absorptive resin member piece 1b, and they are butted. The second laser-transmissible-absorptive resin member 2 is divided into a second laser-transmissible-absorptive resin member piece 2a and a second laser-transmissible-absorptive resin member piece 2b, and they are butted. The ends of the first laser-transmissible-absorptive resin member pieces 1a, 1b are adjoined by butting, and an upper butted part $B_1$ is formed. The ends of the second laser-transmissible-absorptive resin member pieces 2a, 2b are adjoined by butting, and a lower butted part $B_2$ is formed. The both butted part $B_1$, $B_2$ are overlapped in a vertical direction. The first laser-transmissible-absorptive resin member 1 and the second laser-transmissible-absorptive resin member 2 which have the butted parts $B_1$, $B_2$ are projected at edge faces of opposite two sides of the laser-transmissible-absorptive resin member 2 because the respective resin members 1, 2, 3a, 3b have a square plate shape having the same external size.

The upper laser-transmissible resin member 3a overlaps the first laser-transmissible-absorptive resin member pieces 1a, 1b so as to cover the upper butted part $B_1$. The lower laser-transmissible resin member 3b overlaps the second laser-transmissible-absorptive resin member pieces 2a, 2b so as to cover the lower butted part $B_2$. Further, the first laser-transmissible-absorptive resin member piece 1a and the second laser-transmissible-absorptive resin member piece 2a are overlapped each other. The first laser-transmissible-absorptive resin member piece 1b and the second laser-transmissible-absorptive resin member piece 2b are overlapped each other. The laser welded body 10 has a contacted part $N_{3a-1a}$ as an overlapping interface of the upper laser-transmissible resin member 3a and the first laser-transmissible-absorptive resin member piece 1a; a contacted part $N_{3a-1b}$ as an overlapping interface of the upper laser-transmissible resin member 3a and the first laser-transmissible-absorptive resin member piece 1b; a contacted part $N_{1a-2a}$ as an overlapping interface of the first laser-transmissible-absorptive resin member piece 1a and the second laser-transmissible-absorptive resin member piece 2a; a contacted part $N_{1b-2b}$ as an overlapping interface of the first laser-transmissible-absorptive resin member piece 1b and the second laser-transmissible-absorptive resin member piece 2b; a contacted part $N_{2a-3b}$ as an overlapping interface of the second laser-transmissible-absorptive resin member piece 2a and the lower laser-transmissible resin member 3b; and a contacted part $N_{2b-3b}$ as an overlapping interface of the second laser-transmissible-absorptive resin member piece 2b and the lower laser-transmissible resin member 3b.

The laser beam L is radiated from the side of the upper laser-transmissible resin member 3a toward the both butted parts $B_1$, $B_2$. The welded part M bridging the both butted parts $B_1$, $B_2$, and the contacted parts $N_{3a-1a}$, $N_{3a-1b}$, $N_{1a-2a}$, $N_{1b-2b}$, $N_{2a-3b}$ and $N_{2b-3}$ is formed. At these parts, the upper laser-transmissible resin member 3a, the first laser-transmissible-absorptive resin member 1, the second laser-transmissible-absorptive resin member 2 and the lower laser-transmissible resin member 3b are welded and integrated and thus, the laser welded body 10 is formed.

The resin member composing the laser welded body 10 may be single. The resin member is molded so as to have any shapes. Thereby the shape of the laser welded body 10 may be a roll shape, a cylindrical shape, a prismatic shape and a boxed shape which are curved or bent. For example, the laser welded body 10 shown in FIG. 4(a) only has the first laser-transmissible-absorptive resin member 1 as the single resin member. The first laser-transmissible-absorptive resin member 1 is mountain-folded at four parts so as to form a tubular shape having both opened ends. The butted part B is formed by butting and adjoining the ends thereof. The laser welded body 10 is welded at the butted part B because the butted part B is irradiated with the laser beam L.

As shown in FIG. 4(b), the laser welded body 10 may have the contacted part N. The first laser-transmissible-absorptive resin member 1 is mountain-folded at the four parts so as to form the tubular shape having both opened ends, and a part thereof is overlapped and adjoined. Thereby the contacted part N is formed. On the face of the first laser-transmissible-absorptive resin member 1, the laser beam L scans along a X direction (referring to FIG. 1(a), a depth direction in FIG. 4(b)) and also scans in a Y direction (directions to right and left in FIG. 4(b)) which intersects with it at right angles. The welded part M is formed over a wide area of the first laser-transmissible-absorptive resin member 1. A large welded area can be formed in the contacted part N. In the result, the first laser-transmissible-absorptive resin member 1 is welded at the contacted part N with the strong strength. Even if the laser welded body 10 receives external force such as bending and twisting, the laser-welded part thereof is difficult to unstick.

As shown in FIG. 4(c), the laser welded body 10 may have the contacted part N where the laser-transmissible resin member 3 and the first laser-transmissible-absorptive resin member 1 are adjoined. The laser-transmissible resin member 3 as the laser-irradiated subject is overlapped so as to cover the butted part B of the first laser-transmissible-absorptive resin member 1 having the tubular shape. The laser-transmissible resin member 3 has the same absorbance b as it shown in FIG. 3. The laser beam L is radiated from the side of the laser-transmissible resin member 3 toward the butted part B. Thereby the laser welded body 10 is laser-welded at the butted part B and the contacted part N. Therefore the laser welded body 10 of which the resin members are further strongly welded can be produced because not only the butted part B but also the contacted part N are laser-welded.

FIG. 5(a) shows a schematic cross sectional view showing a scene from producing another laser welded body 10. The laser welded body 10 has the butted part B which is formed by the end of the first laser-transmissible-absorptive resin member 1 butting into against a one face of the second laser-transmissible-absorptive resin member 2. The laser beam L is directly radiated from directly above the butted part B toward it. Thereby the welded part M which is expanded to a thickness direction of the first laser-transmissible-absorptive resin member 1 and a planer direction of the second laser-transmissible-absorptive resin member 2 is formed. The both laser-transmissible-absorptive resin members 1, 2 are laser-welded at the butted part B. As two-dot chain lines shown therein, the laser beam L may be vertically radiated from the side of the laser-transmissible-absorptive resin member 2 relative to the butted part B. According to it, the laser welded body 10 of which the laser-transmissible-absorptive resin members 1, 2 are further strongly welded can be obtained because the welded part M is formed in not only the planer direction of the first laser-transmissible-absorptive resin member 1 but also the thickness direction of the second laser-transmissible-absorptive resin member 2. For example, when a use of the laser welded body is a container, the laser welded body which is strongly welded so as to not leak contents by repeating butt-welding and overlap-welding can be obtained.

In addition, as shown in FIG. 5(b), the laser welded body 10 may be laser-welded at the contacted part N. At the contacted part N, a one face of the first laser-transmissible-absorptive resin member 1 having the plate shape and the second laser-transmissible-absorptive resin member 2 having a L shape are overlapped and adjoined so as to stack. Using the first laser-transmissible-absorptive resin member 1 as the laser-irradiated subject, the laser beam L may be radiated from the side of the first laser-transmissible-absorptive resin member 1 to the contacted part N, may be radiated toward the contacted part N which is exposed at ends of the both laser-transmissible-absorptive resin members 1, 2, or alternatively may be radiated from the second laser-transmissible-absorptive resin member 2 to the contacted part N. For example, when a use of the laser welded body is a container, the laser welded body which is strongly welded so as to not leak contents by repeating the butt-welding and the overlap-welding can be obtained.

Furthermore as shown in FIG. 5(c), the laser welded body 10 has the first laser-transmissible-absorptive resin member 1 including a margin part 1c as a stepped shape projected at a part of a one face of a rectangular parallelepiped by having a cutout of a L shape in a side of the rectangular parallelepiped and the second laser-transmissible-absorptive resin member 2 which has a plate shape and fits a stepped part of the margin part so as to be butted thereto. The laser welded body 10 may be laser-welded at the margin part 1c. In this case, the laser welded body 10 has the butted part B formed by butting the end of the second laser-transmissible-absorptive resin member 2 and the stepped part of the margin part 1c and the contacted part N continuously formed at the butted part B by overlapping the both laser-transmissible-absorptive resin members 1, 2. A width of the step of the margin part 1c and the thickness of the second laser-transmissible-absorptive resin member 2 are same. Thereby the margin part 1c and a one face of the second laser-transmissible-absorptive resin member 2 are a continuous planer face. The butted part B is exposed at the continuous planer face. Using the first laser-transmissible-absorptive resin member 1 as the laser-irradiated subject, the laser beam L is radiated from the side of the first laser-transmissible-absorptive resin member 1 to the butted part B. The both first laser-transmissible-absorptive resin members 1, 2 are laser-welded at the margin part 1c. The laser beam L may be directly radiated from a direction that extends the butted part B to an external side of the laser welded body 10. Alternatively, using the second laser-transmissible-absorptive resin member 2 as the laser-irradiated subject, the laser beam L may be radiated from a vertical direction with respect to the contacted part N to the contacted part N. For example, when a use of the laser welded body is a container, the laser welded body which is strongly welded so as to not leak contents by repeating the butt-welding and the overlap-welding can be obtained.

As shown in FIG. 5(d), in the laser welded body 10, the first laser-transmissible-absorptive resin member 1 and the second laser-transmissible-absorptive resin member 2 may respectively have the margin part 1c and the margin part 2c of the stepped shape which is alternately fitted. By the fitting of the both margin parts 1c, 2c, the first laser-transmissible-absorptive resin member 1 and the second laser-transmissible-absorptive resin member 2 are fitted at a right angle. The laser welded body 10 forms the L shape as a whole. By fitting of the both margin parts 1c, 2c, the upper butted part $B_1$ and the lower butted part $B_2$ by butting and adjoining the first laser-transmissible-absorptive resin member 1 and the second laser-transmissible-absorptive resin member 2, and the contacted part N by overlapping and adjoining the first laser-transmissible-absorptive resin member 1 and the second laser-transmissible-absorptive resin member 2 are formed. The upper butted part $B_1$, the contacted part N and the lower butted part $B_2$ are continuously connected in this order. Using the first laser-transmissible-absorptive resin member 1 as the laser-irradiated subject, the laser beam L is radiated so as to aim at the contacted part N. In addition to this, the laser beam L may be radiated from directly above the upper butted part $B_1$ toward it. Alternatively, using the second laser-transmissible-absorptive resin member 2 as the laser-irradiated subject, the laser beam L may be radiated from the vertical direction with respect to the upper butted part $B_1$ and the lower part $B_2$ toward them. For example, when a use of the laser welded body is a container, the laser welded body which is strongly welded so as to not leak contents by repeating the butt-welding and the overlap-welding can be obtained.

As shown in FIG. 5(e), in the laser welded body 10, the first laser-transmissible-absorptive resin member 1 may have the margin part 1c having the stepped shape, and the second laser-transmissible-absorptive resin member 2 may have a concave part 2e fitting into the margin part 1c while covering it. The first laser-transmissible-absorptive resin member 1 and the second laser-transmissible-absorptive resin member 2 are fitted at a right angle because the concave part 2e is fitted into the margin part 1c. The laser welded body 10 forms the L shape as a whole. By fitting of the margin part 1c and the concave part 2e, the upper butted part $B_1$ and the lower butted part $B_2$ by butting and adjoining the first laser-transmissible-absorptive resin member 1 and the second laser-transmissible-absorptive resin member 2, and the contacted part N by overlapping and adjoining the first laser-transmissible-absorptive resin member 1 and the second laser-transmissible-absorptive resin member 2 are formed. The upper butted part $B_1$, the contacted part N and the lower butted part $B_2$ are continuously connected in this order. The laser beam L is directly radiated from directly above the upper butted part $B_1$, toward it. In addition to this, using the second laser-transmissible-absorptive resin member 2 as the laser-irradiated resin member, the laser beam L may be radiated from the vertical direction with respect to the contacted part N and the lower butted part $B_1$ toward them. For example, when a use of the laser welded body is a container, the laser welded body which is strongly welded so as to not leak contents by repeating the butt-welding and the overlap-welding can be obtained.

As shown in FIGS. 5(a) to (e), in the laser welded body 10, the resin members are continuously, reliably and strongly laser-welded by the laser radiation from the multiple directions, even when each of the laser-transmissible-absorptive resin members 1, 2 are intricately fitted or alternatively they have the contacted parts and the butted parts which are continuous so as to alternately repeat them by having complex shapes. Therefore in the laser welded body 10, flexibility in the design of resin parts using it is increased dramatically. Incidentally, the both laser-transmissible-absorptive resin members 1, 2 which composes the laser welded body 10 shown therein preferably have the absorbances $a_1$, $a_2$ of the same value ($a_1=a_2$) each other. According to it, when the both laser-transmissible-absorptive resin members 1, 2 are the same shape, the both laser-transmissible-absorptive resin members 1, 2 are not needed to distinguish in the producing processes of the laser welded body 10. The producing processes of the laser welded body 10 can be simplified.

FIG. 6(a) shows a schematic cross sectional view showing a scene from producing another laser welded body 10. The first laser-transmissible-absorptive resin member 1 which has a cylindrical shape having both opened ends has a body 1e and an inserting margin part 1d which has an outer diameter diametrically shrunk than the body 1e and has an inserting margin 1d along an opening edge of a one end thereof. The inserting margin 1d has a stepped part $1d_1$ and an inserting part $1d_2$. The stepped part $1d_1$ dents at a right angle toward an inner periphery of the first laser-transmissible-absorptive resin member 1 having the cylindrical shape on an outer periphery thereof. The inserting part $1d_2$ vertically extends from the stepped part $1d_1$ toward a lower side. The outer diameter of the laser-transmissible-absorptive resin member 1 diametrically shrinks at the stepped part $1d_1$. In addition, the second laser-transmissible-absorptive resin member 2 having a cylindrical shape having both opened ends has a fitting margin 2d along an opening edge of a one end thereof. The fitting margin 2d has an opening edge $2d_1$ and a fitting part $2d_2$. The opening edge $2d_1$ dents at a right angle toward an outer periphery of the second laser-transmissible-absorptive resin member 2 having the cylindrical shape on an inner periphery thereof. The fitting part $2d_2$ vertically extends from the opening edge $2d_1$ toward an upper side. An inner diameter of the second laser-transmissible-absorptive resin member 2 diametrically expands at the fitting margin 2d. An outer diameter of the inserting part $1d_2$ is slightly smaller than the inner diameter of the fitting part $2d_2$. The both laser-transmissible-absorptive resin members 1, 2 are fitted so as to have play between the inserting part $1d_2$ and the fitting part $2d_2$. The play allows them to be removed therefrom and inserted thereinto. The stepped part $1d_1$ and the opening edge $2d_1$ are the same width. Thereby, when the both laser-transmissible-absorptive resin members 1, 2 are fitted at the both margins 1d, 2d, the cylindrical shape in which the both laser-transmissible-absorptive resin members 1, 2 have been connected is formed. The cylindrical shape has the outer periphery smoothly curving and having no difference in level. The radiation of the laser beam L which aims at the both margins 1d, 2d so as to go around the outer periphery of this cylinder is performed.

FIG. 6(b) shows an enlarged vertical cross sectional view of FIG. 6(a). By fitting of the both margins 1d, 2d, an upper contacted part N1 and a lower contacted part N2 by overlapping and adjoining the first laser-transmissible-absorptive resin member 1 and the second laser-transmissible-absorptive resin member 2, and the butted part B by butting and adjoining the first laser-transmissible-absorptive resin member 1 and the second laser-transmissible-absorptive resin member 2 are formed. The upper contacted part $N_1$, the butted part B and the lower contacted part $N_2$ are continuously connected in this order. The laser beam L may be directly radiated from a direction that extends the butted part B to an external side of the laser welded body 10 toward the butted part B. Thereby the both laser-transmissible-absorptive resin members 1, 2 are laser-welded at the upper contacted part $N_1$. Further, shown in FIG. 6(*b*), as two-dot lines shown therein, using the second laser-transmissible-absorptive resin member 2 as the laser-irradiated resin member, the radiation of the laser beam L may be applied to the butted part B and the lower contacted part $N_2$. According to it, the laser welded body 10 of which the both laser-transmissible-absorptive resin members 1, 2 are further strongly welded can be obtained because the both margins 1*d*, 2*d* are laser-welded in the whole faces.

FIG. 7(*a*) shows a schematic cross sectional view showing a scene from producing another laser welded body 10. The both laser-transmissible-absorptive resin members 1, 2 which has a cylindrical shape having both opened ends have no margins, and the butted part B adjoining at opening edges thereof may be formed by butting the ends thereof. The radiation of the laser beam L is performed along the butted part B so as to go around it. Thereby, the laser welded body 10 can be obtained.

Furthermore, as shown in FIG. 7(*b*), the laser-transmissible resin member 3 which has a ring shape and is as the resin member for irradiating with a laser beam may wrap around the butted part B which have been formed by butting opening edges of the both laser-transmissible-absorptive resin members 1, 2 having a cylindrical shape. The laser-transmissible resin member 3 has the same absorbance b as it shown in FIG. 3. An upper contacted part $N_1$ by overlapping the laser-transmissible resin member 3 and the first laser-transmissible-absorptive resin member 1 is formed. A lower contacted part $N_2$ by overlapping the laser-transmissible resin member 3 and the second laser-transmissible-absorptive resin member 2 is formed. The radiation of the laser beam L is performed from a side of the laser-transmissible resin member 3 toward the butted part B so as to go around it. Thereby the laser-transmissible resin member 3, the first laser-transmissible-absorptive resin member 1 and the second laser-transmissible-absorptive resin member 2 are integrated and thus, the laser welded body 10 can be obtained.

Figure 8:
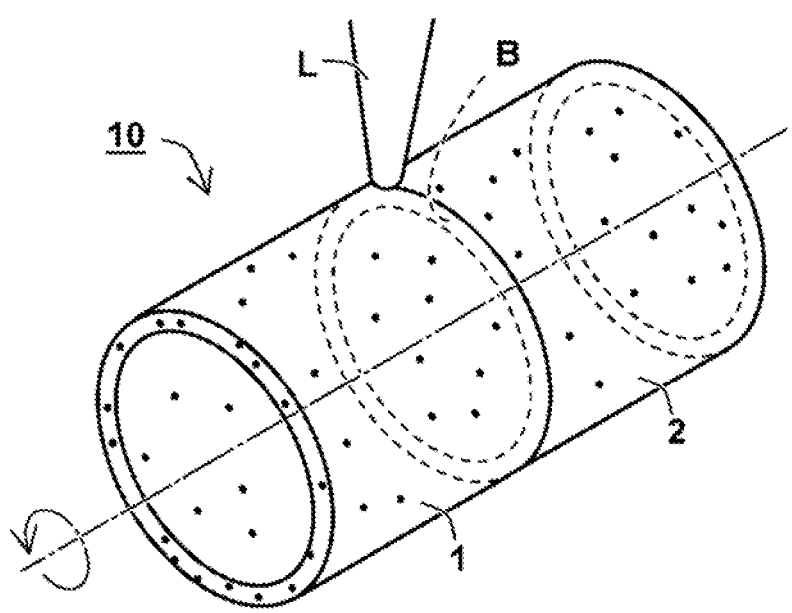
FIG. 8 is a schematic cross sectional view showing a scene from producing another laser welded body to which the present invention is applied.
Figure 10:
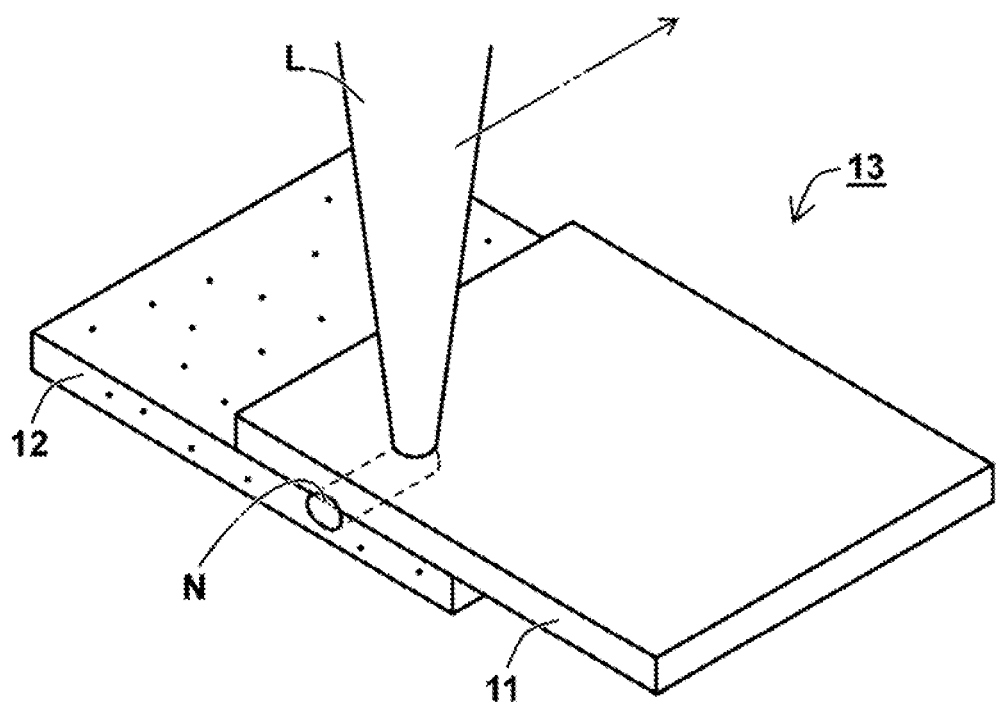
FIG. 10 is a perspective view showing a scene from producing a conventional laser welded body outside the present invention.

The method for obtain the laser welded body by scanning the laser beam L on the laser-transmissible-absorptive resin member have been shown in FIG. 7. On the other hand, the laser welded body may be produced by radiating the laser beam L from a fixed radiation source and turning around or transferring the laser-transmissible-absorptive resin member so as to scan it along a part of the laser-transmissible-absorptive resin member which needs to adhere. For example, as shown in FIG. 8, first, the butted part B is formed by butting both opening ends of the both laser-transmissible-absorptive resin members 1, 2. While making to spin around the resin members in a circumference direction and fixing a central axis thereof, the butted part B is irradiated with the laser beam L radiating from the fixed radiation source. Thereby the laser beam L is scanned along the butted part B. The both laser-transmissible-absorptive resin members 1, 2 are welded at the butted part B and thus, the laser welded body 10 can be obtained. Output power and a frequency of the laser beam L, and a quantity of turning and transferring of the laser-transmissible-absorptive resin members (i.e. the scan speed of the laser beam L) is optionally determined depending on an external shape of the laser-transmissible-absorptive resin members which needs to weld and shapes of the butted part B and the contacted part N. The laser welded body 10 which is welded in desired tensile strength can be produced.

As the laser beam L, the infrared ray ranging from 800 to 1600 nm that is a longer wavelength as compared with visible radiation, preferably, an oscillation wavelength ranging from 800 to 1100 nm may be used. As examples of the laser beam, a solid laser (Nd: yttrium aluminum garnet (YAG) excitation and/or semiconductor laser excitation), a semiconductor laser, a tunable diode laser, a titanium-sapphire laser (Nd: YAG excitation) are preferably used. For other examples, a halogen lamp or a xenon lamp that generate the infrared ray having the wavelength of 700 nm or more may be used. In addition, the radiation of the laser beam L may be vertically performed and may be performed at an angle relative to the face of the resin member for irradiating with the laser beam, and may be performed at a single direction or multiple directions.

When the halogen lamp generating the infrared ray having wavelength of 700 nm or more is used, for example, halogen lamps which are arranged in a band form are exemplified. Examples of a laser radiation procedure are a scanning type that the radiation of the laser beam may be broadly performed by moving the lamp; a masking type that the resin members which should be welded move; and a simultaneous radiation type that the lamps simultaneously illuminate the resin members which should be welded from multiple directions. Each condition such as a radiation width of the infrared ray, a radiation time thereof, radiation energy thereof and the like can be adjusted properly. The halogen lamp has an energy distribution centering on near infrared region, so the energy exists at a shorter wavelength side of the energy distribution, that is to say a visible region. In such a case, the energy of the visible region may be shielded by using e.g. a cut-off filter because welding scars may be made on the surface of the resin member which is irradiated with the ray.

An absorption coefficient $\varepsilon_d$ (ml/g·cm) of the nigrosine sulfate as the laser beam absorbent is 1000 to 8000 (ml/g·cm), preferably 1000 to 6000 (ml/g·cm), more preferably 3000 to 6000 (ml/g·cm). A measuring procedure of the absorption coefficient (absorptivity) $\varepsilon_d$ as follows. The laser beam absorbent in an amount of 0.05 g is precisely weighed and is dissolved into solvent such as N, N-dimethylformamide (DMF) by using a 50 ml type measuring flask. By using the 50 ml type measuring flask, 1 ml of the resultant solution is diluted with DMF. A measuring sample is prepared. Then the absorbance of the measuring sample is measured by using a spectrophotometer (manufactured from Shimadzu Corporation, tradename: UV1600PC).

Coloring of the thermoplastic resin is performed for the purpose of a decorative effect, a color classification effect, improvement of light resistance of a molded product and protection or masking of contents. A black-coloring is strongly demanded in the industry. The coloring by an oil soluble dye is suitable because the oil soluble dye exhibits a good dispersibility and compatibility with respect to the resin. In particular, the nigrosine and a processed product thereof, which can be used as the black coloring agent and as the laser beam absorbent and can bring the higher bonding strength, is preferably used.

As nigrosine, black azine-based condensation mixtures described in Color Index as C.I. Solvent Black 5 and C.I. Solvent Black 7 are exemplified. In the view of an effect which increases fluidity of the thermoplastic rein, C.I. Solvent Black 5 is more preferable. The nigrosine is synthesized through dehydrating and condensing, and oxidizing e.g. aniline, aniline hydrochloride and nitrobenzene at 160 to 180° C. of a reaction temperature in the presence of iron chloride.

According to a system using the iron chloride of the nigrosine as a raw material, nigrosine hydrochloride is produced because the reaction proceeds in the presence of the iron chloride and/or excessive hydrochloride. A method for producing the nigrosine sulfate from the nigrosine hydrochloride is not restricted as long as entire chloride ion or corresponded parts thereof are replaced with sulfate ion, a known reaction method may be used. Incidentally, the nigrosine sulfate is not a water soluble black dye belonging to C.I. Acid Black 2 but is an oil soluble black dye belonging to C.I. Solvent Black 5.

The method for producing the nigrosine sulfate includes, specifically, for example, dispersing the nigrosine into dilute sulfuric acid and suitably heating it (e.g. 50 to 90° C.). In addition, for example, the nigrosine sulfate may be produced through the steps of dispersing a condensation reaction solution obtained by producing the nigrosine into dilute sulfuric acid and the steps of suitably heating it (e.g. 50 to 90° C.). Furthermore, for example, the nigrosine sulfate may be produced through the steps of dissolving the nigrosine in concentrated sulfuric acid while maintaining a temperature of a reaction solution at a low temperature so as to prevent sulfonation and the steps of adding the resultant solution into a large amount of ice water to deposit a crystal. As regards to the obtained crystal of the nigrosine sulfate, a drying step may be performed after a washing and purifying step.

In the nigrosine sulfate, when the sulfate ion concentration thereof is 0.3 to 5.0% by mass, preferably 0.3 to 3.5% by mass, a decreasing effect of the crystallization temperature is large and thus, the laser-welding can be simply and stably performed. The sulfate ion concentration in the nigrosine sulfate is measured through instrumental analysis by using ion chromatography after extracting the sulfate ions from a sample of the nigrosine. In the producing processes for the nigrosine sulfate, since impurities, inorganic salts and the like in a raw nigrosine sulfate are removed, insulation of the nigrosine sulfate is increased. Accordingly, this nigrosine sulfate is preferably used for materials of articles, which require the insulation with an emphasis, such as electrical parts and electronic parts etc. Volume resistivity of the nigrosine sulfate is $1.0 \times 10^9$ $\Omega \cdot cm$ or more, preferably $5.0 \times 10^9$ to $7.0 \times 10^{11}$ $\Omega \cdot cm$, more preferably $8.0 \times 10^9$ to $1.0 \times 10^{11}$ $\Omega \cdot cm$, even more preferably $1.0 \times 10^{10}$ to $1.0 \times 10^{11}$ $\Omega \cdot cm$. The volume resistivity of the nigrosine sulfate is obtained as follows. A sample is prepared by measuring an amount of the nigrosine sulfate. The sample is solidified by loading 200 kgf. A volume of the sample is measured. The volume resistivity of the sample is measured by using a digital ultrahigh resistance/microcurrent ampere meter (manufactured by ADC CORPORATION, tradename: 8340A).

In addition, a step of heating the nigrosine which has been obtained as above under reduced pressure is included, and a purified nigrosine which is obtained thereby may be used. As such the nigrosine, purified aniline including less than 0.1% of aniline and diphenyl amine is exemplified. As such the nigrosine, NUBIAN (registered trademark) BLACK series is commercially available. A preferred concentration of the aniline in the nigrosine is e.g. 0.1% by mass or less, preferably 0.005 to 0.08% by mass.

A content of the laser beam absorbent such as the nigrosine adjusting the absorbance $a_1$ and the absorbance $a_2$ is 0.01 to 0.2% by mass, preferably 0.01 to 0.1% by mass in the both laser-transmissible-absorptive resin members 1, 2. When the content is less than 0.01% by mass, the absorbance $a_1$ and the absorbance $a_2$ do not meet the above lower limit. The calorific value of the both laser-transmissible-absorptive resin members 1, 2 absorbing the one part of the laser beam L is too little and thus, a temperature thereof insufficiently rises. The welding at the butted part B and the contacted part N is insufficient. In a result, the bonding strength between the both laser-transmissible-absorptive resin members 1, 2 is insufficient. In addition, when the content is higher than 0.2% by mass, the absorbance $a_1$ and the absorbance $a_2$ exceed than the above upper limit. Thereby, only the first laser-transmissible-absorptive resin member 1 as the laser-irradiated subject excessively absorbs the energy, generates heat and melts because a laser beam transmittance of the both laser-transmissible-absorptive resin members 1, 2 is significantly decreased. The both laser-transmissible-absorptive resin members 1, 2 are not uniformly welded and thus, the high bonding strength is not obtained. When the laser-irradiated subject located on an entering side of the laser beam excessively absorbs the energy of the laser beam, resin characteristics such as physical and chemical characteristics coming from the thermoplastic resin which is the raw material thereof is easily lost.

The thickness of the resin members 1, 2, 3 is preferably 200 to 5000 μm, more preferably 500 to 4000 μm and even more preferably 700 to 3500 μm. When the thickness is less than 200 μm, control of the energy of the laser beam is difficult. When too much or too little thermal fusing is occurred at the time of laser-welding, a break is occurred by excessive heat, or the bonding strength is insufficiently obtained by too little heat. In contrast, when the thickness is thicker than 5000 μm, a distance to the portion should be welded is far. The laser beam entering into the second laser-transmissible-absorptive resin member 2 is damped without reaching to the internal part thereof. The bonding strength is insufficiently obtained. When the thickness of the both laser-transmissible-absorptive resin members 1, 2 is 800 to 3000 μm, the molten pool needed to welded is sufficiently formed. It is even more preferable on the point of the view of industrially stable performance of the laser-welding.

The thermoplastic resin contained in the respective resin members 1, 2, 3 is freely selected as long as the laser beam is absorbed and/or transmitted and the laser beam absorbent can be contained therein. As the thermoplastic resin, a thermoplastic resin which is used as a dispersant of pigments and a thermoplastic resin which is used as a carrier of masterbatches or colored pellets are exemplified.

Specifically, the thermoplastic resin is exemplified as follows. A polyphenylene sulfide resin (PPS); a polyamide resin (NYLON (registered trademark), PA); a polyolefin resin such as a polyethylene resin (PE) and a polypropylene resin (PP); a polystyrene resin (PS); a polymethylpentene resin; a methacryl resin; an acryl polyamide resin; an ethylene vinyl alcohol (EVOH) resin; a polycarbonate resin; a polyester resin such as a polyethylene terephthalate resin (PET) and a polybutylene terephthalate resin (PBT); a polyacetal resin; a polyvinyl chloride resin; an aromatic vinyl resin; a polyvinylidene chloride resin; a polyphenylene oxide resin; a polyarylate resin; a polyallyl sulfone resin; an acrylic resin such as an acyclic polyamide resin and a polymethylmethacrylate resin (PMMA); a fluorocarbon resin; and a liquid crystalline polymer. These resins may be used individually or alternatively two or more resins may be used in combination.

The thermoplastic resin may be a copolymer resin in which two or more kinds of monomers forming it are bonded. For example, an AS (acrylonitrile-styrene) copolymer resin, an ABS (acrylonitrile-butadiene-styrene) copolymer resin, an AES (acrylonitrile-EPDM-styrene) copolymer resin, a PA-PBT copolymer resin, a PET-PBT copolymer resin, a PC-PBT copolymer resin, a PS-PBT copolymer resin and a PC-PA copolymer resin are exemplified. In addition, a thermoplastic elastomer such as a polystyrene-based thermoplastic elastomer, a polyolefin-based thermoplastic elastomer, a polyurethane-based thermoplastic elastomer and a polyester-based thermoplastic elastomer; synthetic wax or natural wax that contains the above-mentioned resins as the main component are exemplified. Incidentally, molecular weight of the thermoplastic resins is not intended to be restricted. As the thermoplastic resin, the above-mentioned resin may be used individually or two or more kinds thereof.

It is preferable that the thermoplastic resin is the polyamide resin; the polycarbonate resin; the polypropylene resin; the polyester resin such as the polybutylene terephthalate resin; and the polyphenylene sulfide resin. In these resins, the polyamide resin and the polycarbonate resin are more preferable on the point of view of exhibiting good compatibility with the laser beam absorbent such as the nigrosine.

The polyamide resin used for the present invention refers to a polyamide polymer which has acid amide groups (—CONH—) in the molecular thereof and can be molten by heating. The preferred polyamide resin is the polyamide resin which contains salts as a constitutional unit (a). The salts are at least one selected from the group consisting of salt made of aliphatic diamine and aromatic dicarboxylic acid, and salt made of aromatic diamine and aliphatic dicarboxylic acid. A ratio of the constitutional unit (a) to whole constitutional unit of the polyamide resin is preferably 30% by mole or more, further preferably 40% by mole or more. Further specifically, various polyamide resins such as a lactam polycondensation product, a polycondensation product of diamine and dicarboxylic acid, a polycondensation product of ω-amino carboxylic acid, or a polyamide resin copolymer and blended resin which are made from these. As the lactam which is a raw material for polycondensation of the polyamide resin, for example, ε-caprolactam, ω-laurolactam and the like are included.

As the diamine, the aliphatic diamine, alicyclic diamine, the aromatic diamine and the like such as tetramethylene diamine, pentamethylene diamine, hexamethylene diamine, octamethylene diamine, undecamethylene diamine, dodecamethylene diamine, 2-methyl pentamethylene diamine, (2,2, 4- or 2,4,4-) trimethyl hexamethylene diamine, and 5-methyl nonane methylene diamine, metaxylylene diamine (MXDA), p-xylene diamine, phenylene diamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine and aminoethyl piperazine are included.

As the dicarboxylic acid, the aliphatic dicarboxylic acid, alicyclic dicarboxylic acid and the aromatic dicarboxylic acid such as adipic acid, suberic acid, azelaic acid, sebacic acid, dodecanedioic acid, terephthalic acid, isophthalic acid, 2-chloroterephthalic acid, 2-methylterephthalic acid, 5-methylisophthalic acid, 5-sodium sulfoisophthalic acid, hexahydroterephthalic acid and hexahydroisophthalic acid are included.

As the ω-amino carboxylic acid, 6-aminocaproic acid, 11-aminoundecanoic acid, 12-amino dodecanoic acid and p-amino methyl benzoic acid are exemplified.

As the polyamide resin, polyamide 4, polyamide 6, polyamide 61, polyamide 11, polyamide 12, polyamide 46, polyamide 56, polyamide 66, polyamide 69, polyamide 610, polyamide 612, polyamide 6T, polyamide 96, polyamide 9T, amorphous polyamide, high melting point polyamide, polyamide RIM, polyamide MIX6, polyamide MXD6, polyamide MP6 and copolymers containing two or more kinds thereof etc. are included. As the copolymers, specifically, a polyamide 6/12 copolymer, a polyamide 6/66 copolymer, a polyamide 66/61 copolymer, a polyamide 61/6T copolymer, a polyamide 6/66/610 copolymer, a polyamide 6/66/11/12 copolymer and a crystalline polyamide/amorphous polyamide copolymer are included. Further, the polyamide resin may be a mixed polymer of the polyamide resin and another synthetic resin. Examples of the mixed polymer are a polyamide/polyester mixed polymer, a polyamide/polyphenyleneoxide mixed polymer, a polyamide/polycarbonate mixed polymer, a polyamide/polyolefin mixed polymer, a polyamide/styrene/acrylonitrile mixed polymer, a polyamide/acrylic acid ester mixed polymer and a polyamide/silicone mixed polymer. These polyamide resins may be used solely or plurally.

The polyphenylene sulfide (PPS) resin is a polymer mainly having repeated units of thiophenylene group represented by (-φ-S—) [(φ is a phenylene group having substitutional groups or no substitutional group]. The PPS resin is produced through polymerizing a monomer synthesized by reacting p-dichlorobenzene and alkali sulfide at a high temperature and high pressure. The PPS resin is broadly classified into two types. One type is a straight-chained type which is produced through only a polymerization process using an auxiliary initiator so as to have a desired polymerization degree. The other type is a crosslinking type which is produced through heat-crosslinking a polymer having low molecular weight in the presence of oxygen. In particular, the PPS resin of the straight-chained type is preferable because the transmissivity thereof is superior. Melting viscosity of the PPS resin is not intended to be limited as long as kneading with melting can be performed. Generally, the melting viscosity is preferably in range from 5 to 2000 Pa·s, more preferably from 100 to 600 Pa·s.

The PPS resin may be a polymer alloy. Examples of the polymer alloy are a PPS/polyolefin-based alloy, a PPS/polyamide-based alloy, a PPS/polyester-based alloy, a PPS/polycarbonate-based alloy, a PPS/polyphenylene ether-based alloy, a PPS/liquid crystal polymer-based alloy, a PPS/polyimide-based alloy and a PPS/polysulfone-based alloy. The PPS resin has chemical resistance, heat resistance and high strength and so it is preferably used for electronic parts, automotive parts and the like.

Examples of the polyester resin are the polyethylene terephthalate resin that is prepared by condensation polymerization reaction of terephthalic acid and ethylene glycol, and the polybutylene terephthalate resin that is prepared by condensation polymerization reaction of terephthalic acid and butylene glycol. Examples of another polyester resin are copolymers of which a part of a terephthalic acid component and/or a part of a glycol component is substituted with a substituent group such as an alkyl group having 1 to 4 carbon atoms. In the terephthalic acid component, the substituent group is 15% by mole or less (e.g. 0.5 to 15% by mole), preferably 5% by mole or less (e.g. 0.5 to 5% by mole), and/or in the glycol component such as the ethylene glycol and the butylene glycol, the substituent group is 15% by mole or less (e.g. 0.5 to 15% by mole), preferably 5% by mole or less (e.g. 0.5 to 5% by mole). The polyester resin may be used individually or may be used by mixing two or more kinds thereof.

As the dicarboxylic acid compound composing the polyester resin, specifically, the aromatic dicarboxylic acid or ester-formability derivatives thereof are preferably used.

Examples of the aromatic dicarboxylic acid are terephthalic acid, isophthalic acid, orthophthalic acid, 1,5-naphthalene dicarboxylic acid, 2,5-naphthalene dicarboxylic acid, 2,6-naphthalene dicarboxylic acid, biphenyl-2,2'-dicarboxylic acid, biphenyl-3,3'-dicarboxylic acid, biphenyl-4,4'-dicarboxylic acid, diphenyl ether-4,4'-dicarboxylic acid, diphenyl methane-4,4'-dicarboxylic acid, diphenyl sulfone-4,4'-dicarboxylic acid, diphenyl isopropyliden-4,4'-dicarboxylic acid, 1,2-bis(phenoxy)ethane-4,4'-dicarboxylic acid, anthracene-2,5-dicarboxylic acid, anthracene-2,6-dicarboxylic acid, p-terphenylene-4,4'-dicarboxylic acid, pyridine-2,5-dicarboxylic acid and so on. The terephthalic acid is preferably used. These dicarboxylic acids may be used by mixing two or more kinds thereof. As publicly known, dimethyl ester etc. other than free acid may be used for the polycondensation reaction as the ester-formability derivatives. Incidentally, one or more kinds of the aliphatic dicarboxylic acid and/or the alicyclic dicarboxylic acid are mixed and may be used together with the aromatic dicarboxylic acid as long as amounts thereof are a little. Examples of the aliphatic dicarboxylic acid are adipic acid, azelaic acid, dodecanedioic acid, sebacic acid and the like. Examples of the alicyclic dicarboxylic acid are 1,2-cyclohexane dicarboxylic acid, 1,3-cyclohexane dicarboxylic acid, 1,4-cyclohexane dicarboxylic acid and the like.

As a dihydroxy compound composing the polyester resin, aliphatic diol, alicyclic diol, a mixture thereof and the like are exemplified. Examples of the aliphatic diol are ethylene glycol, propylene glycol, butane diol, hexylene glycol, neopentyl glycol, 2-methylpropane-1,3-diol, diethylene glycol, triethylene glycol and the like. Examples of the alicyclic diol are cyclohexane-1,4-dimethanol and the like. Incidentally, one or more kinds of long-chained diol having molecular weight of 400 to 6000 may be copolymerized as long as an amount thereof is a little. Examples of the long-chained diol are polyethylene glycol, poly-1,3-propylene glycol, polytetramethylene glycol and the like. Further, aromatic diol such as hydroquinone, resorcin, naphthalene diol, dihydroxydiphenyl ether, 2,2-bis(4-hydroxyphenyl)propane and the like may be used. In order to introduce a branched structure, a trifunctional monomer other than the above bifunctional monomer may be slightly used together therewith. Examples of the trifunctional monomer are trimellitic acid, trimesic acid, pyromellitic acid, pentaerythritol, trimethylolpropane and the like. In order to adjust molecular weight, a monofunctional compound such as aliphatic acid etc. may be slightly used together therewith.

The polyester resin mainly containing a polycondensation product of the dicarboxylic acid and the diol is used. In the whole polyester resin, the polycondensation product is contained in 50% by mass or more, preferably 70% by mass or more. The preferred dicarboxylic acid is the aromatic dicarboxylic acid. The preferred diol is the aliphatic diol. 95% by mass or more in an acid component is more preferably the terephthalic acid. 95% by mass or more in an alcoholic component is more preferably polyalkylene terephthalate which is the aliphatic diol. Examples thereof are polybutylene terephthalate and polyethylene terephthalate. The polyester resin which is almost homo-polyester is preferable. That is, 95% by mass or more in the whole resin is the terephthalic acid component and 1,4-butanediol or the ethylene glycol component. The polyester resin mainly based on the polybutylene terephthalate is preferable. The polybutylene terephthalate may be a copolymer of polyalkylene glycol such as the isophthalic acid, dimer acid, the polytetramethylene glycol (PTMG) and the like.

As the polyolefin-based resin, examples thereof are a homopolymer of α-olefin and a copolymer thereof, and a copolymer of these polymers and another unsaturated monomer capable of copolymerization (the copolymer may be a block copolymer, a random copolymer and a graft copolymer). Examples of the α-olefin are ethylene, propylene, butene-1, 3-methylbutene-1, 4-methylpentene-1 and octene-1. More specifically, examples of the polyethylene-based resin are high density polyethylene, medium density polyethylene, low density polyethylene, linear low density polyethylene, an ethylene-vinyl acetate copolymer and an ethylene-ethyl acrylate copolymer. Examples of the polypropylene-based resin are a propylene homopolymer, a propylene-ethylene block copolymer or a random copolymer thereof and a propylene-ethylene-butene-1 copolymer. Further, polybutene-1 and poly 4-methylpentene-1 are exemplified. These polyolefin-based resins may be used individually or may be used by combining in two or more kinds thereof. Among these, the polyethylene resin and/or the polypropylene resin are preferably used. The polypropylene-based resin is more preferable. Molecular weight of the polypropylene-based resin is not intended to be restricted. The polypropylene type resin having the molecular weight in a wide range may be used.

Incidentally, as the polyolefin-based resin, acid-modified polyolefin which is a modified product by unsaturated carboxylic acid or the derivatives thereof and a foam resin which contains a foaming agent and is like foam polypropylene may be used. The polyolefin-based resin may contain rubbers such as ethylene-α-olefin-based copolymer rubber, an ethylene-α-olefin-nonconjugated diene-based compound copolymer (e.g. EPDM etc.), ethylene-aromatic monovinyl compound-conjugated-based diene compound copolymer rubber or hydrogenated compound etc. of the above.

The polycarbonate resin is the thermoplastic resin having carbonic ester bindings in principle chain thereof. The polycarbonate resin has an excellent mechanical property, heat resistance, cold resistance, electrical property and transparency, and is an engineering plastic. As the polycarbonate resin, any of an aromatic polycarbonate resin and an aliphatic polycarbonate resin may be used. The aromatic polycarbonate resin is preferable. The aromatic polycarbonate resin is a thermoplastic polymer obtained through a reaction as follows. An aromatic dihydroxy compound or this compound and a little amount of a polyhydroxy compound is reacted with phosgene or diester carbonate. The aromatic polycarbonate resin may have branched chains and may be a copolymer. A method for producing the aromatic polycarbonate resin is not intended to be restricted. The aromatic polycarbonate resin may be produced by a conventionally known method such as a phosgene process (an interfacial process) and a melt process (a transesterification process). In addition, when the aromatic polycarbonate resin produced by the melt process is used, an amount of OH groups as terminal groups may be optimized.

Examples of the aromatic dihydroxy compound which is source material of the aromatic polycarbonate resin are 2,2-bis(4-hydroxyphenyl)propane (i.e. bisphenol A), tetra methyl bisphenol A, bis(4-hydroxyphenyl)-p-diisopropyl benzene, hydroquinone, resorcinol, 4,4-dihydroxydiphenyl and the like. The preferred compound is the bisphenol A. A compound in which one or more tetraalkylphosphonium sulfonate are bonded to the above aromatic dihydroxy compound may be used. The branched aromatic polycarbonate resin may be obtained by substituting a part of the above mentioned aromatic dihydroxy compound with a compound of a branching agent. Examples of the compound thereof are a polyhydroxy compound such as phloroglucin, 4,6-dimethyl-2,4,6-tri(4-hydroxyphenyl)heptene-2, 4,6-dimethyl-2,4,6-tri(4-hydroxyphenyl)heptane, 2,6-dimethyl-2,4, 6-tri(4-hydroxyphenyl)heptene-3, 1,3,5-tri(4-hydroxyphenyl)benzene, 1,1,1-tri(4-hydroxyphenyl)ethane and the like and/or a compound such as 3,3-bis(4-hydroxyaryl) oxyindole (i.e. isatin bisphenol), 5-chloroisatin, 5,7-dichloroisatin, 5-bromoisatin and the like. An amount of these compounds for substitution is generally 0.01 to 10% by mole, preferably 0.1 to 2% by mole with respect to the aromatic dihydroxy compound.

The preferred aromatic polycarbonate resin is a polycarbonate resin derivatized from 2,2-bis(4-hydroxyphenyl)propane or a polycarbonate copolymer derivatized from 2,2-bis(4-hydroxyphenyl)propane and other aromatic dihydroxy compounds. In addition, the aromatic polycarbonate resin mainly has the polycarbonate resin, and may be a copolymer produced by the polycarbonate resin and a polymer or oligomer having a siloxane structure. Further a mixture of two or more kinds of the above mentioned aromatic polycarbonate resin may be used.

The first laser-transmissible-absorptive resin member 1 and the second laser-transmissible-absorptive resin member 2 contain the nigrosine sulfate which is the black coloring agent as the laser beam absorbent. Thereby they have the color tone from a gray color to a black color in accordance with the contents thereof. However color density of the both laser-transmissible-absorptive resin members 1, 2 is insufficient and may have a light color e.g. the gray color because the contents of the nigrosine sulfate is decided so that the absorbance $a_1$ and the absorbance $a_2$ are 0.09 to 0.9, preferably 0.1 to 0.5. In this case, the coloring agent may be added into a composition for the first laser-transmissible-absorptive resin member 1 and/or a composition for the second laser-transmissible-absorptive resin member 2 in order to impart the desired color density to the both laser-transmissible-absorptive resin members 1, 2. In addition, the coloring agent may be also added into a composition for the laser-transmissible resin member which is intended to form the laser-transmissible resin member 3. Thereby when the respective resin members 1, 2, 3 have the same color, a boundary therebetween and a welding mark may be diminished.

The coloring agent is selected depending on the dolor tone and the color density of the thermoplastic resin contained in the resin compositions. For example, when the black color which is the deep color will be imparted to the both laser-transmissible-absorptive resin members 1, 2, the black coloring agent is prepared by combining the various kinds of the coloring agent. Examples of a combination of the coloring agents are a combination of a blue coloring agent, a yellow coloring agent and a red coloring agent; a combination of a violet coloring agent and the yellow coloring agent; and a combination of a green coloring agent and a red coloring agent.

A structure of the coloring agent and the color tone thereof is not intended to be restricted. The coloring agent containing various organic dyes and pigments is exemplified. Examples of the dyes and the pigments are azomethine series, anthraquinone series, quinacridone series, dioxazine series, diketopyrrolopyrrole series, anthrapyridone series, isoindolinone series, indanthrone series, perinone series, perylene series, indigo series, thioindigo series, quinophthalone series, quinoline series and triphenylmethane series.

A combination of a plurality of a dye which has a visible light absorptivity, a rich compatibility with the thermoplastic resin and low scattering properties with respect to the laser beam is preferable. The preferred coloring agent is difficult to bleach by a high temperature generated when molding the respective resin members 1, 2, 3 and by a high temperature generated when melting due to irradiating with the laser beam; has excellent heat resistance; has non-absorptivity with respect to a near-infrared region of the laser beam; and has transmittivity. As the coloring agent which is transmissive to the wavelength of the laser beam, the coloring agent containing an anthraquinone dye is exemplified.

The anthraquinone dye is preferably an anthraquinone-based oil soluble dye. For example, the dyes represented by Color Index are commercially available, specifically as follows: C.I. Solvent Blue 11, 12, 13, 14, 26, 35, 36, 44, 45, 48, 49, 58, 59, 63, 68, 69, 70, 78, 79, 83, 87, 90, 94, 97, 98, 101, 102, 104, 105, 122, 129 and 132; C.I. Disperse Blue 14, 35, 102 and 197; C.I. Solvent Green 3, 19, 20, 23, 24, 25, 26, 28, 33 and 65; and C.I. Solvent Violet 13, 14, 15, 26, 30, 31, 33, 34, 36, 37, 38, 40, 41, 42, 45, 47, 48, 51, 59 and 60.

The anthraquinone dye having a maximum absorption wavelength in range from 590 to 635 nm is exemplified. The anthraquinone dye exhibits often a blue color and has a high visibility as compared with a green anthraquinone dye. When mixed black coloring agents are prepared by combining, a red dye and/or a yellow dye is combined with a blue anthraquinone dye by subtractive color mixing. The coloring agent of the deep black color having a high colorability is obtained.

The anthraquinone dye preferably has transmittance of 60 to 95% with respect to the 940 nm laser beam. As the anthraquinone dye which is commercially available, for example, "NUBIAN (registered trademark) BLUE series" and "OPLAS (registered trademark) BLUE series" (all are tradenames, available from ORIENT CHEMICAL INDUSTRIES CO., LTD.) are exemplified.

Preferred electrical conductivity of the anthraquinone dye is 50 to 500 μS/cm. Thereby, since the insulation of the respective resin members 1, 2, 3 is increased, the laser welded body 10 is suitably used for resin parts which require the high insulation such as parts for electrical and electronic apparatus and parts for precision apparatus.

The electrical conductivity is measured as follows. The anthraquinone dye as a sample in an amount of 5 g is dispersed to 500 mL of ion-exchange water, followed by recording weight thereof. An ion component is extracted by boiling the ion-exchange water to which the anthraquinone dye has been dispersed, followed by filtrating it. Ion-exchange water is added to the resultant filtrate until weight thereof is same as the preliminarily measured weight. The electrical conductivity of this solution is measured by using an electrical conductivity meter (manufactured by DKK-TOA CORPORATION, tradename: AOL-10).

Examples of a combination of the dyes are a combination of the anthraquinone blue dye and a blue dye, the red dye and the yellow dye; and a combination of the anthraquinone blue dye and a green dye, the red dye and the yellow dye. Examples of the red dye and the yellow dye are an azo dye, a quinacridone dye, a dioxazine dye, a quinophthalone dye, a perylene dye, a perinone dye, an isoindolinone dye, an azomethine dye, a triphenylmethane dye and a red or yellow anthraquinone dye. These dyes may be used as individual or two or more dyes in combination. As the dye which imparts good coloring to the both resin compositions of the laser-transmissible-absorptive resin composition and the laser-transmissible resin composition, a perinone dye and an anthraquinone red dye or an anthraquinone yellow dye are exemplified.

A combination of the above anthraquinone blue dye having the maximum absorption wavelength in range from 590 to 635 nm and the red dye are preferably used. As a suitable example, the perinone dye is exemplified. The perinone dye has the good heat resistance and exhibits often a red color. As the red dye which is commercially available, for example, "NUBIAN (registered trademark) RED series" and "OPLAS (registered trademark) RED series" (all are tradenames, available from ORIENT CHEMICAL INDUSTRIES CO., LTD.) are exemplified.

Examples of the perinone dye are specifically C.I. Solvent Orange 60; C.I. Solvent Red 135, 162, 178 and 179.

Examples of the anthraquinone red dye (including the anthrapyridone dye) are C.I. Solvent Red 52, 111, 149, 150, 151, 168, 191, 207 and 227; C.I. Disperse Red 60. The perinone dye and the anthraquinone red dye are represented by Color Index and are commercially available.

A preferred dye adapted to be combined with the anthraquinone red dye is a yellow anthraquinone dye. In the coloring agent, a range of a mass ratio (i)/(ii) of (i) a mass of the yellow anthraquinone dye/(ii) a mass of the blue, green and/or violet anthraquinone dyes is preferably 0.15 to 1.0. As a commercially available product of the yellow anthraquinone dye, for example, "NUBIAN (registered trademark) YELLOW series" and "OPLAS (registered trademark) YELLOW series" (all are tradenames, available from ORIENT CHEMICAL INDUSTRIES CO., LTD.) are exemplified.

Examples of the yellow dye include dyes represented by following Color Index: C.I. Solvent Yellow 14, 16, 32, 33, 43, 44, 93, 94, 98, 104, 114, 116, 133, 145, 157, 163, 164, 167, 181, 182, 183, 184, 185, and 187; C.I. Vat Yellow 1, 2 and 3. These are commercially available.

When robustness such as weather fastness, heat resistance and resistance to bleed are needed to the laser welded body 10, a salt-forming dye which is a combination of an acid dye with organic amine is preferably used as the above oil soluble dye. The salt-forming dye may be represented by [anion of the acid dye.organic ammonium salt]. In the coloring agent, the anthraquinone dye is substituted with the salt-forming dye, and an anthraquinone-based salt-forming dye represented by such as [anion of an anthraquinone acid dye.organic ammonium salt] are employed. Thereby, the robustness of the coloring agent is increased.

Examples of the anthraquinone acid dye used for the salt-forming dye include the anthraquinone dye which has a single sulfonic acid group in a single molecule and is represented by following Color Index: especially C.I. Acid Blue 25, 27, 40, 41, 43, 45, 47, 51, 53, 55, 56, 62, 78, 111, 124, 129, 215, 230 and 277; C.I. Acid Green 37; and C.I. Acid Violet 36, 41, 43, 51 and 63. These are commercially available.

Examples of the anthraquinone acid dye other than those above include the anthraquinone dye which has two sulfonic acid groups in a single molecule of anthraquinone, and is represented by following Color Index: especially C.I. Acid Blue 23, 35, 49, 68, 69, 80, 96, 129: 1, 138, 145, 175, 221 and 344; C.I. Acid Green 25, 27, 36, 38, 41, 42 and 44; and C.I. Acid Violet 34 and 42. These are commercially available.

The preferred anthraquinone acid dye has a structure of which a substituent group having a sulfonic acid group is bonded to an anilino group. This structure is included in an anthraquinone molecular scaffold as at least one of a substituent group. Among others, C.I. Acid Blue 49, 80, 96, 129: 1, 138, 145 and 221; C.I. Acid Green 25, 27, 36, 38, 41, 42 and 44; and C.I. Acid Violet 34 are exemplified.

An example of the preferred salt-forming dye of the anthraquinone is an anthraquinone salt-forming dye having anilino group derivatives as the substituent group. The anthraquinone salt-forming dye is represented by $A^-B^+$ ($A^-$ is an anion from the anthraquinone and $B^+$ is a cation from an organic ammonium) or AB (A is a dehydrogenated residue of the anthraquinone molecular scaffold or a dehydrogenated residue of a substitute group bonding to the anthraquinone and B is a dehydrogenated residue of an organic ammonium). The anthraquinone salt-forming dye exhibits the high compatibility relative to an aromatic thermoplastic resin and imparts the high heat resistance relative thereto.

The preferred anthraquinone dye is represented by the following formula (1):

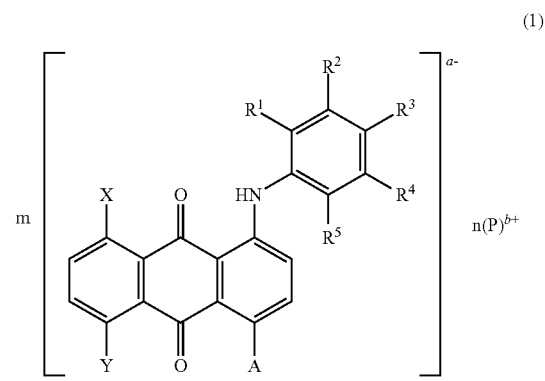

(1)

(in the formula (1), X and Y are independently a hydrogen atom, a hydroxy group, a halogen atom or an amino group; 1e to $R^5$ are independently a hydrogen atom, a hydroxy group, an amino group, a nitro group, a straight or branched alkyl group having 1 to 18 carbon atoms, a straight or branched alkoxy group having 1 to 18 carbon atoms, a halogen atom, a phenyloxy group or a carboxy group; $(P)^{b+}$ is an organic ammonium ion; a and b are 1 to 2 positive numbers; m and n are 1 to 2 positive numbers; A is a hydrogen atom, a hydroxy group, an amino group, a halogen atom or a group represented by following the formula (2):

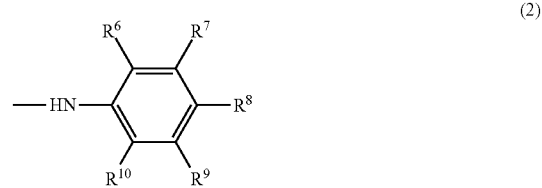

(2)

(in the formula (2), $R^6$ to $R^{10}$ are independently a hydrogen atom, a hydroxy group, an amino group, a nitro group, a straight or branched alkyl group having 1 to 18 carbon atoms, a straight or branched alkoxy group having 1 to 18 carbon atoms, or a halogen atom.)).

In the formulas (1) and (2), examples of the straight or branched alkyl group having 1 to 18 carbon atoms are specifically a methyl group, an ethyl group, a n-propyl group, an isopropyl group, a n-butyl group, a sec-butyl group, an isobutyl group, a tert-butyl group, a n-pentyl group, a neopentyl group, an isopentyl group, a sec-pentyl group, a 3-pentyl group, a tert-pentyl group, a hexyl group, a heptyl group and an octyl group. Examples of the straight or branched alkoxy group having 1 to 18 carbon atoms are specifically a methoxy group, an ethoxy group, a n-propoxy group, an isopropoxy group, a n-butoxy group, a sec-butoxy group, an isobutoxy group, a tert-butoxy group, a n-pentyloxy group, a neopentyloxy group, an isopentyloxy group, a sec-pentyloxy group, a 3-pentyloxy group, a tert-pentyloxy group and a hexyloxy group. Examples of the halogen atom are specifically fluorine, chlorine, bromine and iodine.

The preferred salt-forming dye represented by the formula (1) is the anthraquinone salt-forming dye having two anilino group derivatives as a substituent in a single molecule. Thereby, heat degradation of the respective resin members 1, 2, 3 due to thermal fusion is prevented at the time of molding and laser-welding these. The anthraquinone acid dye is suitable for the salt-forming dye. Examples of the anthraquinone acid dye having the two anilino group derivatives as a substituent in a single molecule are specifically C.I. Acid Green 25, 27, 36, 38, 41, 42 and 44; C.I. Acid Blue 80 and 221; and C.I. Acid Violet 34.

Examples of preferred amines used for the salt-forming dye represented by the formula (1) are aliphaticamine such as hexylamine, pentylamine, octylamine, 2-ethyl hexylamine, di-(2-ethylhexyl)amine and dodecylamine; diamine such as tetramethylenediamine, hexamethylenediamine, octamethylenediamine, nonamethylenediamine, dodecamethylenediamine, 2-methylpentamethylenediamine, 2-methyloctamethylenediamine, trimethylhexamethylenediamine, bis(p-aminocyclohexyl)methane, m-xylenediamine and p-xylenediamine; alicyclicamine such as cyclohexylamine, dicyclohexylamine and dihydroaziethylamine; alkoxyalkylamine such as 3-propoxypropylamine, di-(3-ethoxypropyl)amine, 3-butoxypropylamine, octooxypropylamine and 3-(2-ethylhexyloxy)propylamine; naphthylamine such as α-naphthylamine, β-naphthylamine, 1,2-naphthylenediamine, 1,5-naphthylenediamine and 1,8-naphthylenediamine; naphthylalkylamine such as 1-naphthylmethylamine; amine containing an alkanol group such as N-cyclohexylethanolamine, N-dodecylethanolamine and N-dodecyliminodiethanol; guanidine derivatives such as 1,3-diphenylguanidine, 1-o-tolylguanidine and di-o-tolylguanidine.

As the amines, commercially available quaternary ammonium may be employed. Examples of the quaternary ammonium are specifically QUARTAMIN 24P, QUARTAMIN 86P conc., QUARTAMIN 60W, QUARTAMIN 86W, QUARTAMIN D 86P (distearyldimethylammonium chloride), SANISOL C and SANISOL B-50, (as above, available from Kao Corporation, QUARTAMIN and SANISOL are registered trademark.); ARQUAD 210-80E, 2C-75, 2HT-75 (dialkyl (alkyl is $C_{14}$ to $C_{18}$) dimethylammonium chloride), 2HT flake, 20-751, 2HP-75 and 2HP flake (as above, available from LION SPECIALTY CHEMICALS CO., LTD., ARQUAD is tradename); PRIMENE MD amine(methanediamine), PRIMENE 81-R (a mixture of hyper-branched tert-alkyl ($C_{12}$ to $C_{14}$) primary amine isomers), PRIMENE TOA amine (tert-octylamine), PRIMENE RB-3 (a mixture of tert-alkyl primary amine) and PRIMENE JM-T amine (a mixture of hyper-branched chain tert-alkyl ($C_{16}$ to $C_{22}$) primary amine isomer) (as above, available from Dow Chemical Company, PRIMENE is registered trademark).

An amount of the coloring agent is 0.01 to 2 parts by mass, preferably 0.05 to 0.8 parts by mass and more preferably 0.1 to 0.5 parts by mass with respect to 100 parts by mass of the thermoplastic resin. When the amount of the coloring agent is adjusted to be the above range, the resin composition for the first laser-transmissible-absorptive resin member, the resin composition for the second laser-transmissible-absorptive resin member and the resin composition for the laser-transmissible resin member having high coloring are obtained.

When preparing the resin composition, it is preferable that a masterbatch containing the coloring agent is prepared, and then the masterbatch is added into a thermoplastic resin raw material. Thereby, the resin composition has no irregular color because the coloring agent is homogeneously dispersed. A content of the coloring agent in the masterbatch is preferably 5 to 90% by mass and more preferably 20 to 60% by mass.

When the composition for the laser-transmissible resin member contains no laser beam absorbent such as the nigrosine sulfate or a small amount thereof, the laser-transmissible resin member 3 can be not only achromatic but also can be a chromatic member. For example, the laser-transmissible resin member 3 can be colored in yellow, red, blue, green and violet colors by using the above-exemplified coloring agent.

As needed, in these resin compositions, not only the coloring agent but also various additives may be blended into a raw material of the thermoplastic resin. Examples of the additive are a reinforcer, a filler, an ultraviolet-absorptive agent or a light-stabilizer, an antioxidant, an antibacterial agent, a fungicide, a flame retardant, a mold release agent, a crystal nucleating agent, a plasticizer, an impact modifier, an auxiliary coloring agent, a dispersant, a stabilizer, a reforming agent, an antistatic agent, a lubricant, and a crystallization accelerator. Further, a white pigment and an organic white pigment such as titanium oxide, zinc sulfate, zinc white (zinc oxide), calcium carbonate and alumina white are exemplified. Thereby, the achromatic raw material of the thermoplastic resins is adjusted so as to have a chromatic color by a combination of the organic dyes and with the organic pigments.

The reinforcer is freely selected as long as a product can be used for reinforcing a synthetic resin. Examples of the reinforcer are an inorganic fiber such as a glass fiber, a carbon fiber, a metal fiber, a potassium titanate fiber, a calcium silicate fiber, sepiolite, wollastonite and rock wool; and an organic fiber such as aramid, a polyphenylene sulfide resin, polyamide, polyester and liquid crystalline polymer. For example, when a transparency will be imparted to the resin member, the glass fiber is suitable for reinforcing it. A fiber length of the glass fiber is 2 to 15 mm, and a fiber diameter thereof is 1 to 20 μm. A type of the glass fiber is freely selected, and a roving fiber and a milled fiber are exemplified. The glass fiber may be used individually or two or more kinds of the glass fiber may be used in combination. A content thereof is preferably 5 to 120 parts by mass with respect to 100 parts by mass of the respective resin members 1, 2. If it is less than 5 parts by mass, a reinforcing effect by the glass fiber is insufficiently exhibited. If it is higher than 120 parts by mass, moldability is decreased. The amount thereof is preferably 10 to 60 parts by mass, more preferably 20 to 50 parts by mass.

As the filler, a particulate filler is exemplified. Examples of the particulate filler are silicate such as talc, kaolin, clay, wollastonite, bentonite, asbestos and alumina silicate; metal oxide such as alumina, silicon oxide, magnesium oxide, zirconium oxide and titanium oxide; carbonate such as calcium carbonate, magnesium carbonate and dolomite; sulfate such as calcium sulfate and barium sulfate; ceramics such as glass beads, ceramic beads, boron nitride and silicon carbide. In addition, the filler may be a plate-like filler such as mica, sericite and glass flake.

Examples of the ultraviolet-absorptive agent and the light-stabilizer include a benzotriazole-based compound, a benzophenone-based compound, a salicylate-based compound, a cyanoacrylate-based compound, a benzoate-based compound, an oxanilide-based compound, a hindered amine-based compound, a nickel complex salt and the like.

Examples of the antioxidant include a phenolic antioxidant, a phosphoric antioxidant, and a sulfuric antioxidant and a thioetheric antioxidant.

The phenolic antioxidant has a phenolic hydroxyl group. Among others, a hindered phenolic antioxidant is preferably used. In the hindered phenolic antioxidant, one or two carbon atoms neighboring the carbon atoms of the aromatic ring to which the phenolic hydroxyl group bonds is substituted with a substituent group having 4 or more carbon atoms. The substituent group having the 4 or more carbon atoms may bond to the carbon atom of the aromatic ring via a carbon-carbon bond, and may bond thereto via an atom except for a carbon atom.

The phosphoric antioxidant has a phosphorus atom. The phosphoric antioxidant may be an inorganic phosphate compound such as sodium phosphite, sodium hypo phosphite and the like; or an organic antioxidant having a $P(OR)_3$ structure. Hereat, R is an alkyl group, an alkylene group, an aryl group, an arylene group and the like. Three of R may be the same or different, and any two of R may form a ring structure by bonding together. Examples of the phosphoric antioxidant include triphenyl phosphite, diphenyldecyl phosphite, phenyldiisodecyl phosphite, tri(nonylphenyl) phosphite, bis(2,4-di-tert-butylphenyl)pentaerythritol diphosphite, bis(2,6-di-tert-butyl-4-methylphenyl)pentaerythritol diphosphite and the like.

The sulfuric antioxidant has a sulfur atom. Examples of the sulfuric antioxidant include didodecyl thiodipropionate, ditetradecyl thiodipropionate, dioctadecyl thiodipropionate, pentaerythritol tetrakis(3-dodecylthiopropionate), thiobis (N-phenyl-(3-naphthylamine), 2-mercaptobenzothiazole, 2-mercaptobenzoimidazole, tetramethylthiuram monosulfide, tetramethylthiuram di sulfide, nickel dibutyldithiocarbamate, nickel isopropylxanthate, trilauryl trithiophosphite and the like. Especially, the thioetheric antioxidant having a thioether structure is reduced by receiving oxygen from a substance which has been oxidized, and so preferably used.

Examples of the antibacterial agent and the fungicide include 2-(4'-thiazolyl)benzimidazole, 10,10'-oxibisphenoxyarsine, N-(fluorodichloromethylthio)phthalimide, bis(2-pyridylthio-1-oxide) zinc and the like.

The flame retardant is freely selected. Examples thereof include an organic flame retardant and an inorganic flame retardant such as an organic halogen compound, an antimony compound, a compound having silicon, a phosphorus compound, a nitrogen compound and the like.

Examples of the organic halogen compound include brominated polycarbonate, a brominated epoxy resin, a brominated phenoxy resin, a brominated polyphenylene ether resin, a brominated polystyrene resin, brominated bisphenol A, pentabromobenzyl polyacrylate, tetrabromobisphenol A derivatives, hexabromodiphenyl ether, tetrabromophthalic anhydride and the like. Examples of the antimony compound include antimony trioxide, antimony pentaoxide, sodium antimonate, antimony phosphate and the like. Further examples of the compound having silicon include silicone oil, organosilane and aluminum silicate. Examples of the phosphorus compound include triphenyl phosphate, triphenyl phosphite, phosphoric ester, polyphosphoric acid, ammonium polyphosphate, red phosphorus and a phosphazene compound, which has a main chain including a bond of a phosphorus atom and a nitrogen atom, such as phenoxyphosphazene and amino phosphazene and the like. Examples of the nitrogen compound include melamine, cyanuric acid, melamine cyanurate, urea, guanidine and the like. Examples of the inorganic flame retardant include the aluminum hydroxide, magnesium hydroxide, a silicon compound, a boron compound and the like.

The mold release agent is freely selected. Examples thereof include a metal soap such as montanic acid waxes or lithium stearate, aluminum stearate and the like; higher fatty acid amide such as ethylene bis-stearyl amide and the like; and an ethylenediamine-stearic acid-sebacic acid polycondensate and the like.

The crystal nucleating agent is freely selected. An organic nucleating agent such as rosin and the like and an inorganic nucleating agent are often used. Examples of the inorganic nucleating agent include metal oxide such as silica, alumina, zirconia, titanium oxide, iron oxide, zinc oxide and the like; metal carbonate such as calcium carbonate, magnesium carbonate, barium carbonate and the like; silicate such as calcium silicate, aluminum silicate, talc and the like; metal carbide such as silicon carbide and the like; metal nitride such as silicon nitride, boron nitride, tantalum nitride and the like. The crystal nucleating agent is used individually or two or more kinds thereof are used by combining these.

The plasticizer is freely selected. Examples of the plasticizer include phthalate ester (e.g. dimethyl phthalate, butyl benzyl phthalate, diisodecyl phthalate and the like), phosphoric ester (e.g. tricresyl phosphate and 2-ethylhexyl diphenyl phosphate), sulfonamide-based plasticizers (e.g. n-butylbenzene sulfonamide, p-toluene sulfonamide and the like). Furthermore, polyester-based plasticizers, polyhydric alcohol ester-based plasticizers, polycarboxylic ester-based plasticizers, bisphenol-based plasticizers, amide-based plasticizers, ester-based plasticizers, amide ester-based plasticizers, glycerin-based plasticizers, epoxy-based plasticizers (e.g. epoxy triglyceride consisting of epoxy-stearic alkyl and soybean oil) and the like are exemplified.

Examples of the polyester plasticizers include polyester by dicarboxylic acid and dialcohol or a (poly) oxyalkylene adduct thereof. The dicarboxylic acid has 2 to 12 carbon atoms, preferably has 2 to 6 carbon atoms. The dialcohol has 2 to 12 carbon atoms, preferably has 2 to 6 carbon atoms. Examples of the dicarboxylic acid are succinic acid, adipic acid, sebacic acid, phthalic acid, terephthalic acid, isophthalic acid and the like. Examples of the dialcohol are propylene glycol, 1,3-butanediol, 1,4-butanediol, 1,6-hexanediol, ethylene glycol, diethylene glycol, triethylene glycol and the like. Further, a hydroxy group and a carboxy group at a terminal of the polyester may be end-capped through esterification using monocarboxylic acid and/or monoalcohol.

Examples of the polyhydric alcohol ester plasticizers include mono-, di- or triester etc. of polyhydric alcohol or the (poly) oxyalkylene adduct thereof and monocarboxylic acid. The monocarboxylic acid preferably has 1 to 12 carbon atoms, more preferably has 1 to 6 carbon atoms and furthermore preferably has 1 to 4 carbon atoms. Examples of the polyhydric alcohol are polyethylene glycol, polypropylene glycol, glycerin, the above dialcohol and the like. Examples of the monocarboxylic acid are acetic acid, propionic acid and the like.

Examples of the polycarboxylic ester plasticizers include mono-, di- or triester etc. of polycarboxylic acid and monoalcohol or a (poly) oxyalkylene adduct thereof. The monoalcohol preferably has 1 to 12 carbon atoms, more preferably has 1 to 6 carbon atoms and furthermore preferably has 1 to 4 carbon atoms. Examples of the polycarboxylic acid are trimellitic acid, the above dicarboxylic acid and the like. Examples of the monoalcohol are methanol, ethanol, 1-propanol, 1-butanol, 2-ethylhexanol and the like.

Examples of the bisphenol plasticizers are mono- or diether etc. of bisphenol and monoalkyl halide or a (poly) oxyalkylene adduct thereof. The monoalkyl halide preferably has 1 to 18 carbon atoms, more preferably has 2 to 14 carbon atoms and furthermore preferably has 4 to 10 carbon atoms. Examples of the bisphenol are bisphenol A, bisphenol S and the like. Examples of the monoalkyl halide are 1-octylbromide, 1-dodecylbromide and 2-ethylhexylbromide.

Examples of the amide plasticizers include a carboxylic acid amide plasticizer and a sulfonamide plasticizer. Examples of the carboxylic acid amide plasticizer are amide of one or more acids and dialkylamine including alkyl groups having 2 to 8 carbon atoms. The acid is selected from the group consisting of benzoic acid, phthalic acid, trimellitic acid, pyromellitic acid and unhydride thereof. Examples of the dialkylamine including the alkyl groups having 2 to 8 carbon atoms are diethyl amine, dipropyl amine, dibutyl amine, dihexyl amine, di2-ethylhexyl amine, dioctyl amine and the like. Molecular weight of the carboxylic acid amide plasticizer is preferably 250 to 2000, more preferably 300 to 1500 and furthermore preferably 350 to 1000.

Examples of the ester plasticizers include monoester plasticizers, diester plasticizers, triester plasticizers and polyester plasticizers. Examples of the monoester plasticizers include benzoic acid ester plasticizers and stearic acid ester plasticizers. The benzoic acid ester plasticizers include benzoic acid ester consisting of benzoic acid and aliphatic alcohol having 6 to 20 carbon atoms or an alkylene oxide adduct of alkylene oxide having 2 to 4 carbon atoms and the aliphatic alcohol (an addition mole number of the alkylene oxide is 10 mole or less). Examples of the benzoic acid ester plasticizers are 2-ethylhexyl p-oxybenzoate and 2-hexyldecyl p-oxybenzoate. The stearic acid ester plasticizers include stearic acid ester consisting of stearic acid and aliphatic alcohol having 1 to 18 carbon atoms or an alkylene oxide adduct of alkylene oxide having 2 to 4 carbon atoms and the aliphatic alcohol (an addition mole number of the alkylene oxide is 10 mole or less). Examples of the stearic acid ester are methyl stearate, ethyl stearate, butyl stearate and hexyl stearate.

The impact modifier is freely selected as long as an impact modifying effect of the resin is exhibited. Publicly known products such as a polyamide-based elastomer, a polyester-based elastomer, a styrene-based elastomer, a polyolefin-based elastomer, an acryl-based elastomer, a polyurethane-based elastomer, a fluorine-based elastomer, a silicone-based elastomer and an acryl core/shell type elastomer etc. are exemplified. Especially, the polyester-based elastomer and the styrene-based elastomer are preferable.

The polyester elastomer is thermoplastic polyester having rubber properties at a room temperature. The preferred polyester elastomer is the thermoplastic polyester mainly including a polyester block copolymer. The preferred polyester block copolymer has aromatic polyester having high melting point and high crystallinity as a hard segment, and amorphous polyester and/or amorphous polyether as a soft segment. A soft segment content of the polyester elastomer is at least 20 to 95% by mole in the all segments. For example, the soft segment content of a block copolymer (PBT-PTMG copolymer) of polybutylene terephthalate and polytetramethylene glycol is 50 to 95% by mole. The preferred soft segment content is 50 to 90% by mole, specifically 60 to 85% by mole. A polyesterether block copolymer, especially the PBT-PTMG copolymer, is preferable because decrease of transmittance thereof is prevented.

The styrene elastomer consists of a styrene component and an elastomer component. The styrene elastomer contains the styrene component in a ratio of 5 to 80% by mass, preferably 10 to 50% by mass, more preferably 15 to 30% by mass. In this case, as the elastomer component, conjugated diene hydrocarbon such as butadiene, isoprene, 1,3-pentadiene and the like is exemplified. More specifically, a copolymer elastomer of styrene and butadiene (SBS), a copolymer elastomer of styrene and isoprene (SIS) and the like are exemplified.

The respective resin members 1, 2, 3 may be produced by using the masterbatch of any thermoplastic resin composition which is colored. The masterbatch is obtained through any method. For example, the masterbatch is produced as follows. A powder and/or pellets of the base resin of the masterbatch and the coloring agent are mixed by using a mixing machine such as a tumbler and a super mixer. The resultant mixture is heated and melted by using an extruder, a batch-type kneader or a roll-type kneader, and is pelletized or grained to obtain the master batch.

The respective resin members 1, 2, 3 may be molded through various steps which are publicly known. For example, the molding can be performed via using the colored pellets by a processing machine such as an extruder, an injection molding machine and a roll mill. Further, the molding may be performed through following steps: mixing pellets and/or a powder of a transparent thermoplastic resin, a grinded coloring agent and optionally various additives by using a suitable mixer in order to a resin composition; and molding the obtained resin composition by using the processing machine. Furthermore, the molding may be performed through following steps: adding a coloring agent into a monomer containing a suitable catalyst for copolymerization; synthesizing any resin by polymerizing the resultant mixture; and molding the resultant resin by a suitable method. As a molding method, following methods may be employed: injection molding, extrusion molding, compression molding, foam molding, blow molding, vacuum molding, injection blow molding, rotation molding, calender molding, solution casting and the like. By employing the above molding, the respective resin members 1, 2, 3 which are variously shaped may be obtained.

Embodiments

Embodiments of the present invention will be described in detail below, but the scope of the present invention is not restricted to these embodiments.

(Preparing a Black Coloring Agent Having Laser Beam Transmissivity)

[Coloring agent A] Coloring agent A was obtained by powder-mixing an anthraquinone blue color oil soluble dye (C.I. Solvent Blue 97), a perinone red color oil soluble dye (C.I. Solvent Red 179) and an anthraquinone yellow color oil soluble dye (C.I. Solvent Yellow 163) at a mass ratio of 5:3:2.

[Coloring agent B] Coloring agent B was obtained by powder-mixing an anthraquinone blue color oil soluble dye (C.I. Solvent Blue 104), the perinone red color oil soluble dye (C.I. Solvent Red 179) and the anthraquinone yellow color oil soluble dye (C.I. Solvent Yellow 163) at a mass ratio of 4:3:3.

[Coloring agent C] Coloring agent C was obtained by powder-mixing a salt-forming dye of an anthraquinone blue acid dye (C.I. Acid Blue 80) and hexamethylenediamine, the perinone red color oil soluble dye (C.I. Solvent Red 179) and an anthraquinone yellow color oil soluble dye (C.I. Solvent Yellow 163) at a mass ratio of 7:2:1.

[Coloring agent D] Coloring agent D was obtained by powder-mixing a salt-forming dye of the anthraquinone blue acid dye (C.I. Acid Blue 80) and 2-ethylhexylamine, the perinone red color oil soluble dye (C.I. Solvent Red 179) and the anthraquinone yellow color oil soluble dye (C.I. Solvent Yellow 163) at a mass ratio of 7:2:1.

[Coloring agent E] Coloring agent E was obtained by powder-mixing a salt-forming dye of an anthraquinone blue acid dye (C.I. Acid Blue 236) and 2-ethylhexylamine, the perinone red color oil soluble dye (C.I. Solvent Red 179) and the anthraquinone yellow color oil soluble dye (C.I. Solvent Yellow 163) at a mass ratio of 6:3:1.

[Coloring agent F] Coloring agent F was obtained by powder-mixing a salt-forming dye of the anthraquinone blue acid dye (C.I. Acid Blue 236) and hexamethylenediamine, the perinone red color oil soluble dye (C.I. Solvent Red 179) and the anthraquinone yellow color oil soluble dye (C.I. Solvent Yellow 163) at a mass ratio of 5:3:2.

Example 1-1

(1) Preparing a First Laser-Transmissible-Absorptive Resin Member and a Second Laser-Transmissible-Absorptive Resin Member A polyamide (PA) 66 resin (available from Asahi Kasei Corp., LEONA (registered trademark) 1300S) in an amount of 496.90 g, 3.0 g of Coloring agent A and 0.1 g of Nigrosine A (nigrosine sulfate synthesized by modifying a sulfate ion concentration in accordance with the description of Japanese Patent Publication No. 3757081; sulfate ion 1.96% by mass; volume resistivity $2.0 \times 10^{10}$ Ω·cm; C.I. Solvent Black 5; aniline concentration was 0.03% by mass) were put in a tumbler made of stainless steel, followed by stirring and mixing them for 1 hour. A resin composition for the first and second laser-transmissible-absorptive resin members was prepared. The resultant resin composition for the first and second laser-transmissible-absorptive resin members was put in an injection molding machine (manufactured by TOYO MACHINERY & METAL CO., LTD., tradename: Si-50), followed by molding it in the usual manner at 270° C. of a cylinder temperature and 60° C. of a mold temperature. The resultant resin composition for the first and second laser-transmissible-absorptive resin member was shaped into each one of the first laser-transmissible-absorptive resin member 1 and the second laser-transmissible-absorptive resin member 2 having a size of 80 mm longitudinal length×50 mm lateral length×1 mm thickness and a square plate shape.

(Transmittance and Absorbance)

Transmittance and reflectance of the molded plates of the laser-transmissible-absorptive resin member were measured by using a spectrophotometer (manufactured by JASCO Corporation, tradename: V-570). Absorbance is a positive number calculated from the logarithm of the transmittance. In the present invention, the laser beam is reflected by a face of the molded plate. Therefore, true transmittance is needed. The true transmittance T is represented by $T=I_T/(I_O-I_R)$. The Lambert-Beer law representing the absorbance at 940 nm is represented by the following equation (1):

$$\text{Absorbance } a = -\text{Log } T = -\text{Log } \{I_T/(I_O-I_R)\} \tag{1}$$

(in the equation (1), T is the true transmittance; ($I_O$) is incident light intensity; ($I_T$) is transmissive light intensity; and ($I_R$) is reflected light intensity.) Herein, the absorbance was calculated as follows: setting the incident light intensity $I_O$ of 100%; and entering the transmittance and the reflectance which are percentages of measured values into the transmissive light intensity $I_T$ and the reflected light intensity $I_R$, respectively. Incidentally, when a laser-transmissible-absorptive resin member composing a laser welded body of the present invention excessively contains a laser beam absorbent; obtaining the absorbance and absorptivity by measurement may be difficult. Further, according to the Lambert-Beer law, the absorbance a is represented by the following equation (2) which is an equation showing a relationship between a laser beam absorbent content C (% by mass) and a thickness L (mm) of the resin member:

$$\text{Absorbance } a = \varepsilon C L \tag{2}$$

(in the equation (2), ε is the absorptivity (1/mm); C is the laser beam absorbent content (% by mass); L is the thickness of the resin member (mm).) As shown in Table 1, the absorbance and the transmittance of samples having a different laser beam absorbent content were determined. The results were shown in Table 2. A calibration curve was made on the basis thereof. As regards to values of the absorbance and the absorptivity of these resin members, the values per 1 mm thickness of the resin member were calculated from the calibration curve through dividing it by the thickness of the resin member. In this way the absorbances $a_1$, $a_2$ of the laser-transmissible-absorptive resin members 1, 2 in Example 1-1 were determined.

TABLE 1

| Laser beam absorbent content (% by mass) | Transmittance (%) | Reflectance (%) | Resin member thickness (mm) | Absorbance a (converted into 1 mm thickness) |
|---|---|---|---|---|
| 0 | 80.3 | 9.6 | 1.05 | 0.05 |
| 0.005 | 77.2 | 10.0 | 1.05 | 0.07 |
| 0.02 | 68.6 | 8.2 | 1.05 | 0.12 |
| 0.03 | 61.8 | 7.6 | 1.02 | 0.18 |
| 0.04 | 52.6 | 7.0 | 1.02 | 0.24 |
| 0.06 | 39.2 | 5.9 | 1.05 | 0.36 |
| 0.08 | 32.2 | 5.3 | 1.05 | 0.45 |
| 0.1 | 26.5 | 5.2 | 1.05 | 0.53 |
| 0.15 | 16.1 | 4.7 | 1.05 | 0.74 |
| 0.2 | 9.8 | 4.8 | 1.05 | 0.94 |

A graph was made by plotting the obtained absorbance a along a vertical axis and plotting the laser beam absorbent (Nigrosine A) content C (% by mass) corresponding thereto along a horizontal axis. The calibration curve represented by Absorbance a=4.538C+0.058 was obtained. By using the equation of the calibration curve, the absorbance was calculated from the laser beam absorbent content (% by mass). The absorbance a per 1 mm thickness of the resin member containing the laser beam absorbent was obtained through dividing the obtained absorbance by the thickness of the resin member.

(Melt Flow Rate)

The laser-transmissible-absorptive resin member 1 was cut to a predetermined size, and dried at 80° C. for 15 hours to prepare a measurement sample. In accordance with Japanese Industrial Standard K 7210: 2014 (Plastics-Determination of the melt mass-flow rate (MFR) and melt volume-flow rate (MVR) of thermoplastics), by using a F-F01 type melt indexer (manufactured by Toyo Seiki Seisaku-sho, Ltd., tradename), a measurement was performed under conditions of 280° C. of a test temperature and 2.16 kgf of a test load. The measurement was performed three times, and the averages of obtained values were calculated to determine the melt flow rate.

(2) Producing a Laser Welded Body

As shown in FIG. 1, a contacted part N was formed by overlapping the first laser-transmissible-absorptive resin member 1 and the second laser-transmissible-absorptive resin member 2. A laser beam L was output from a diode laser having 200 W output power [wave length: 940 nm, continuously] (manufactured by Hamamatsu Photonics K.K.). Radiation of the laser beam L was approximately and vertically performed relative to the face of the first laser-transmissible-absorptive resin member 1 from an upper direction thereof. The laser beam L scanned at 40 mm/second of a scan speed and 20 mm of a scan distance so as to traverse the resin members from one of a long side thereof in a straight line. In the result, the laser welded body 10 of Example 1-1 of which the both laser-transmissible-absorptive resin members 1, 2 were integrated by welding at the contacted part N was obtained. Following evaluations with respect to the laser welded body 10 were performed.

(Tensile Test)

In accordance with a test process in Japanese Industrial Standard K7161 (1994) Plastics-Determination of tensile properties, tensile strength as welding strength was measured by using a tensile tester (manufactured by SHIMADZU CORPORATION, tradename: AG-50kNE). The both laser-transmissible-absorptive resin members 1, 2 of the laser welded body 10 were horizontally pulled in a longitudinal direction and a direction separating these at 10 mm/minute of a test speed. The result was shown in Table 2.

(Evaluations of a Welding State)

A welding state was evaluated as follows. The result was shown in Table 2.

Good: The tensile test result of the laser welded body was 400 N or more.

Bad: The tensile test result of the laser welded body was less than 400 N.

Example 1-2

A first laser-transmissible-absorptive resin member 1 and a second laser-transmissible-absorptive resin member 2 were prepared in the same manner as Example 1-1 except that an amount of the polyamide (PA) 66 resin, an amount of Nigrosine, and an amount and kinds of Coloring agent were modified as shown in Table 1. The melt flow rate, the transmittance and the absorbance of the both laser-transmissible-absorptive resin members 1, 2 were measured in the same manner as Example 1-1. Using the both laser-transmissible-absorptive resin members 1, 2, a laser welded body 10 of Example 1-2 was produced in the same manner as Example 1-1. With respect to the obtained laser welded body 10, measuring the tensile strength and evaluating the welding state were performed in the same manner as Example 1-1. The results were shown in Table 2.

Example 1-3

(1) Preparing a First Laser-Transmissible-Absorptive Resin Member

A polyamide (PA) 66 resin (available from Asahi Kasei Corp., LEONA (registered trademark) 1300S) in an amount of 499.85 g and 0.15 g of Nigrosine C (nigrosine sulfate synthesized by modifying a sulfate ion concentration in accordance with the description of Japanese Patent Publication No. 3757081; sulfate ion 0.70% by mass; volume resistivity $0.9 \times 10^{10}$ $\Omega \cdot cm$; C.I. Solvent Black 5; a niline concentration is 0.05% by mass) were put in a tumbler made of stainless steel, followed by stirring and mixing them for 1 hour. A resin composition for the first laser-transmissible-absorptive resin member was prepared. The resultant resin composition for the first laser-transmissible-absorptive resin member was put in an injection molding machine, followed by molding it in the usual manner at 270° C. of a cylinder temperature and 60° C. of a mold temperature. The resultant resin composition for the first laser-transmissible-absorptive resin member was shaped into the one first laser-transmissible-absorptive resin member 1 having a size of 80 mm longitudinal length×50 mm lateral length×1 mm thickness and a square plate shape.

(2) Preparing a Second Laser-Transmissible-Absorptive Resin Member

A polyamide (PA) 66 resin (available from Asahi Kasei Corp., LEONA (registered trademark) 1300S) in an amount of 499.85 g and 0.15 g of Nigrosine C were put in a tumbler made of stainless steel, followed by stirring and mixing them for 1 hour. A resin composition for the second laser-transmissible-absorptive resin member was prepared. The resultant resin composition for the second laser-transmissible-absorptive resin member was put in an injection molding machine, followed by molding it in the usual manner at 270° C. of a cylinder temperature and 60° C. of a mold temperature. The resultant resin composition for the second laser-transmissible-absorptive resin member was shaped into the one second laser-transmissible-absorptive resin member 2 having a size of 80 mm longitudinal length×50 mm lateral length×1 mm thickness and a square plate shape.

The melt flow rate, the transmittance and the absorbance of the first laser-transmissible-absorptive resin member 1 and the second laser-transmissible-absorptive resin member 2 were measured in the same manner as Example 1-1. The results were shown in Table 2.

(3) Producing a Laser Welded Body

Using the above first laser-transmissible-absorptive resin member 1 and second laser-transmissible-absorptive resin member 2, a laser welded body 10 of Example 3 was produced in the same manner as Example 1-1. With respect to the obtained laser welded body 10, measuring the tensile strength and evaluating the welding state were performed in the same manner as Example 1-1. The results were shown in Table 2.

Examples 1-4 to 1-6

First laser-transmissible-absorptive resin members 1 and second laser-transmissible-absorptive resin members 2 used for producing laser welded bodies of Examples 1-4 to 1-6 were prepared in the same manner as Example 1-1 except that an amount of the polyamide (PA) 66 resin, an amount and kinds of Nigrosine, and an amount and kinds of Coloring agent were modified as shown in Table 1. Incidentally, Nigrosine A used in Example 1-5 had a sulfate ion 1.52% by mass, volume resistivity $2.7 \times 10^{10}$ Ω·cm and aniline concentration is 0.01% by mass. The melt flow rate, the transmittance and the absorbance of the both laser-transmissible-absorptive resin members 1, 2 were measured in the same manner as Example 1-1. Using the both laser-transmissible-absorptive resin members 1, 2, laser welded bodies 10 of Examples 1-4 to 1-6 were produced in the same manner as Example 1-1. With respect to the obtained laser welded bodies 10, measuring the tensile strength and evaluating the welding state were performed in the same manner as Example 1-1. The results were shown in Table 2.

Comparative Example 1-1

Each one of a first laser-transmissible-absorptive resin member and a second laser-transmissible-absorptive resin member having a size of 80 mm longitudinal length×50 mm lateral length×1 mm thickness were prepared in the same manner as Example 1-1 except that 0.10 g of Nigrosine base (available from ORIENT CHEMICAL INDUSTRIES CO., LTD., tradename: NUBIAN (registered trademark) BLACK PA-9801, C.I. Solvent Black 7) was used instead of Nigrosine A (nigrosine sulfate) which was used in Example 1-1. The melt flow rate, the transmittance and the absorbance of these resin members were measured in the same manner as Example 1-1. Using these resin members, a laser welded body 10 of Comparative example 1-1 was produced in the same manner as Example 1-1. With respect to the obtained laser welded body 10, measuring the tensile strength and evaluating the welding state were performed in the same manner as Example 1-1. The results were shown in Table 2.

Comparative Example 1-2

Each one of a first laser-transmissible-absorptive resin member and a second laser-transmissible-absorptive resin member having a size of 80 mm longitudinal length×50 mm lateral length×1 mm thickness were prepared in the same manner as Example 1-1 except that 0.15 g of nigrosine hydrochloride (available from ORIENT CHEMICAL INDUSTRIES CO., LTD., tradename: NUBIAN (registered trademark) BLACK NH-805, C.I. Solvent Black 5) was used instead of Nigrosine C (nigrosine sulfate) used in Example 1-3. The melt flow rate, the transmittance and the absorbance of these resin members were measured in the same manner as Example 1-1. Using these resin members, a laser welded body 10 of Comparative example 1-2 was produced in the same manner as Example 1-1. With respect to the obtained laser welded body 10, measuring the tensile strength and evaluating the welding state were performed in the same manner as Example 1-1. The results were shown in Table 2.

Comparative Example 1-3

Each one of a first laser-transmissible-absorptive resin member and a second laser-transmissible-absorptive resin member having a size of 80 mm longitudinal length×50 mm lateral length×1 mm thickness were prepared in the same manner as Example 1-4 except that 0.2 g of Nigrosine base (available from ORIENT CHEMICAL INDUSTRIES CO., LTD., tradename: NUBIAN (registered trademark) BLACK PA-9803, C.I. Solvent Black 7, Nigrosine base) was used instead of Nigrosine A (nigrosine sulfate). The melt flow rate, the transmittance and the absorbance of these resin members were measured in the same manner as Example 1-1. Using these resin members, a laser welded body 10 of Comparative example 1-3 was produced in the same manner as Example 1-1. With respect to the obtained laser welded body 10, measuring the tensile strength and evaluating the welding state were performed in the same manner as Example 1-1. The results were shown in Table 2.

TABLE 2

| | | Example | | | | | | Comparative example | | |
|---|---|---|---|---|---|---|---|---|---|---|
| | | 1-1 | 1-2 | 1-3 | 1-4 | 1-5 | 1-6 | 1-1 | 1-2 | 1-3 |
| First laser-transmissible-absorptive resin member | PA66 resin (g) | 496.90 | 497.85 | 499.85 | 497.80 | 496.80 | 499.70 | 496.90 | 499.85 | 497.80 |
| | Nigrosine | A | A | C | A | B | A | Nigrosine base | Nigrosine hydro-chloride | Nigrosine base |
| | Nigrosine amount (g) | 0.10 | 0.15 | 0.15 | 0.20 | 0.20 | 0.30 | 0.10 | 0.15 | 0.20 |
| | Coloring agent | A | D | — | C | E | — | A | — | C |
| | Coloring agent amount (g) | 3.0 | 2.0 | — | 2.0 | 3.0 | — | 3.0 | — | 2.0 |
| | Transmittance (%) | 68.3 | 61.5 | 61.5 | 52.2 | 52.3 | 39.2 | 68.2 | 61.5 | 52.4 |
| | Absorbance $a_1$ | 0.13 | 0.19 | 0.19 | 0.25 | 0.25 | 0.36 | 0.12 | 0.17 | 0.23 |
| | Melt flow rate (g/10 min) | 13.5 | 14.2 | 14.1 | 14.5 | 14.5 | 15.1 | 12.9 | 13.7 | 13.9 |
| Second laser-transmissible-absorptive resin member | PA66 resin (g) | 496.90 | 497.85 | 499.85 | 497.80 | 496.80 | 497.70 | 496.90 | 499.85 | 497.80 |
| | Nigrosine | A | A | C | A | B | A | Nigrosine base | Nigrosine hydro-chloride | Nigrosine base |
| | Nigrosine amount (g) | 0.10 | 0.15 | 0.15 | 0.20 | 0.20 | 0.15 | 0.10 | 0.15 | 0.20 |
| | Coloring agent | A | D | — | C | E | B | A | — | C |

TABLE 2-continued

|  |  | Example | | | | | | Comparative example | | |
|---|---|---|---|---|---|---|---|---|---|---|
|  |  | 1-1 | 1-2 | 1-3 | 1-4 | 1-5 | 1-6 | 1-1 | 1-2 | 1-3 |
|  | Coloring agent amount (g) | 3.0 | 2.0 | — | 2.0 | 3.0 | 2.0 | 3.0 | — | 2.0 |
|  | Transmittance (%) | 68.3 | 61.5 | 61.5 | 52.2 | 52.3 | 61.5 | 61.8 | 61.5 | 68.6 |
|  | Absorbance $a_2$ | 0.13 | 0.19 | 0.19 | 0.25 | 0.25 | 0.19 | 0.12 | 0.17 | 0.23 |
|  | Melt flow rate (g/10 min) | 13.5 | 14.2 | 14.1 | 14.5 | 14.5 | 14.1 | 12.9 | 13.7 | 13.9 |
| Absorbance ratio $a_1/a_2$ | | 1.00 | 1.00 | 1.00 | 1.00 | 1.00 | 1.89 | 1.00 | 1.00 | 1.00 |
| Laser welded body | Tensile strength (N) | 626 | 635 | 628 | 614 | 645 | 679 | 548 | 562 | 579 |
|  | Welding state | Excellent | Excellent | Excellent | Excellent | Excellent | Excellent | Excellent | Excellent | Excellent |

As seen from Table 2, the laser welded bodies of Examples 1-1 to 1-6 which used the resin members containing the nigrosine sulfate as the laser beam absorbent exhibited the high tensile strength i.e. the high welding strength as compared with the laser welded bodies of Comparative examples which used the resin members containing the nigrosine hydrochloride. Further, under the radiation condition which was 200 W of the high output power and 40 mm/second of the scan speed, no welding scars were observed. These laser welded bodies had an excellent welding state and also could be produced under high producing efficiency.

Example 2-1

(1) Preparing a First Laser-Transmissible-Absorptive Resin Member and a Second Laser-Transmissible-Absorptive Resin Member A polyamide (PA) 66 resin (available from Asahi Kasei Corp., LEONA (registered trademark) 1300S) in an amount of 497.90 g, 2.0 g of Coloring agent A and 0.10 g of Nigrosine A were put in a tumbler made of stainless steel, followed by stirring and mixing them for 1 hour. A resin composition for the first and second laser-transmissible-absorptive resin members was prepared. The resultant resin composition for the first and second laser-transmissible-absorptive resin members was put in an injection molding machine, followed by molding it in the usual manner at 270° C. of a cylinder temperature and 60° C. of a mold temperature. The resultant resin composition for the first and second laser-transmissible-absorptive resin members was shaped into each one of the first laser-transmissible-absorptive resin member 1 and the second laser-transmissible-absorptive resin member 2 having a size of 80 mm longitudinal length×50 mm lateral length×1 mm thickness and a square plate shape.

The melt flow rate, the transmittance and the absorbance of the first laser-transmissible-absorptive resin member 1 and the second laser-transmissible-absorptive resin member 2 were measured in the same manner as Example 1-1. The results were shown in Table 3.

(2) Producing a Laser Welded Body

Figure 2:
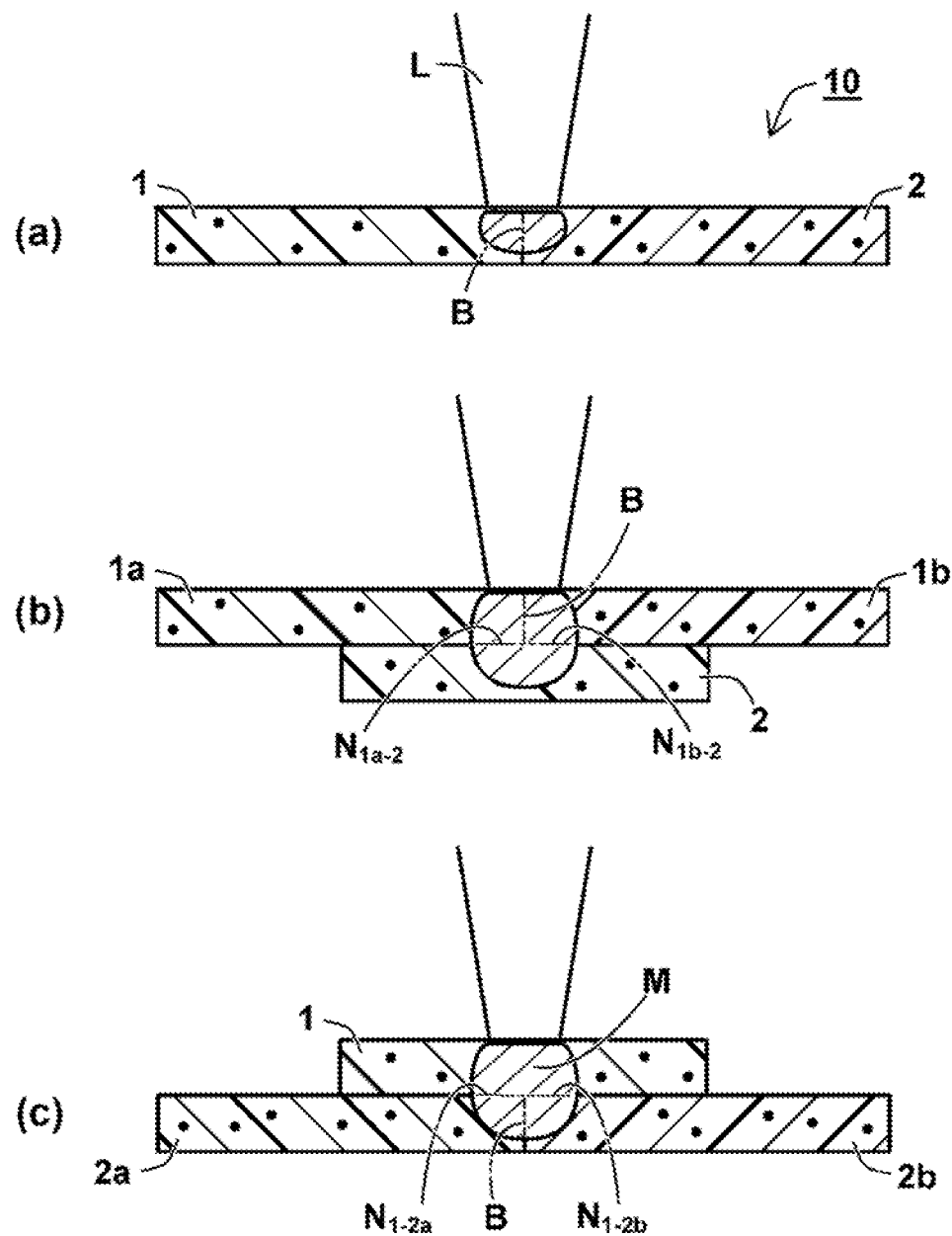
FIG. 2 is a schematic cross sectional view showing a scene from producing another laser welded body to which the present invention is applied.
Figure 3:
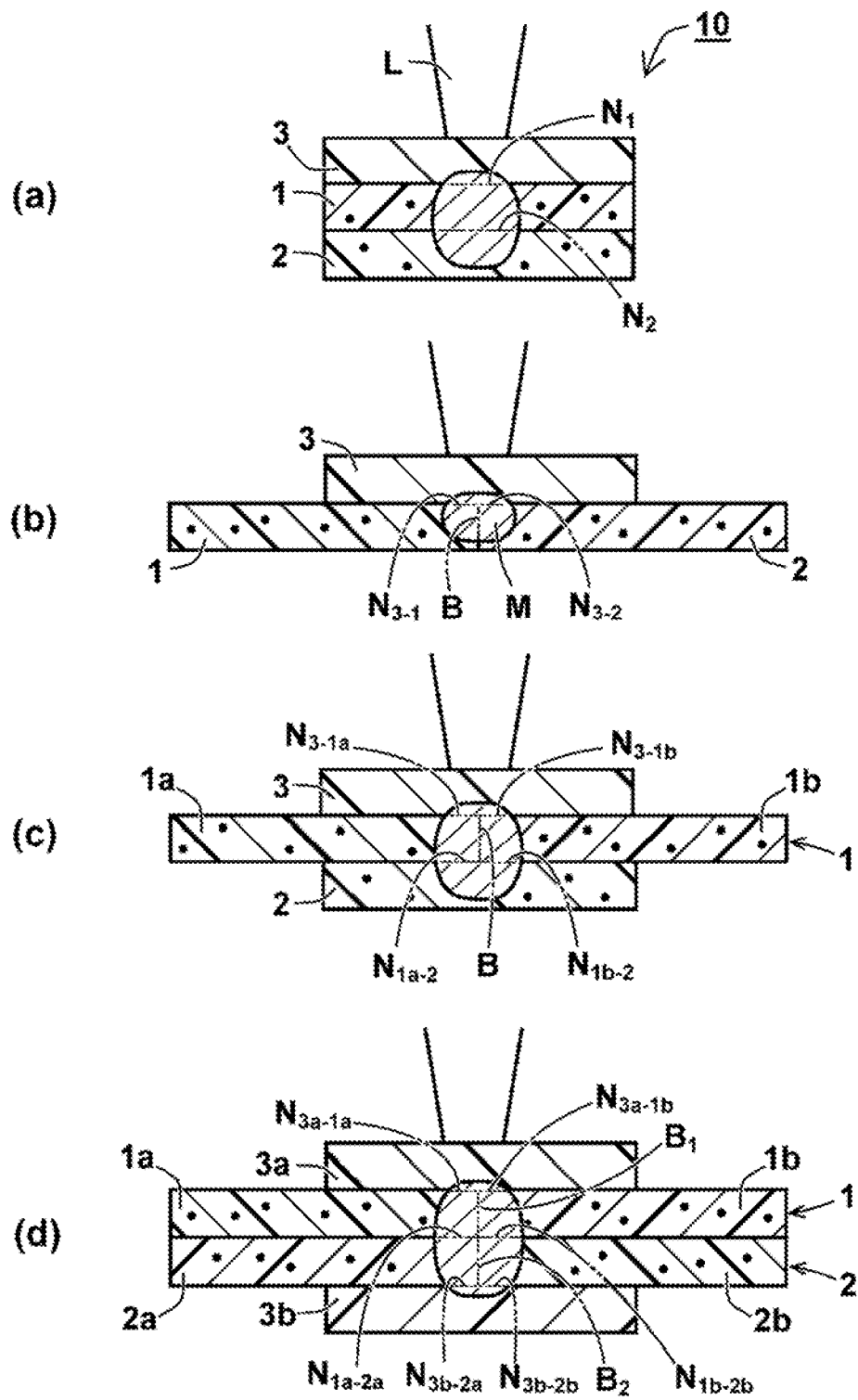
FIG. 3 is a schematic cross sectional view showing a scene from producing another laser welded body to which the present invention is applied.
Figure 4:
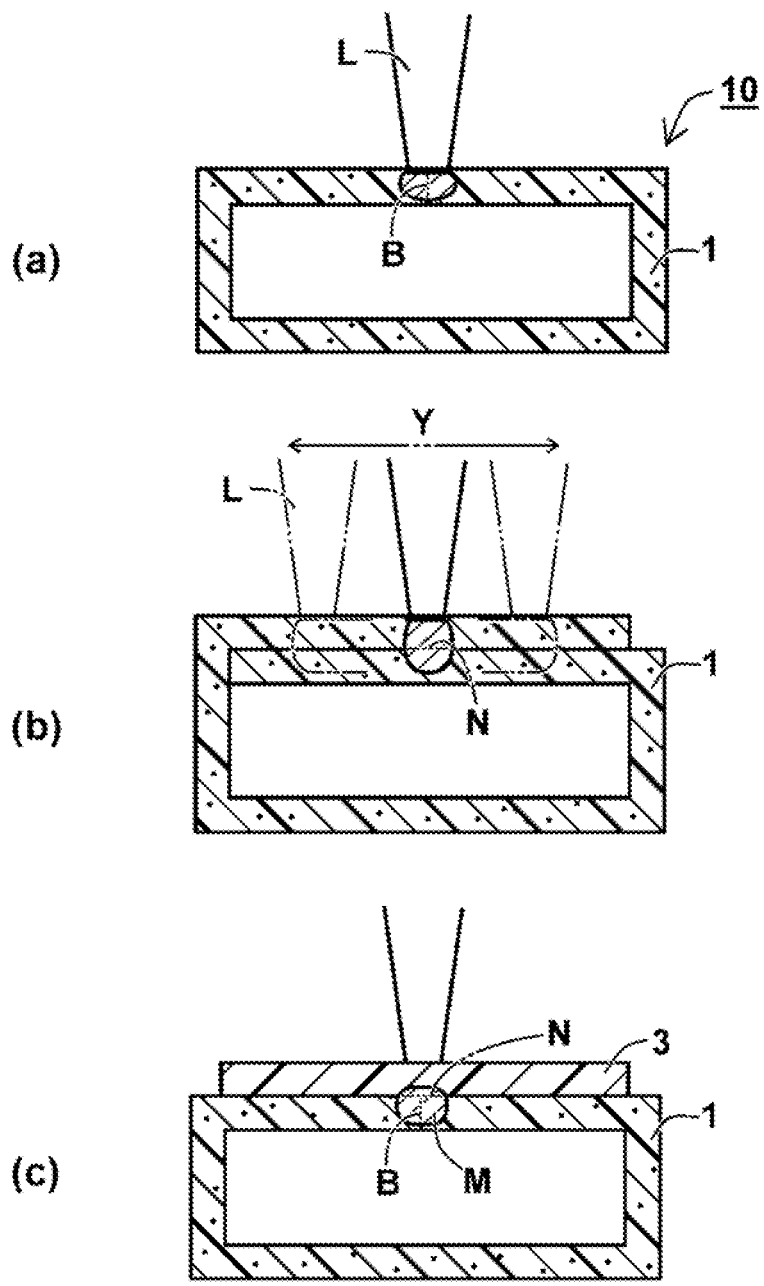
FIG. 4 is a schematic cross sectional view showing a scene from producing another laser welded body to which the present invention is applied.

As shown in FIG. 2(*a*), a butted part B was formed by butting respective edge parts of the first laser-transmissible-absorptive resin member 1 and the second laser-transmissible-absorptive resin member 2. A laser beam L was output from a diode laser having 200 W output power [wave length: 940 nm, continuously] (manufactured by Hamamatsu Photonics K.K.). Radiation of the laser beam L was approximately and vertically toward the butted part B. The laser beam L scanned at 40 mm/second of a scan speed and 20 mm of a scan distance along the butted part B in a straight line. A laser welded body 10 of Example 2-1, of which the butted part B was welded and the both laser-transmissible-absorptive resin members 1, 2 were integrated, was obtained. With respect to the obtained laser welded body 10, the tensile strength was measured in the same manner as Example 1-1 except for horizontally pulling along a direction in which the first laser-transmissible-absorptive resin member 1 and the second laser-transmissible-absorptive resin member 2 were separated. Further, the welding state was evaluated in the same manner as Example 1-1. The results were shown in Table 3.

Examples 2-2 to 2-5

First laser-transmissible-absorptive resin members 1 and second laser-transmissible-absorptive resin members 2 used for producing laser welded bodies of Examples 2-2 to 2-5 were prepared in the same manner as Example 2-1 except that an amount of the polyamide (PA) 66 resin, an amount and kinds of Nigrosine, and an amount and kinds of Coloring agent were modified as shown in Table 2. The melt flow rate, the transmittance and the absorbance of the both laser-transmissible-absorptive resin members 1, 2 were measured in the same manner as Example 1-1. Using the both laser-transmissible-absorptive resin members 1, 2, laser welded bodies 10 of Examples 2-2 to 2-5 were prepared in the same manner as Example 1-1. With respect to the obtained laser welded bodies 10, measuring the tensile strength and evaluating the welding state were performed in the same manner as Example 1-1. The results were shown in Table 3.

Comparative Example 2-1

Each one of a first laser-transmissible-absorptive resin member and a second laser-transmissible-absorptive resin member having a size of 80 mm longitudinal length×50 mm lateral length×1 mm thickness were prepared in the same manner as Example 2-1 except that 497.90 g of the polyamide (PA) 66 resin was and 0.10 g of nigrosine hydrochloride (available from ORIENT CHEMICAL INDUSTRIES CO., LTD., tradename: NUBIAN (registered trademark)

BLACK NH-805, C.I. Solvent Black 5, nigrosine hydrochloride) was used instead of Nigrosine A (nigrosine sulfate). The melt flow rate, the transmittance and the absorbance of these resin members were measured in the same manner as Example 1-1. Using these resin members, a laser welded body 10 of Comparative example 2-1 was produced in the same manner as Example 2-1. With respect to the obtained laser welded body 10, measuring the tensile strength and evaluating the welding state were performed in the same manner as Example 1-1. The results were shown in Table 3.

Comparative Example 2-2

Each one of a first laser-transmissible-absorptive resin member and a second laser-transmissible-absorptive resin member having a size of 80 mm longitudinal length×50 mm lateral length×1 mm thickness was prepared in the same manner as Example 2-2 except that 497.85 g of the polyamide (PA) 66 resin was used and 0.15 g of nigrosine hydrochloride (available from ORIENT CHEMICAL INDUSTRIES CO., LTD., tradename: NUBIAN (registered trademark) BLACK NH-805, C.I. Solvent Black 5, nigrosine hydrochloride) was used instead of Nigrosine A (nigrosine sulfate). The melt flow rate, the transmittance and the absorbance of these resin members were measured in the same manner as Example 1-1. Using these resin members, a laser welded body 10 of Comparative example 2-2 was produced in the same manner as Example 2-1. With respect to the obtained laser welded body 10, measuring the tensile strength and evaluating the welding state were performed in the same manner as Example 1-1. The results were shown in Table 3.

TABLE 3

|  |  | Example | | | | | Comparative example | |
|---|---|---|---|---|---|---|---|---|
|  |  | 2-1 | 2-2 | 2-3 | 2-4 | 2-5 | 2-1 | 2-2 |
| First laser-transmissible-absorptive resin member | PA66 resin (g) | 497.90 | 497.85 | 497.90 | 499.80 | 496.90 | 497.90 | 497.85 |
|  | Nigrosine | A | A | B | B | C | Nigrosine hydrochloride | Nigrosine hydrochloride |
|  | Nigrosine amount (g) | 0.10 | 0.15 | 0.10 | 0.20 | 0.10 | 0.10 | 0.15 |
|  | Coloring agent | A | F | D | — | B | A | F |
|  | Coloring agent amount (g) | 2.0 | 2.0 | 2.0 | — | 3.0 | 2.0 | 2.0 |
|  | Transmittance (%) | 68.3 | 61.8 | 68.6 | 52.6 | 68.6 | 61.8 | 61.8 |
|  | Absorbance $a_1$ | 0.13 | 0.18 | 0.12 | 0.24 | 0.12 | 0.11 | 0.17 |
|  | Melt flow rate (g/10 min) | 13.5 | 14.2 | 13.4 | 14.5 | 13.4 | 13.2 | 13.7 |
| Second laser-transmissible-absorptive resin member | PA66 resin (g) | 497.90 | 497.85 | 497.90 | 499.80 | 499.90 | 497.90 | 497.85 |
|  | Nigrosine | A | A | B | B | C | Nigrosine hydrochloride | Nigrosine hydrochloride |
|  | Nigrosine amount (g) | 0.10 | 0.15 | 0.10 | 0.20 | 0.10 | 0.10 | 0.15 |
|  | Coloring agent | A | F | D | — | — | A | F |
|  | Coloring agent amount (g) | 2.0 | 2.0 | 2.0 | — | — | 2.0 | 2.0 |
|  | Transmittance (%) | 68.3 | 61.8 | 61.8 | 52.6 | 68.6 | 61.8 | 61.8 |
|  | Absorbance $a_2$ | 0.13 | 0.18 | 0.12 | 0.24 | 0.12 | 0.11 | 0.17 |
|  | Melt flow rate (g/10 min) | 13.5 | 14.2 | 13.4 | 14.5 | 13.4 | 13.2 | 13.7 |
|  | Absorbance ratio $a_1/a_2$ | 1.00 | 1.00 | 1.00 | 1.00 | 1.00 | 1.00 | 1.00 |
| Laser welded body | Tensile strength (N) | 612 | 628 | 632 | 671 | 642 | 529 | 536 |
|  | Welding state | Excellent | Excellent | Excellent | Excellent | Excellent | Excellent | Excellent |

As seen from Table 3, the laser welded bodies of Examples 2-1 to 2-5 which used the resin members containing the nigrosine sulfate as the laser beam absorbent had the high tensile strength i.e. the high welding strength as compared with the laser welded bodies of Comparative examples containing the nigrosine hydrochloride, no welding scars and an excellent welding state.

Example 3-1

(1) Preparing a First Laser-Transmissible-Absorptive Resin Member and a Second Laser-Transmissible-Absorptive Resin Member A polyamide (PA) 66 resin (available from Asahi Kasei Corp., LEONA (registered trademark) 1300S) in an amount of 499.9 g and 0.1 g of Nigrosine A were put in a tumbler made of stainless steel, followed by stirring and mixing them for 1 hour. A resin composition for the first laser-transmissible-absorptive resin member was prepared. Further, a polyamide (PA) 66 resin (available from Asahi Kasei Corp., LEONA (registered trademark) 1300S) in an amount of 499.85 g and 0.15 g of Nigrosine A were put in a tumbler made of stainless steel, followed by stirring and mixing them for 1 hour. A resin composition for the second laser-transmissible-absorptive resin member was prepared. The resultant resin compositions for the first and second laser-transmissible-absorptive resin members were put in an injection molding machine, followed by molding it in the usual manner at 270° C. of a cylinder temperature and 60° C. of a mold temperature. The resultant resin compositions for the first and second laser-transmissible-absorptive resin members were shaped into each one of a first laser-transmissible-absorptive resin member 1 and a second laser-transmissible-absorptive resin member 2 having a size of 80 mm longitudinal length×50 mm lateral length×1 mm thickness and a square plate shape. The transmittance and the absorbance of the both laser-transmissible-absorptive resin members 1, 2 were measured in the same manner as Example 1-1. The results were shown in Table 4.

(2) Producing a Laser Welded Body

A contacted part, which had an interspace of 2000 μm at a maximum between the first laser-transmissible-absorptive resin member 1 and the second laser-transmissible-absorptive resin member 2 overlapped as shown in FIG. 1, formed by sandwiching an interspace gauge between the first laser-transmissible-absorptive resin member 1 and the second laser-transmissible-absorptive resin member 2. A laser beam L was output from a diode laser having 200 W output power [wave length: 940 nm, continuously]. Radiation of the laser beam L was approximately and vertically performed relative to the face of the first laser-transmissible-absorptive resin member 1 from an upper direction thereof. The laser beam L scanned at 40 mm/second of a scan speed and 20 mm of a scan distance so as to traverse the resin members from one of a long side thereof in a straight line. In the result, the laser welded body 10 of Example 3-1 of which the both laser-transmissible-absorptive resin members 1, 2 were integrated by welding at the contacted part N. With respect to the obtained laser welded body 10, measuring the tensile strength and evaluating the welding state were performed in the same manner as Example 1-1. The results were shown in Table 4.

Example 3-2

(1) Preparing a First Laser-Transmissible-Absorptive Resin Member and a Second Laser-Transmissible-Absorptive Resin Member A polyamide (PA) 66 resin (available from Asahi Kasei Corp., LEONA (registered trademark) 1300S) in an amount of 497.85 g and 2.0 g of Coloring agent D and 0.15 g of Nigrosine A were put in a tumbler made of stainless steel, followed by stirring and mixing them for 1 hour. A resin composition for the first and second laser-transmissible-absorptive resin members was prepared. The resultant resin composition for the first and second laser-transmissible-absorptive resin members was put in an injection molding machine, followed by molding it in the usual manner at 270° C. of a cylinder temperature and 60° C. of a mold temperature. The resultant resin composition for the first and second laser-transmissible-absorptive resin members was shaped into each one of the first laser-transmissible-absorptive resin member 1 and the second laser-transmissible-absorptive resin member 2 having a size of 80 mm longitudinal length×50 mm lateral length×1 mm thickness and a square plate shape. The transmittance and the absorbance of the both laser-transmissible-absorptive resin members 1, 2 were measured in the same manner as Example 1-1. The results were shown in Table 4.

(2) Producing a Laser Welded Body

Using the produced first laser-transmissible-absorptive resin member 1 and second laser-transmissible-absorptive resin member 2, the laser welded body 10 of Example 3-2 was prepared in the same manner as Example 3-1. With respect to the obtained laser welded body 10, measuring the tensile strength and evaluating the welding state were performed in the same manner as Example 1-1. The results were shown in Table 4.

Comparative Example 3

A laser-transmissible resin member was prepared in the same manner as Example 3-1 except that the polyamide (PA) 66 resin (available from Asahi Kasei Corp., LEONA (registered trademark) 1300S) in an amount of 500.0 g was used. Further, a laser-absorptive resin member was prepared in the same manner as Example 3-1 except that the polyamide 66 resin (available from Asahi Kasei Corp., LEONA (registered trademark) 1300S) in an amount of 496.0 g and 4.0 g of Nigrosine A were used. The transmittance and the absorbance of these resin members were measured in the same manner as Example 1-1. In addition, the radiation of the laser beam was performed by using these resin members in the same manner as Example 3-1. However the resin members could not be welded and thus, no laser welded body was obtained.

TABLE 4

|  |  | Example | | Comparative |
|---|---|---|---|---|
|  |  | 3-1 | 3-2 | example 3 |
| First laser-transmissible-absorptive resin member or Laser-transmissible resin member | PA66 resin (g) | 499.9 | 497.85 | 500.0 |
|  | Nigrosine | A | A | — |
|  | Nigrosine amount (g) | 0.1 | 0.15 | — |
|  | Coloring agent | — | D | — |
|  | Coloring agent amount (g) | — | 2.0 | — |
|  | Transmittance (%) | 68.6 | 61.3 | 80.3 |
|  | Absorbance $a_1$ | 0.12 | 0.19 | 0.05 |
| Second laser-transmissible-absorptive resin member or Laser-absorptive resin member | PA66 resin (g) | 499.85 | 497.85 | 496.0 |
|  | Nigrosine | A | A | A |
|  | Nigrosine amount (g) | 0.15 | 0.4 | 4.0 |
|  | Coloring agent | — | D | — |
|  | Coloring agent amount (g) | — | 2.0 | — |
|  | Transmittance (%) | 61.8 | 61.2 | 0 |
|  | Absorbance $a_2$ | 0.18 | 0.19 | — |
|  | Absorbance ratio $a_1/a_2$ | 0.67 | 1.00 | — |
| Laser welded body | Tensile strength (N) | 562 | 594 | Without welding |
|  | Welding state | Excellent. | Excellent | Without welding |

As seen from Table 4, the laser welded bodies of Examples 3-1 and 3-2 which used the resin members containing the nigrosine sulfate as the laser beam absorbent had the high tensile strength i.e. the high welding strength, no welding scars and an excellent welding state. It is considered that this is because not only the second laser-transmissible-absorptive resin member 2 but also the first laser-transmissible-absorptive resin member 1 occur exotherm and melting by irradiating with the laser beam. According to the present invention, even when the interspace between the resin members is existed, the laser welded body which is strongly welded can be obtained. Therefore it can be applied to sink marks and convex-concave shapes which are formed through a molding step of the resin member and thus, the laser-welding can be stably performed. In contrast, in Comparative example combining the laser-transmissible resin member and the laser-absorptive resin member, these resin members were not welded. It is considered that this is because exotherm and melting which were occurred at only the laser-absorptive resin member by the radiation of the laser beam did not conduct and expand to the laser-transmissible resin member to such extent to weld the resin members.

Example 4-1

(1) Preparing a First Laser-Transmissible-Absorptive Resin Member and a Second Laser-Transmissible-Absorptive Resin Member A polyamide (PA) 66 resin (available from Asahi Kasei Corp., LEONA (registered trademark) 1300S) in an amount of in the usual 499.85 g and 0.15 g of Nigrosine A were put in in a tumbler made of stainless steel, followed by stirring and mixing them for 1 hour. A resin composition for the first and second laser-transmissible-absorptive resin members was prepared. The resultant resin composition for the first and second laser-transmissible-absorptive resin members was put in an injection molding machine, followed by molding it in the usual manner at 270° C. of a cylinder temperature and 60° C. of a mold temperature. Each one of the first laser-transmissible-absorptive resin member 1, and a second laser-transmissible-absorptive resin member piece 2a and a second laser-transmissible-absorptive resin member piece 2b as the second laser-transmissible-absorptive resin member 2 having a size of 80 mm longitudinal length×50 mm lateral length×1 mm thickness and a square plate shape were obtained. The transmittance and the absorbance of these resin members were measured in the same manner as Example 1-1. Consequently, the absorbances $a_1$, $a_{2-1}$, $a_{2-2}$, were 0.18 and the transmittances were 61.8%.
(2) Producing a Laser Welded Body As shown in FIG. 2(c), a butted part B was formed by butting and adjoining ends of the second laser-transmissible-absorptive resin member pieces 2a, 2b each other. A contacted part $N_{1-2a}$ and a contacted part $N_{1-2b}$ were formed by putting the first laser-transmissible-absorptive resin member 1 on the both second laser-transmissible-absorptive resin member pieces 2a, 2b so as to cover to the butted part B. The contacted part $N_{1-2a}$ was a contacted face between the first laser-transmissible-absorptive resin member 1 and the second laser-transmissible-absorptive resin member piece 2a. The contacted part $N_{1-2b}$ was a contacted face between the first laser-transmissible-absorptive resin member 1 and the second laser-transmissible-absorptive resin member piece 2b. A laser beam L was output from a diode laser having 200 W output power [wave length: 940 nm, continuously]. The laser beam L was radiated approximately and vertically with respect to a face of the first laser-transmissible-absorptive resin member 1 from an upper side thereof toward the butted part B. The laser beam L scanned at 40 mm/second of a scan speed and 20 mm of a scan distance along the butted part B in a straight line. In the result, the laser welded body 10 of Example 4-1, of which the butted part B and the contacted parts $N_{1-2b}$, $N_{1-2a}$ were welded and the both laser-transmissible-absorptive resin members 1, 2 were integrated, was obtained. With respect to the obtained laser welded body 10, the tensile strength was measured in the same manner as Example 1-1 except for horizontally pulling along a direction in which the second laser-transmissible-absorptive resin member piece 2a and the second laser-transmissible-absorptive resin member piece 2b are separated. Further, the welding state was evaluated in the same manner as Example 1-1. Consequently, the tensile strength was 711 N, and the welding state was Excellent.

Example 4-2

(1) Preparing a First Laser-Transmissible-Absorptive Resin Member and a Second Laser-Transmissible-Absorptive Resin Member A polyamide (PA) 66 resin (available from Asahi Kasei Corp., LEONA (registered trademark) 1300S) in an amount of 499.85 g and 0.15 g of Nigrosine A were put in a tumbler made of stainless steel, followed by stirring and mixing them for 1 hour. A resin composition for the first and second laser-transmissible-absorptive resin members was prepared. The resultant resin composition for the first and second laser-transmissible-absorptive resin members was put in an injection molding machine, followed by molding it in the usual manner at 270° C. of a cylinder temperature and 60° C. of a mold temperature. Each one of a first laser-transmissible-absorptive resin member piece 1a and a first laser-transmissible-absorptive resin member piece 1b which are the first laser-transmissible-absorptive resin member 1, and the second laser-transmissible-absorptive resin member 2 having a size of 80 mm longitudinal length×50 mm lateral length×1 mm thickness and square plate shape were obtained. The transmittance and the absorbance of these resin members were measured in the same manner as Example 1-1. Consequently, the absorbances $a_{1-1}$, $a_{1-2}$, $a_2$, were 0.18 and the transmittance was 61.8%.
(2) Producing a Laser Welded Body As shown in FIG. 2(b), a butted part B was formed by butting ends of the first laser-transmissible-absorptive resin member pieces 1a, 1b each other. A contacted part $N_{1a-2}$ and a contacted part $N_{1b-2}$ were formed by putting the second laser-transmissible-absorptive resin member 2 on the first laser-transmissible-absorptive resin member pieces 1a, 1b so as to overlap to the butted part B. The contacted part $N_{1a-2}$ was a contacted face between the first laser-transmissible-absorptive resin member piece 1a and the second laser-transmissible-absorptive resin member 2. The contacted part $N_{1b-2}$ was a contacted face between the first laser-transmissible-absorptive resin member piece 1b and the second laser-transmissible-absorptive resin member 2. A laser beam L was output from a diode laser having 200 W output power [wave length: 940 nm, continuously]. The laser beam L was approximately and vertically radiated from an upper direction of the first laser-transmissible-absorptive resin member 1 to the butted part B. The laser beam L scanned at 40 mm/second of a scan speed and 20 mm of a scan distance along the butted part B in a straight line. A laser welded body 10 of Example 4-2, of which the butted part B and the contacted parts $N_{1a-2}$, $N_{1b-2}$ were welded and the both laser-transmissible-absorptive resin members 1, 2 were integrated, was obtained. With respect to the obtained laser welded body 10, the tensile strength was measured in the same manner as Example 1-1 except for horizontally pulling along a direction in which the first laser-transmissible-absorptive resin member piece 1a and the first laser-transmissible-absorptive resin member piece 1b were separated. Further, the welding state was evaluated in the same manner as Example 1-1. Consequently, the tensile strength was 698 N, and the welding state was Excellent.

Example 5

(1) Preparing a Laser-Transmissible Resin Member

A polyamide (PA) 66 resin (available from Asahi Kasei Corp., LEONA (registered trademark) 1300S) in an amount of 500.0 g was put in a tumbler made of stainless steel, followed by stirring and mixing them for 1 hour. A resin composition for the laser-transmissible resin member was prepared. The resultant resin composition for the laser-transmissible resin member was put in an injection molding machine, followed by molding it in the usual manner at 270° C. of a cylinder temperature and 60° C. of a mold temperature. The laser-transmissible resin member 3 as a laser-irradiated subject having a size of 80 mm longitudinal length×50 mm lateral length×1 mm thickness and a square plate shape was obtained. The transmittance and the absorbance of the laser-transmissible resin member 3 were measured in the same manner as Example 1-1. Consequently, the absorbance b were 0.05 and the transmittance was 80.3%.

(2) Preparing a First Laser-Transmissible-Absorptive Resin Member and a Second Laser-Transmissible-Absorptive Resin Member The first laser-transmissible-absorptive resin member 1 and the second laser-transmissible-absorptive resin member 2 were prepared in the same manner as preparing the first laser-transmissible-absorptive resin member in Example 3-1. The transmittance and the absorbance of the both laser-transmissible-absorptive resin members 1, 2 were measured in the same manner as Example 1-1. Consequently, the absorbances $a_1$, $a_2$ were 0.12 and the transmittance was 68.6%.

(3) Producing a Laser Welded Body

As shown in FIG. 3(a), an upper contacted part $N_1$ and a lower contacted part $N_2$ were formed by overlapping the laser-transmissible resin member 3 as the laser-irradiated subject, the first laser-transmissible-absorptive resin member 1 and the second laser-transmissible-absorptive resin member 2 in this order. The upper contacted part $N_1$ was a contacted face between the laser-transmissible resin member 3 and the first laser-transmissible-absorptive resin member 1. The lower contacted part $N_2$ was a contacted face between the laser-transmissible resin member 3 and the second laser-transmissible-absorptive resin member 2. A laser beam L was output from a diode laser having 200 W output power [wave length: 940 nm, continuously]. Radiation of the laser beam L was approximately and vertically performed relative to the face of the laser-transmissible resin member 3 from an upper direction thereof. The laser beam L scanned at 40 mm/second of a scan speed and 20 mm of a scan distance so as to traverse the resin members from one of a long side thereof in a straight line. In the result, the laser welded body 10 of Example 5 of which the laser-transmissible resin member 3, the first laser-transmissible-absorptive resin member 1 and the second laser-transmissible-absorptive resin member 2 were integrated by welding at the contacted part N. The welding state of the laser welded body 10 was Excellent.

Example 6-1

(1) Preparing a Laser-Transmissible Resin Member

The laser-transmissible resin member 3 as a laser-irradiated subject was prepared in the same manner as Example 5. The transmittance and the absorbance of the laser-transmissible resin member 3 were measured in the same manner as Example 1-1. The results were shown in Table 5.

(2) Preparing a First Laser-Transmissible-Absorptive Resin Member and a Second Laser-Transmissible-Absorptive Resin Member A polyamide (PA) 66 resin (available from Asahi Kasei Corp., LEONA (registered trademark) 1300S) in an amount of 499.85 g and 0.15 g of Nigrosine A were put in a tumbler made of stainless steel, followed by stirring and mixing them for 1 hour. A resin composition for the first and second laser-transmissible-absorptive resin members was prepared. The resultant resin composition for the first and second laser-transmissible-absorptive resin member was put in an injection molding machine, followed by molding it in the usual manner at 270° C. of a cylinder temperature and 60° C. of a mold temperature. The resultant resin composition for the first and second laser-transmissible-absorptive resin member was shaped into each one of the first laser-transmissible-absorptive resin member 1 and the second laser-transmissible-absorptive resin member 2 having a size of 80 mm longitudinal length×50 mm lateral length×1 mm thickness and a square plate shape. The transmittance and the absorbance of the both laser-transmissible-absorptive resin members 1, 2 were measured in the same manner as Example 1-1. The results were shown in Table 5.

(3) Producing a Laser Welded Body

As shown in FIG. 3(b), a butted part B was formed by butting and adjoining ends of the both laser-transmissible-absorptive resin members 1, 2 each other. The laser-transmissible resin member 3 was put on the both resin members 1, 2 so as to cover the butted part B. Thereby a contacted part $N_{3-1}$, which is a contacted face between the laser-transmissible resin member 3 and the first laser-transmissible-absorptive resin member 1, and a contacted part $N_{3-2}$ which is a contacted face the laser-transmissible resin member 3 and the second laser-transmissible-absorptive resin member 2 were formed. A laser beam L was output from a diode laser having 200 W output power [wave length: 940 nm, continuously]. The laser beam L was radiated approximately and vertically with respect to a face of the first laser-transmissible-absorptive resin member 1 from an upper side thereof toward the butted part B. The laser beam L scanned at 40 mm/second of a scan speed and 20 mm of a scan distance along the butted part B in a straight line. A laser welded body 10 of Example 6-1, of which the butted part B and the contacted parts $N_{3-1}$, $N_{3-2}$ were welded and the respective resin members 1, 2, 3 were integrated, was obtained. With respect to the obtained laser welded body 10, measuring the tensile strength and evaluating the welding state were performed in the same manner as Example 1-1. The results were shown in Table 5.

Example 6-2

(1) Preparing a Laser-Transmissible Resin Member

A laser-transmissible resin member 3 for a laser-irradiated subject was prepared in the same manner as Example 5 except that a polyamide (PA) 66 resin (available from Asahi Kasei Corp., LEONA (registered trademark) 1300S) in an amount of 496.99 g and 3.0 g of Coloring agent E and 0.01 g of Nigrosine A were put in a tumbler made of stainless steel, followed by stirring and mixing them for 1 hour. The transmittance and the absorbance of the laser-transmissible resin member 3 were measured in the same manner as Example 1-1. The results were shown in Table 5.

(2) Preparing a First Laser-Transmissible-Absorptive Resin Member and a Second Laser-Transmissible-Absorptive Resin Member The first laser-transmissible-absorptive resin member 1 and the second laser-transmissible-absorptive resin member 2 were prepared in the same manner as Example 6-1. The transmittance and the absorbance of the both laser-transmissible-absorptive resin members 1, 2 were measured in the same manner as Example 1-1. The results were shown in Table 5.

(3) Producing a Laser Welded Body

A laser welded body 10 of Example 6-2 was produced in the same manner as Example 6-1. With respect to the obtained laser welded body 10, measuring the tensile strength and evaluating the welding state were performed in the same manner as Example 1-1. The results were shown in Table 5.

Example 6-3

(1) Preparing a Laser-Transmissible Resin Member

The laser-transmissible resin member 3 was prepared in the same manner as Example 5 except that a polyamide (PA) 66 resin (available from Asahi Kasei Corp., LEONA (registered trademark) 1300S) in an amount of 497.0 g and 3.0 g of an anthraquinone blue color oil soluble dye (C.I. Solvent Blue 104) were put in a tumbler made of stainless steel, followed by stirring and mixing them for 1 hour. The transmittance and the absorbance of the laser-transmissible resin member 3 were measured in the same manner as Example 1-1. The results were shown in Table 5.

(2) Preparing a First Laser-Transmissible-Absorptive Resin Member and a Second Laser-Transmissible-Absorptive Resin Member The first laser-transmissible-absorptive resin member 1 and the second laser-transmissible-absorptive resin member 2 were prepared in the same manner as Example 6-1. The transmittance and the absorbance of the both laser-transmissible-absorptive resin members 1, 2 were measured in the same manner as Example 1-1. The results were shown in Table 5.

(3) Producing a Laser Welded Body

The laser welded body 10 of Example 6-3 was prepared in the same manner as Example 6-1. With respect to the obtained laser welded body 10, measuring the tensile strength and evaluating the welding state were performed in the same manner as Example 1-1. The results were shown in Table 5.

TABLE 5

|  |  | Example | | |
|---|---|---|---|---|
|  |  | 6-1 | 6-2 | 6-3 |
| Laser-transmissible resin member | PA66 resin (g) | 500.00 | 496.99 | 497.0 |
|  | Nigrosine | — | A | — |
|  | Nigrosine amount (g) | — | 0.01 | — |
|  | Coloring agent | — | E | C.I. Solvent Blue 104 |
|  | Coloring agent amount (g) | — | 3.0 | 3.0 |
|  | Transmittance (%) | 80.3 | 73.2 | 77.9 |
|  | Absorbance $a_3$ | 0.05 | 0.08 | 0.06 |
| First and second laser-transmissible-absorptive resin member | PA66 resin (g) | 499.85 | 499.85 | 499.85 |
|  | Nigrosine | A | A | A |
|  | Nigrosine amount (g) | 0.15 | 0.15 | 0.15 |
|  | Coloring agent | — | — | — |
|  | Coloring agent amount (g) | — | — | — |
|  | Transmittance (%) | 61.8 | 61.8 | 61.8 |
|  | Absorbance $a_1, a_2$ | 0.18 | 0.18 | 0.18 |
|  | Absorbance ratio $a_1/a_2$ | 1.0 | 1.0 | 1.0 |
| Laser welded body | Tensile strength (N) | 699 | 616 | 641 |
|  | Welding state | Excellent | Excellent | Excellent |

As seen from Table 5, the laser welded bodies of Examples 6-1 to 6-3 which used the resin members containing the nigrosine sulfate as the laser beam absorbent had the high tensile strength i.e. the high welding strength, no welding scars and an excellent welding state and also could be produced under high producing efficiency, even when the contacted part and the butted parts as the adjoined part were irradiated with the laser beam L at 100 mm/second of the high scan speed.

Example 6-4

(1) Preparing a Laser-Transmissible Resin Member

The two laser-transmissible resin members 3 were prepared in the same manner as Example 5 except that a polyamide (PA) 66 resin (available from Asahi Kasei Corp., LEONA (registered trademark) 1300S) in an amount of 497.0 g and 3.0 g of Coloring agent B were put in a tumbler made of stainless steel, followed by stirring and mixing them for 1 hour. The transmittance and the absorbance of the laser-transmissible resin member 3 were measured in the same manner as Example 1-1. The results were shown in Table 6.

(2) Preparing a First Laser-Transmissible-Absorptive Resin Member and a Second Laser-Transmissible-Absorptive Resin Member The two first laser-transmissible-absorptive resin members 1 and the two second laser-transmissible-absorptive resin member 2 were prepared in the same manner as Example 3-1. The transmittance and the absorbance of the both laser-transmissible-absorptive resin members 1, 2 were measured in the same manner as Example 1-1. The results were shown in Table 6.

(3) Producing a Laser Welded Body

As shown in FIG. 3(d), an upper butted part $B_1$ was formed by butting and adjoining ends of the first laser-transmissible-absorptive resin member pieces 1a, 1b which are the first laser-transmissible-absorptive resin member 1 each other. Further, a lower butted part $B_2$ was formed by butting and adjoining ends of the second laser-transmissible-absorptive resin member pieces 2a, 2b, which are the second laser-transmissible-absorptive resin member 2 each other.

The first laser-transmissible-absorptive resin member 1 and the second laser-transmissible-absorptive resin member 2 were overlapped so that the both butted parts $B_1$, $B_2$ vertically overlapped. The both laser-transmissible-absorptive resin members 1, 2 which were overlapped were sandwiched between the upper laser-transmissible resin member 3a as the laser-irradiated subject and the lower laser-transmissible resin member 3b. The upper laser-transmissible resin member 3a was placed therein so as to come into contact with the upper butted part $B_1$. The lower laser-transmissible resin member 3b was placed therein so as to come into contact with the upper butted part $B_2$. Thereby, the butted parts $B_1$, $B_2$ and the contacted parts $N_{3a-1a}$, $N_{3a-1b}$, $N_{1a-2a}$, $N_{1b-2b}$, $N_{ab-2a}$, $N_{3b-2b}$ were formed.

A laser beam L was output from a diode laser having 200 W output power [wave length: 940 nm, continuously]. The laser beam L was radiated approximately and vertically with respect to a face of the upper laser-transmissible resin member 3a from an upper side thereof toward the both butted parts $B_1$, $B_2$. The laser beam L scanned at 40 mm/second of a scan speed and 20 mm of a scan distance along the butted parts $B_1$, $B_2$ in a straight line. In the result, the laser welded body 10 of Example 6-4 was obtained. In laser welded body 10, the butted parts $B_1$, $B_2$ and the contacted parts $N_{3a-1a}$, $N_{3a-1b}$, $N_{1a-2a}$, $N_{1b-ab}$, $N_{3b-2a}$, $N_{3b-2b}$ were welded, and the resin members 1, 2, 3a, 3b were integrated. With respect to the obtained laser welded body 10, the tensile strength was measured in the same manner as Example 1-1 except for horizontally pulling along a direction in which each the first laser-transmissible-absorptive resin member piece 1a and the first laser-transmissible-absorptive resin member piece 1b were separated, and the second laser-transmissible-absorptive resin member piece 2a and the second laser-transmissible-absorptive resin member piece 2b were separated. Further, the welding state was evaluated in the same manner as Example 1-1. The results were shown in Table 6.

TABLE 6

|  |  | Example 6-4 |
|---|---|---|
| Laser-transmissible resin member | PA66 resin (g) | 497.0 |
|  | Nigrosine | — |
|  | Nigrosine amount (g) | — |
|  | Coloring agent | B |
|  | Coloring agent amount (g) | 3.0 |
|  | Transmittance (%) | 77.2 |
|  | Absorbance | 0.07 |
| First and second laser-transmissible-absorptive resin members | PA66 resin (g) | 499.85 |
|  | Nigrosine | A |
|  | Nigrosine amount (g) | 0.15 |
|  | Coloring agent | — |
|  | Coloring agent amount (g) | — |
|  | Transmittance (%) | 61.8 |
|  | Absorbance | 0.18 |
| Laser welded body | $a_1$, $a_2$ Tensile strength (N) | 1867 |
|  | Welding state | Excellent |

As seen from Table 6, the laser welded body of Example 6-4 which used the resin members containing the nigrosine sulfate as the laser beam absorbent had the high tensile strength i.e. the high welding strength, no welding scars and an excellent welding state despite a four-layered structure.

Example 7-1

(1) Preparing a First Laser-Transmissible-Absorptive Resin Member

A polyamide (PA) 66 resin (available from Asahi Kasei Corp., LEONA (registered trademark) 1300S) in an amount of 494.85 g and 0.15 g of Nigrosine A and 5.0 g of Coloring agent C were put in a tumbler made of stainless steel, followed by stirring and mixing them for 1 hour. A resin composition for the first laser-transmissible-absorptive resin member was prepared. The resultant resin composition for the first laser-transmissible-absorptive resin member was put in an injection molding machine, followed by molding it in the usual manner at 270° C. of a cylinder temperature and 60° C. of a mold temperature. Thereby a lid 4 as the first laser-transmissible-absorptive resin member was produced. The lid 4 shown in FIG. 9(a) which is the perspective view had a head part 4a having a disk shape and a sleeve part 4b having a cylindrical shape coaxially aligned therewith. An outer dimension of the head part 4a was 50 mm outer diameter×2 mm thickness. An outer dimension of the sleeve part 4b was 42 mm outer diameter×4 mm height. The lid 4 had a stepped part 4c having 4 mm width at a circumference face thereof due to an outer diameter difference between the head part 4a and the sleeve part 4b.

(2) Preparing a Second Laser-Transmissible-Absorptive Resin Member

A polyamide (PA) 66 resin, Nigrosine A, and Coloring agent C were stirred and mixed in the same manner as the above preparing first laser-transmissible-absorptive resin member 1. A resin composition for a second laser-transmissible-absorptive resin member was obtained. The resultant resin composition for the second laser-transmissible-absorptive resin member was put in an injection molding machine, followed by molding it in the usual manner at 270° C. of a cylinder temperature and 60° C. of a mold temperature. A cylindrical container 5 shown in FIG. 9(a) was produced. The cylindrical container 5 had a bottom part having a circular shape, a circumferential wall erecting at the circumference of the bottom part toward an upper direction and an opening edge 5a opening at an upper end of the circumferential wall. An outer dimension of the cylindrical container 5 was 50 mm outer diameter×35 mm height. An inner dimension thereof was 43 mm inner diameter×32 mm height. The cylindrical container 5 had 3 mm of a wall thickness.

The transmittance and the absorbance of the lid 4 and the cylindrical container 5 were measured in the same manner as Example 1-1. The results were shown in Table 7.

(3) Producing a Laser Welded Body

The sleeve part 4b of the lid 4 was inserted from the opening edge 5a into a cavity of the cylindrical container 5. The lid 4 and the cylindrical container 5 were fitted by holding with hands. As shown in FIG. 9(b), which is the partially-enlarged longitudinal cross-sectional view showing the lid 4 and the cylindrical container 5, a contacted part N and a butted part B were formed. In the contacted part N, the stepped part 4c and the opening edge 5a were overlapped and made contact. In the butted part B, the sleeve part 4b and an inner wall of the cylindrical container 5 were butted. The butted part B had a part, where the sleeve part 4b and the inner wall of the cylindrical container 5 made contact, and a part having looseness (interspace) therebetween, because there were a difference of the dimensions between the outer diameter of the sleeve part 4b and the inner diameter of the cylindrical container 5, and a deviation between respective central axises of the lid 4 and the cylindrical container 5 which were fitted each other.

A laser beam L was output from the diode laser having 200 W output power [wave length: 940 nm, continuously]. The laser beam L was approximately and vertically radiated relative to the face of the lid 4 as the first laser-transmissible-absorptive resin member 1 from an upper direction thereof toward the contacted part N so as to draw a circle along the contacted part N. A scan speed of the laser beam L was 40 mm/second. In the result, the laser welded body 10 of Example 7-1 of which the contacted part N was welded and the lid 4 and the cylindrical container 5 were integrated was obtained. As regards to the laser welded body 10, a hole was pierced in the bottom part of the cylindrical container 5. Pressure was applied by injecting air. The pressure of when a leakage occurred was measured. Thereby proof pressure strength (MPa) was obtained. A welding state was evaluated as follows. The proof pressure strength of 0.3 MPa or more is Excellent, and that of less than 0.3 MPa is Poor. The result was shown in Table 7

Example 7-2

(1) Preparing a First Laser-Transmissible-Absorptive Resin Member and a Second Laser-Transmissible-Absorptive Resin Member The lid 4 as the first laser-transmissible-absorptive resin member 1 and the cylindrical container 5 as the second laser-transmissible-absorptive resin member 2 were prepared in the same manner as Example 7-1 except that 499.85 g of the polyamide (PA) 66 resin, 0.15 g of Nigrosine A and no Coloring agent were used. The transmittance and the absorbance of the lid 4 and the cylindrical container 5 were measured in the same manner as Example 1-1. The results were shown in Table 7.

(2) Producing a Laser Welded Body

A laser welded body 10 of Example 7-2 was prepared in the same manner as Example 7-1. With respect to the obtained laser welded body 10, measuring the tensile strength and evaluating the welding state were performed in the same manner as Example 1-1. The results were shown in Table 7.

TABLE 7

|  |  | Example | |
|---|---|---|---|
|  |  | 7-1 | 7-2 |
| Lid (First laser-transmissible-absorptive resin member) | PA66 resin (g) | 494.85 | 499.85 |
|  | Nigrosine | A | A |
|  | Nigrosine amount (g) | 0.15 | 0.15 |
|  | Coloring agent | C | — |
|  | Coloring agent amount (g) | 5.0 | — |
|  | Transmittance (%) | 61.4 | 61.8 |
|  | Absorbance $a_1$ | 0.19 | 0.18 |
| Cylindrical container | PA66 resin (g) | 494.85 | 499.85 |

TABLE 7-continued

|  |  | Example | |
|---|---|---|---|
|  |  | 7-1 | 7-2 |
| (Second laser-transmissible-absorptive resin member) | Nigrosine | A | A |
|  | Nigrosine amount (g) | 0.15 | 0.15 |
|  | Coloring agent | C | — |
|  | Coloring agent amount (g) | 5.0 | — |
|  | Transmittance (%) | 61.4 | 61.8 |
|  | Absorbance $a_2$ | 0.19 | 0.18 |
| Absorbance ratio $a_1/a_2$ | | 1.00 | 1.00 |
| Laser welded body | Tensile strength (N) | 0.4 | 0.4 |
|  | Welding state | Excellent | Excellent |

According to the laser welded bodies of Examples 7-1 and 7-2 which used the first and second laser-transmissible-absorptive resin members containing the nigrosine sulfate as the laser beam absorbent, the lid 4 as the first laser-transmissible-absorptive resin member 1 and the cylindrical container 5 as the laser-transmissible-absorptive resin member 2 had high strength and were air-tight. By using the nigrosine sulfate as the laser beam absorbent, fluidity of the resin is increased. Even when the plurality of the resin member which should be welded has a concave-convex shape on the surface and/or an interspace therebetween, the resin exhibiting the high fluidity at the time of melting occludes the concave-convex shape and/or the interspace. The resin members are air-tightly welded. In addition, airtightness between the resin members can be further increased by repeatedly performing a radiation scan of the laser beam.

Example 8-1

(1) Preparing a First Laser-Transmissible-Absorptive Resin Member and a Second Laser-Transmissible-Absorptive Resin Member A resin composition for the first and second laser-transmissible-absorptive resin members was prepared in the same manner as Example 7-2. The resultant resin composition for the first and second laser-transmissible-absorptive resin members was put in an injection molding machine, followed by molding it in the usual manner at 270° C. of a cylinder temperature and 60° C. of a mold temperature. As shown in FIG. 5(b), the first laser-transmissible-absorptive resin member 1 having a square plate shape and the second laser-transmissible-absorptive resin member 2 having an plate shape and a L shape plate were produced. The transmittance and the absorbance of the both laser-transmissible-absorptive resin members 1, 2 were measured in the same manner as Example 1-1. Consequently, the absorbances $a_1$, $a_2$ were 0.18 and the transmittance was 61.8%.

(2) Producing a Laser Welded Body

As shown in FIG. 5(b), a one face of the first laser-transmissible-absorptive resin member 1 and a one face of the second laser-transmissible-absorptive resin member 2 were adjoined by overlapping them, wherein the ends thereof were rowed so that they form a flat face thereat. A contacted part N was formed and exposed at the ends of the both laser-transmissible-absorptive resin members 1, 2. A laser beam L was output from a diode laser having 200 W output power [wave length: 940 nm, continuously]. The laser beam L was radiated approximately and vertically with respect to a face of the first laser-transmissible-absorptive resin member 1 from a side thereof toward the contacted part N. The laser beam L was scanned at 40 mm/second of a scan speed and 20 mm of a scan distance. The laser beam L having the same output power and wave length as above was directly hit on the contacted part N, which was exposed at the ends of the both laser-transmissible-absorptive resin members 1, 2, without changing the scan speed and the scan distance. The laser beam L was radiated approximately and vertically with respect to a face of the second laser-transmissible-absorptive resin member 2 from a side thereof toward the contacted part N without changing the output power, the wave length, the scan speed and the scan distance. In the result, the laser welded body 10 of Example 8-1, of which the both laser-transmissible-absorptive resin members 1, 2 were integrated, was obtained. The welding state of the laser welded body 10 was Excellent.

Example 8-2

(1) Preparing a First Laser-Transmissible-Absorptive Resin Member and a Second Laser-Transmissible-Absorptive Resin Member A resin composition for the first and second laser-transmissible-absorptive resin members was prepared in the same manner as Example 7-2. The resultant resin composition for the first and second laser-transmissible-absorptive resin members was put in an injection molding machine, followed by molding it in the usual manner at 270° C. of a cylinder temperature and 60° C. of a mold temperature. The first laser-transmissible-absorptive resin member 1 and the second laser-transmissible-absorptive resin member 2 shown in FIG. 5(c) were produced. The first laser-transmissible-absorptive resin member 1 had a margin part 1c that projected from a part of one face of a rectangular parallelepiped. The second laser-transmissible-absorptive resin member 2 had square plate shape. The stepped width of margin part 1c was the same a thickness of the second laser-transmissible-absorptive resin member 2.

(2) Producing a Laser Welded Body

As shown in FIG. 5(c), a butted part B was formed by butting an end of the second laser-transmissible-absorptive resin member 2 to a step of the part 1c of the first laser-transmissible-absorptive resin member 1 and coming into contacting with themselves. A contacted part N was formed by overlapping a face, which follows the step of the margin part 1c and vertically extends a lower side, and a part of a one face of the second laser-transmissible-absorptive resin member 2. Thereby the margin part 1c and the other face of the second laser-transmissible-absorptive resin member 2 formed a continuously flat face. The butted part B was exposed at the flat face. A laser beam L was output from a diode laser having 200 W output power [wave length: 940 nm, continuously]. The laser beam L was radiated approximately and vertically with respect to a face of the first laser-transmissible-absorptive resin member 1 from a side thereof toward the butted part B. The laser beam L scanned at 40 mm/second of a scan speed and 20 mm of a scan distance. The laser beam L having the same output power and wave length as above was directly hit on the butted part B, which was exposed at the margin part 1c and the second laser-transmissible-absorptive resin member 2, without changing the scan speed and the scan distance. The laser beam L was radiated approximately and vertically with respect to a face of the second laser-transmissible-absorptive resin member 2 from a side thereof toward the contacted part N without changing the output power, the wave length, the scan speed and the scan distance. In the result, the laser welded body 10 of Example 8-2, of which the butted part B and the contacted parts N were welded and the both laser-transmissible-absorptive resin members 1, 2 were integrated, was obtained. The welding state of the laser welded body 10 was Excellent.

Example 9

(1) Preparing a First Laser-Transmissible-Absorptive Resin Member and a Second Laser-Transmissible-Absorptive Resin Member A resin composition for the first and second laser-transmissible-absorptive resin members was prepared in the same manner as Example 7-2. The resultant resin composition for the first and second laser-transmissible-absorptive resin members was put in an injection molding machine, followed by molding it in the usual manner at 270° C. of a cylinder temperature and 60° C. of a mold temperature. The first laser-transmissible-absorptive resin member 1 and the second laser-transmissible-absorptive resin member 2 were produced. As shown in FIG. 7(a), the first laser-transmissible-absorptive resin member 1 and the second laser-transmissible-absorptive resin member 2 had the cylindrical shape having openings at two ends, respectively. The both laser-transmissible-absorptive resin members 1, 2 had the same cylindrical shape having 50 mm outer diameter×35 mm distance of between the both end×3 wall thickness. The both laser-transmissible-absorptive resin members 1, 2 had the same shape. The transmittance and the absorbance of the both laser-transmissible-absorptive resin members 1, 2 were measured in the same manner as Example 1-1. Consequently, the absorbances $a_1$, $a_2$ were 0.18 and the transmittance was 61.8%.

(2) Producing a Laser Welded Body

As shown in FIG. 7(a), a butted part B was formed by butting the respective opening edges of the first laser-transmissible-absorptive resin member 1 and the second laser-transmissible-absorptive resin member 2. A laser beam L was output from a diode laser having 200 W output power [wave length: 940 nm, continuously] while aiming at the butted part B. The laser beam L scanned at 40 mm/second of a scan speed and 20 mm of a scan distance along the butted part B. In the result, the laser welded body 10 of Example 9 of which the both laser-transmissible-absorptive resin members 1, 2 were welded at the butted part B and integrated was obtained. With respect to the obtained laser welded body 10, measuring the tensile strength and evaluating the welding state were performed in the same manner as Example 1-1. The tensile strength was 724 N, and the welding state was Excellent.

Example 10

(1) Preparing a First Laser-Transmissible-Absorptive Resin Member and a Second Laser-Transmissible-Absorptive Resin Member A polyamide (PA) 66 resin (available from Asahi Kasei Corp., LEONA (registered trademark) 1300S) in an amount of 499.85 g and 0.15 g of Nigrosine A were put in a tumbler made of stainless steel, followed by stirring and mixing them for 1 hour. A resin composition for the laser-transmissible-absorptive resin member was prepared. The resultant resin composition for the laser-transmissible-absorptive resin member was put in an injection molding machine, followed by molding it in the usual manner at 295° C. of a cylinder temperature and 80° C. of a mold temperature. The laser-transmissible-absorptive resin members 1, 2 were produced. As shown in FIG. 8, the laser-transmissible-absorptive resin members 1, 2 had the same cylindrical shape having openings at two ends. The outer dimension of the cylindrical-shaped was 50 mm outer diameter×35 mm distance of between the both ends×3 wall thickness.

(2) Producing a Laser Welded Body

As shown in FIG. 8, a butted part B was formed by butting the opening edges of the first laser-transmissible-absorptive resin member 1 and the second laser-transmissible-absorptive resin member 2. A laser beam L was output from a diode laser having 200 W output power [wave length: 940 nm, continuously]. The laser beam L aimed at the butted part B while fixing a radiation source and rotating the both laser-transmissible-absorptive resin members 1, 2 in a one direction at 600 rpm (a scan speed was 1570 mm/second). The radiation of the laser beam L was performed for 20 seconds. In the result, the laser welded body 10 of Example 10, of which the both laser-transmissible-absorptive resin members 1, 2 were integrated, was obtained. The laser welded body 10 was divided equally among eight in a parallel direction with respect to the central axis (a vertical direction with respect to the butted part). As regard to a one piece thereof, measuring the tensile strength was performed in the same manner as Example 1-1. Further, the welding state was evaluated in the same manner as Example 1-1. The tensile strength was 1199.1 N, and the welding state was Excellent.

INDUSTRIAL APPLICABILITY

The laser welded body of the present invention is used for various automobiles and vehicle parts, electric and electronic parts, building, packaging materials parts relative to livingware and the like; products requiring airtightness such as various containers and tanks, various pipelines, various valves, various motors, various bottles and the like. Specifically, For example, the laser welded body is used for automotive parts such as an instrument panel used for an interior and a resonator (muffler); a tube used for infusion of transfusion and nutritive solution; a packing material for a food product such as a spout pouch putting a liquid food product and a beverage composition; a label for a PET bottle; and parts for household electrical goods such as a housing.

EXPLANATIONS OF LETTERS OR NUMERALS

Numerals mean as follows. 1: first laser-transmissible-absorptive resin member, 1a, 1b: first laser-transmissible-absorptive resin member piece, 1c: margin part, 1d: inserting margin, $1d_1$: stepped part, $1d_2$: inserting part, le: body, 2: second laser-transmissible-absorptive resin member, 2a, 2b: second laser-transmissible-absorptive resin member piece, 2c: margin part, 2d: fitting margin, $2d_1$: opening edge, $2d_2$: fitting part, 2e: concave part, 3: laser-transmissible resin member, 3a: upper laser-transmissible resin member, 3b: lower laser-transmissible resin member, 4: lid, 4a: head part, 4b: sleeve part, 4c: stepped part, 5: cylindrical container, 5a: opening edge, 10: laser welded body, 11: laser-transmissible resin member, 12: laser-absorptive resin member, 13: conventional laser welded body, B: butted part, $B_1$: upper butted part, $B_2$: lower butted part, L: laser beam, M: welding part, N, $N_{1-2a}$, $N_{1-21}$), $N_{1a-2}$, $N_{1b-2}$, $N_{1a-2a}$, $N_{1b-21}$), $N_{3b-2a}$, $N_{3b-2b}$, $N_{3-1}$, $N_{3-2}$, $N_{3-1a}$, $N_{3-1b}$, $N_{3a-1a}$, $N_{3a-1b}$: contacted part, $N_1$: upper contacted part, $N_2$: lower contacted part, X, Y: direction

What is claimed is:

1. A laser welded body comprising:
   a resin member(s) which contains a thermoplastic resin and nigrosine sulfate having a sulfate ion concentration of 0.3 to 5.0% by mass and has an absorbance a of 0.09 to 0.9,
   an adjoined part where the resin member(s) is overlapped and/or butted, and
   at least a part of the adjoined part is laser-welded.

2. The laser welded body according to claim 1, wherein the resin members are a first laser-transmissible-absorptive resin member which is a laser-irradiated subject and a second laser-transmissible-absorptive resin member which is the same as or different from the first laser-transmissible-absorptive resin member.

3. The laser welded body according to claim 1, wherein the resin members are a first laser-transmissible-absorptive resin member and a second laser-transmissible-absorptive resin member which is the same as or different from the first laser-transmissible-absorptive resin member and
   the both resin members are a laser-irradiated subject.

4. The laser welded body according to claim 2, wherein an absorbance ratio $a_1/a_2$ of an absorbance $a_1$ of the first laser-transmissible-absorptive resin member to an absorbance $a_2$ of the second laser-transmissible-absorptive resin member is 0.3 to 1.2.

5. The laser welded body according to claim 1, comprising a laser-transmissible resin member as a laser-irradiated subject having an absorbance b of 0.01 to 0.09 and containing a thermoplastic resin which is the same as or different from the thermoplastic resin,
   an adjoined part where the resin member(s) and the laser-transmissible resin member are overlapped and/or butted, and
   at least a part of the adjoined part is laser-welded.

6. The laser welded body according to claim 5, wherein the resin members are a first laser-transmissible-absorptive resin member and a second laser-transmissible-absorptive resin member which is the same as or different from the first laser-transmissible-absorptive resin member and
   an absorbance ratio $a_1/a_2$ of an absorbance $a_1$ of the first laser-transmissible-absorptive resin member to an absorbance $a_2$ of the second laser-transmissible-absorptive resin member is 0.3 to 1.2.

7. The laser welded body according to claim 1, wherein volume resistivity of the nigrosine sulfate is $5.0 \times 10^9$ to $7.0 \times 10^{11}$ Ω·cm.

8. The laser welded body according to claim 1, wherein a melt flow rate of the resin member(s) is 11 to 30 g/10 minutes.

9. The laser welded body according to claim 1, wherein the thermoplastic resin is at least one selected from the group consisting of a polyamide resin, a polycarbonate resin, a polyphenylene sulfide resin, a polyethylene terephthalate resin, a polybutylene terephthalate resin and a polypropylene resin.

10. The laser welded body according to claim 1, wherein the resin member(s) contains a coloring agent containing an anthraquinone dye.

11. The laser welded body according to claim 10, wherein the anthraquinone dye is an anthraquinone salt-forming dye.

12. The laser welded body according to claim 11, wherein the anthraquinone salt-forming dye is represented by $A^-B^+$ ($A^-$ is an anion from the anthraquinone and $B^+$ is a cation from an organic ammonium compound) or AB (A is a residue of the anthraquinone and B is a residue of an organic ammonium compound).

13. The laser welded body according to claim 3, wherein an absorbance ratio $a_1/a_2$ of an absorbance $a_1$ of the first laser-transmissible-absorptive resin member to an absorbance $a_2$ of the second laser-transmissible-absorptive resin member is 0.3 to 1.2.

* * * * *